United States Patent
Mori et al.

(10) Patent No.: US 7,001,139 B2
(45) Date of Patent: Feb. 21, 2006

(54) ROBOT ARM MECHANISM

(75) Inventors: Hiroki Mori, Tsu (JP); Tetsuya Watanabe, Tsu (JP); Chohei Okuno, Ise (JP)

(73) Assignee: Teijin Seiki Co., Ltd., Tokyo (JP)

( * ) Notice: Subject to any disclaimer, the term of this patent is extended or adjusted under 35 U.S.C. 154(b) by 314 days.

(21) Appl. No.: 10/308,122

(22) Filed: Dec. 3, 2002

(65) Prior Publication Data

US 2003/0103840 A1    Jun. 5, 2003

(30) Foreign Application Priority Data

Dec. 3, 2001    (JP)    ............... 2001-368863

(51) Int. Cl.
*B25J 18/04*    (2006.01)

(52) U.S. Cl. ............... 414/744.5; 74/490.05; 414/917; 901/15

(58) Field of Classification Search ............ 414/744.5, 414/917; 74/490.03, 490.05; 901/15, 28
See application file for complete search history.

(56) References Cited

U.S. PATENT DOCUMENTS

| | | | |
|---|---|---|---|
| 6,450,757 B1 | 9/2002 | Saeki | |
| 6,558,107 B1 | 5/2003 | Okuno | |

FOREIGN PATENT DOCUMENTS

| | | |
|---|---|---|
| DE | 19954832 | 5/2000 |
| EP | 0 396 752 A1 | 11/1990 |
| EP | 1 207 025 A1 | 5/2002 |
| WO | WO 00/29176 A1 | 5/2000 |

*Primary Examiner*—Donald W. Underwood
(74) *Attorney, Agent, or Firm*—Andrew C. Aitken; Venable LLP

(57) ABSTRACT

Herein disclosed is a robot arm mechanism comprising a first arm link mechanism and a second arm link mechanism, a robot arm driving mechanism for driving the first arm link mechanism and the second arm link mechanism, and a link retaining mechanism for pivotably retaining the first arm link mechanism and the second arm link mechanism, in which a third arm link and a fourth arm link of the first arm link mechanism are kept forward in a first rotation direction, in which the first arm link mechanism and the second arm link mechanism are extended, thereby enabling to prevent the quadric crank chain constituting the robot arm mechanism from being flattened out while the first arm link mechanism and the second arm link mechanism are extended, and improving resistance to deformation, in comparison with the conventional robot arm mechanism.

12 Claims, 20 Drawing Sheets

(a)

(b)

(a)

(b)

(a)

(b)

(a)

(b)

(a)

(b)

ROBOT ARM MECHANISM

BACKGROUND OF THE INVENTION

1. Field of the Invention

The present invention relates to a robot arm mechanism having arms contracted and extended, and more particularly to a robot arm mechanism incorporating an arm driving mechanism for driving the arms to assume its contracted and extended positions.

2. Description of the Related Art

Up until now, there have been proposed a wide variety of conventional robot arm mechanisms available in the process of producing semiconductors in which the robot arm mechanism is operated to have arms contracted and extended to handle works, i.e., objects to be treated. These objects may include works such as, for example, wafers and other precision parts that are to be transferred and then unloaded onto a work table by the robot arm mechanism.

One typical example of the conventional robot arm mechanism of this type is disclosed in, for example, Japanese Patent Laid-Open Publication No. 2000-208588. Such conventional robot arm mechanism 900 is shown in FIG. 20 as comprising a first arm link mechanism 910, a second arm link mechanism 920, a robot arm driving mechanism 930, and a link retaining mechanism 940.

The first arm link mechanism 910 consists of a quadric crank chain comprising a first arm link 911, a second arm link 912 substantially in parallel relationship with the first arm link 911, a third arm link 913, and a fourth arm link 914 substantially in parallel relationship with the third arm link 913. The second arm link mechanism 920 consists of a quadric crank chain comprising a first arm link 921, a second arm link 922 substantially in parallel relationship with the first arm link 921, a third arm link 923, and a fourth arm link 924 substantially in parallel relationship with the third arm link 923.

The first and second arm links 921, 922 of the second arm link mechanism 920 are substantially equal in length to the first and second arm links 911, 912 of the first arm link mechanism 910, respectively. The third arm link 923 of the second arm link mechanism 920 is integrally formed with and fixedly connected with the third arm link 913 of the first arm link mechanism 910.

The conventional robot arm mechanism 900 has a reference line 900a, and further comprises a robot arm driving mechanism 930. The robot arm driving mechanism 930 is adapted to drive the first arm link mechanism 910 so as to rotate the first arm link 911 and the second arm link 912 of the first arm link mechanism 910 with respect to the reference line 900a.

The link retaining mechanism 940 consists of first and second joint cross linkages. The first joint cross linkage consists of a quadric crank chain comprising a first short link 941, a second short link 942 substantially equal in length to the first short link 941, a second long link 943, and a first long link 944 substantially equal in length to the second long link 943, wherein the first long link 944 of the first joint cross linkage of the link retaining mechanism 940 is crossed with the second long link 943 of the first joint cross linkage of the link retaining mechanism 940. The second joint cross linkage consists of a quadric crank chain comprising a first short link 945, a second short link 946 substantially equal in length to the first short link 945, a second long link 947, and a first long link 948 substantially equal in length to the second long link 947, wherein the first long link 948 of the second joint cross linkage of the link retaining mechanism 940 is crossed with the second long link 947 of the second joint cross linkage of the link retaining mechanism 940. Furthermore, the first short link 941 of the first joint cross linkage of the link retaining mechanism 940 is integrally formed with and fixedly connected with the first arm link 921 of the second arm link mechanism 920, and the second long link 947 of the second joint cross linkage of the link retaining mechanism 940 is integrally formed with and fixedly connected with the first arm link 911 of the first arm link mechanism 910.

The second long link 943 of the first joint cross linkage of the link retaining mechanism 940 is integrally formed with and fixedly connected with the third arm link 913 of the first arm link mechanism 910, and the first short link 945 of the second joint cross linkage of the link retaining mechanism 940 substantially equal in length to the second long link 943 of the first joint cross linkage of the link retaining mechanism 940, and integrally formed with and fixedly connected with the third arm link 923 of the second arm link mechanism 920. The second short link 942 of the first joint cross linkage of the link retaining mechanism 940 integrally formed with and fixedly connected with the first long link 948 of the second joint cross linkage of the link retaining mechanism 940.

The link retaining mechanism 940 thus constructed is adapted to pivotably retain the first arm link mechanism 910 and the second arm link mechanism 920 and keep a first angle θ901 substantially equal to a second angle θ902, wherein the first angle θ901 is an angle formed by the first arm link 911 of the first arm link mechanism 910 with the reference line 900a, and the second angle θ902 is an angle formed by the first arm link 921 of the second arm link mechanism 920 with the reference line 900a.

The conventional robot arm mechanism 900 further comprises a robot arm member 951 having first and second end portions, and a handling member 952 for supporting and handling an object. The first end portion of the robot arm member 951 is integrally formed with and fixedly connected with the fourth arm link 924 of the second arm link mechanism 920. The handling member 952 is connected with the second end portion of the robot arm member 951.

The conventional robot arm mechanism 900 thus constructed makes it possible for the first arm link mechanism 910 and the second arm link mechanism 920 to be contracted and extended to assume its contracted and extended positions.

The conventional robot arm mechanism 900 thus constructed, however, encounters drawbacks resulting from the fact that the quadric crank chains constituting the first arm link mechanism 910, the quadric crank chain constituting the second arm link mechanism 920, and the quadric crank chain constituting the link retaining mechanism 940 may be easily flattened out, and accordingly vulnerable to deformation while the first arm link mechanism 910 and the second arm link mechanism 920 are extended to assume its extended position as shown in FIG. 20.

This means that the conventional robot arm mechanism 900 encounters a problem that the quadric crank chains constituting the first arm link mechanism 910, the quadric crank chain of the second arm link mechanism 920, and the link retaining mechanism 940 may be deformed due to, for example, a temperature change while the first arm link mechanism 910 and the second arm link mechanism 920 are extended, thereby making it difficult for the conventional robot arm mechanism 900 to accurately position the handling member 952 while the first arm link mechanism 910 and the second arm link mechanism 920 are extended, and accordingly aggravating the operating accuracy of the conventional robot arm mechanism 900.

The conventional robot arm mechanism 900 encounters another problem that the quadric crank chains constituting the first arm link mechanism 910, the quadric crank chain of the second arm link mechanism 920, and the link retaining mechanism 940 may be deformed due to, for example, an external force exerted thereon while the first arm link mechanism 910 and the second arm link mechanism 920 are extended, thereby making it difficult for the conventional robot arm mechanism 900 to accurately position the handling member 952 independently of the external force exerted thereon while the first arm link mechanism 910 and the second arm link mechanism 920 are extended, and accordingly aggravating the operating accuracy of the conventional robot arm mechanism 900.

The present invention is made with a view to overcoming the previously mentioned problems inherent to the conventional robot arm mechanism.

SUMMARY OF THE INVENTION

It is, therefore, an object of the present invention to provide a robot arm mechanism which is resistant to deformation while the first arm link mechanism and the second arm link mechanism are extended, and accordingly enhancing the operating accuracy of the robot arm mechanism in comparison with the conventional robot arm mechanism.

In accordance with a first aspect of the present invention, there is provided a robot arm mechanism comprising: a first arm link mechanism consisting of a first quadric crank chain comprising a first arm link, a second arm link substantially in parallel relationship with the first arm link, a third arm link, and a fourth arm link substantially in parallel relationship with the third arm link; a second arm link mechanism consisting of a second quadric crank chain comprising a first arm link, a second arm link substantially in parallel relationship with the first arm link, a third arm link, and a fourth arm link substantially in parallel relationship with the third arm link, the second arm link mechanism is pivotably connected with the first arm link mechanism; a link retaining mechanism having a reference line, the link retaining mechanism pivotably retaining the first arm link mechanism and the second arm link mechanism respectively and keeping a first angle substantially equal to a second angle, the first angle being an angle formed by a line passing through the first arm link of the first arm link mechanism with the reference line, the second angle being an angle formed by a line passing through the first arm link of the second arm link mechanism with the reference line; a robot arm driving mechanism comprising; a first driving shaft operative to rotate the first arm link of the first arm link mechanism around a rotation axis in any one of two rotation directions consisting of a first rotation direction in which the first arm link mechanism and the second arm link mechanism are extended, and a second rotation direction in which the first arm link mechanism and the second arm link mechanism are contracted, and a second driving shaft operative to rotate the fourth arm link of the first arm link mechanism around the rotation axis in any one of two rotation directions consisting of the first rotation direction and the second rotation direction, a robot arm member having first and second end portions, the first end portion fixedly connected with the fourth arm link of the second arm link mechanism, and a handling member for supporting and handling an object, connected with the second end portion of the robot arm member. In the aforesaid robot arm mechanism, the robot arm driving mechanism is operative to rotate the first arm link of the first arm link mechanism around the rotation axis in the first rotation direction, and the fourth arm link of the first arm link mechanism around the rotation axis in any one of two directions consisting of the first rotation direction and the second rotation direction while maintaining the first angle formed by a line passing through the first arm link of the first arm link mechanism with the reference line less than a third angle formed by a line passing through the fourth arm link of the first arm link mechanism with the reference line in the first rotation direction. In the aforesaid robot arm mechanism according to the present invention, the third angle may be set to an angle so that the first arm link and the fourth arm link of the first arm link mechanism become substantially perpendicular to each other when the first arm link mechanism and the second arm link mechanism are extended to its their limits.

In accordance with a second aspect of the present invention, there is provided a robot arm mechanism comprising: a first arm link mechanism consisting of a first quadric crank chain comprising a first arm link, a second arm link substantially in parallel relationship with the first arm link, a third arm link, and a fourth arm link substantially in parallel relationship with the third arm link; a second arm link mechanism consisting of a second quadric crank chain comprising a first arm link, a second arm link substantially in parallel relationship with the first arm link, a third arm link, and a fourth arm link substantially in parallel relationship with the third arm link, the second arm link mechanism is pivotably connected with the first arm link mechanism; a link retaining mechanism having a reference line, the link retaining mechanism pivotably retaining the first arm link mechanism and the second arm link mechanism respectively and keeping a first angle substantially equal to a second angle, the first angle being an angle formed by a line passing through the second arm link of the first arm link mechanism with the reference line, the second angle being an angle formed by a line passing through the first arm link of the second arm link mechanism with the reference line; a robot arm member having first and second end portions, the first end portion fixedly connected with the fourth arm link of the second arm link mechanism; a handling member for supporting and handling an object, connected with the second end portion of the robot arm member; a robot arm driving mechanism comprising: a first driving shaft operative to rotate the first arm link of the first arm link mechanism around a rotation axis in any one of two rotation directions consisting of a first rotation direction in which the first arm link of the second arm link mechanism rotates in a rotation direction opposite to the first rotation direction, and the first arm link mechanism and the second arm link mechanism are extended, and a second rotation direction in which the first arm link of the second arm link mechanism rotates in a rotation direction opposite to the second rotation direction, and the first arm link mechanism and the second arm link mechanism are contracted, and a second driving shaft operative to rotate the fourth arm link of the first arm link mechanism around the rotation axis in any one of two rotation directions consisting of the first rotation direction and the second rotation direction. In the aforesaid robot arm mechanism, the robot arm driving mechanism is operative to rotate the first arm link of the first arm link mechanism around the rotation axis in the first rotation direction, and the fourth arm link of the first arm link mechanism around the rotation axis in any one of two directions consisting of the first rotation direction and the second rotation direction while maintaining the first angle formed by a line passing through the second arm link of the first arm link mechanism with the reference line less than a third angle formed by a line passing through the fourth arm link of the second arm link mechanism with the reference line in the rotation direction opposite to the first rotation direction. In the aforesaid robot arm mechanism according to the present invention, the third angle may be set to an angle so that the first arm link and the fourth arm link of the second arm link mechanism become substantially perpendicular to each other when the first arm link mechanism and the second arm link mechanism are extended to its their limits.

In accordance with a third aspect of the present invention, there is provided a robot arm mechanism comprising: a first arm link mechanism consisting of a first quadric crank chain comprising a first arm link, a second arm link substantially in parallel relationship with the first arm link, a third arm link, and a fourth arm link substantially in parallel relationship with the third arm link; a second arm link mechanism consisting of a second quadric crank chain comprising a first arm link, a second arm link substantially in parallel relationship with the first arm link, a third arm link, and a fourth arm link substantially in parallel relationship with the third arm link, the second arm link mechanism is pivotably connected with the first arm link mechanism; a link retaining mechanism having a reference line, the link retaining mechanism pivotably retaining the first arm link mechanism and the second arm link mechanism respectively and keeping a first angle substantially equal to a second angle, the first angle being an angle formed by a line passing through the first arm link of the first arm link mechanism with the reference line, the second angle being an angle formed by a line passing through the first arm link of the second arm link mechanism with the reference line; and a robot arm driving mechanism comprising; a first driving shaft operative to rotate the first arm link of the first arm link mechanism around a rotation axis in any one of two rotation directions consisting of a first rotation direction in which the first arm link mechanism and the second arm link mechanism are extended, and a second rotation direction in which the first arm link mechanism and the second arm link mechanism are contracted, and a second driving shaft operative to rotate the fourth arm link of the first arm link mechanism around the rotation axis in any one of two rotation directions consisting of the first rotation direction and the second rotation direction. In the aforesaid robot arm mechanism according to the present invention, the robot arm driving mechanism is operative to rotate the first arm link of the first arm link mechanism around the rotation axis in the first rotation direction, and the fourth arm link of the first arm link mechanism around the rotation axis in any one of two directions consisting of the first rotation direction and the second rotation direction while maintaining the first angle formed by a line passing through the first arm link of the first arm link mechanism with the reference line less than a third angle formed by a line passing through the fourth arm link of the first arm link mechanism with the reference line in the first rotation direction as well as maintaining the second angle formed by a line passing through the first arm link of the second arm link mechanism with the reference line less than a third angle formed by a line passing through the fourth arm link of the second arm link mechanism with the reference line in the rotation direction opposite to the first rotation direction.

BRIEF DESCRIPTION OF THE DRAWINGS

The objects, features and advantages of the present invention will become apparent as the description proceeds when taken in conjunction with the accompanying drawings, in which:

FIG. 14(a) is an enlarged fragmentary skeleton view of the condition of the robot arm mechanism shown in FIG. 12(a) to be used for explaining a drawback of the conventional robot arm mechanism;

FIG. 15(*b*) is an enlarged fragmentary skeleton view of another condition of the third embodiment of the robot arm mechanism wherein a link retaining mechanism is mounted on first and second arm link mechanism in a manner different from any one of the robot arm mechanisms shown in FIGS. 12(*b*) and FIG. 15(*a*);

FIG. 16(*b*) is an enlarged fragmentary skeleton view of another condition of the third embodiment of the robot arm mechanism wherein a link retaining mechanism shown in FIG. 16(*b*) is mounted in a conventional manner;

FIG. 17(*b*) is an enlarged fragmentary skeleton view of another condition of the third embodiment of the robot arm mechanism wherein a link retaining mechanism shown in FIG. 17(*b*) is mounted in a conventional manner;

DESCRIPTION OF THE PREFERRED EMBODIMENTS

Figure 1:
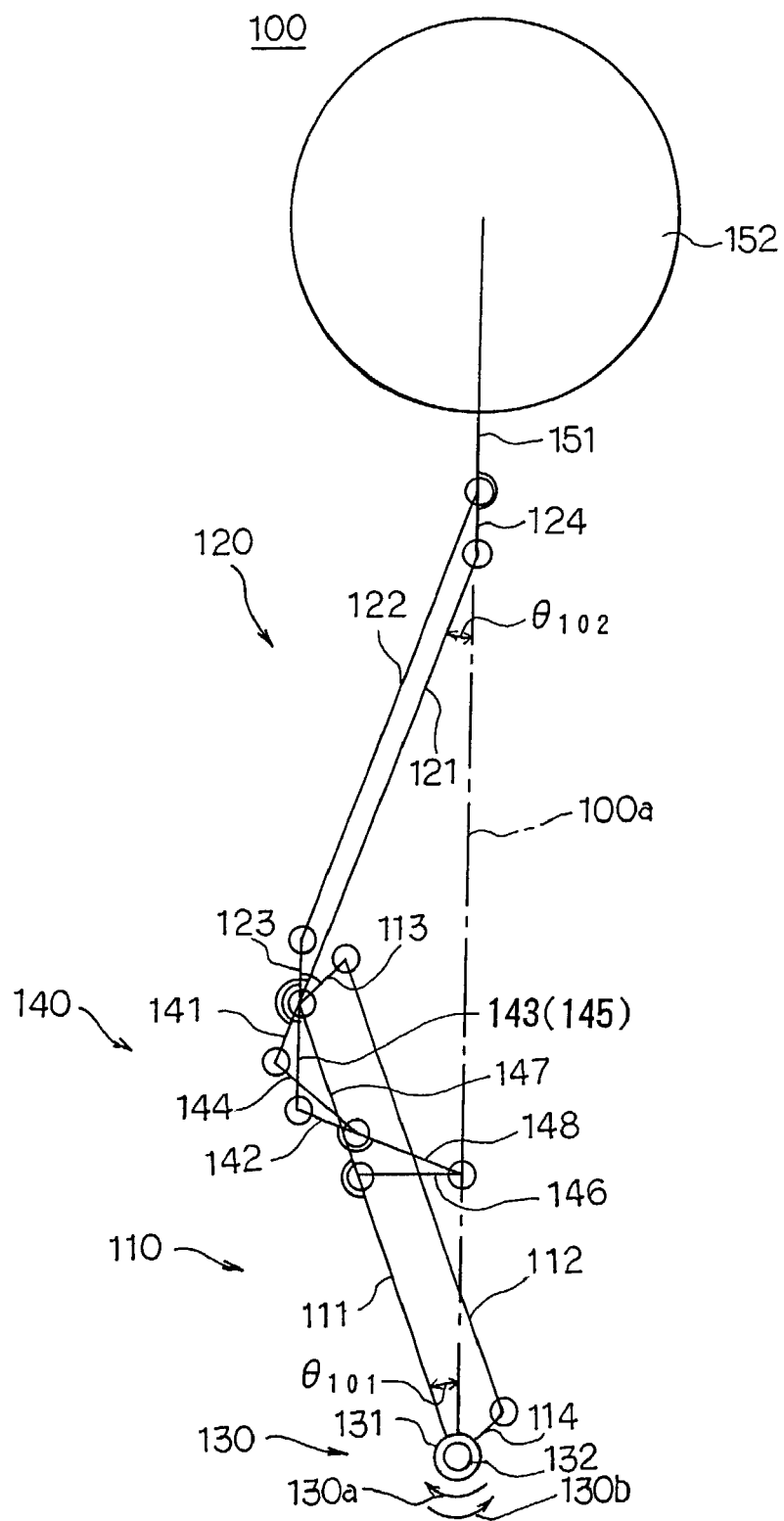
FIG. 1 is a skeleton view of an extended position of a first preferred embodiment of the robot arm mechanism according to the present invention.

Throughout the following detailed description, similar reference characters and numbers refer to similar elements in all figures of the drawings.

Referring to FIGS. 1 to 4 of the drawings, there is shown a first preferred embodiment of the robot arm mechanism 100 according to the present invention. The first embodiment of the robot arm mechanism 100 is shown in FIG. 1 as comprising a first arm link mechanism 110, a second arm link mechanism 120, a link retaining mechanism 140, a robot arm driving mechanism 130, a robot arm member 151, and a handling member 152.

The first arm link mechanism 110 consists of a first quadric crank chain comprising a first arm link 111, a second arm link 112, a third arm link 113, and a fourth arm link 114 wherein the second arm link 112 is substantially in parallel relationship with the first arm link 111 and the fourth arm link 114 is substantially in parallel relationship with the third arm link 113. The second arm link mechanism 120 consists of a second quadric crank chain comprising a first arm link 121, a second arm link 122, a third arm link 123, and a fourth arm link 124 wherein the second arm link 122 is substantially in parallel relationship with the first arm link 121 and the fourth arm link 124 is substantially in parallel relationship with the third arm link 123. The second arm link mechanism 120 is pivotably connected with the first arm link mechanism 110.

The first arm link mechanism 110 and the second arm link mechanism 120 will be described in detail, hereinlater.

The first arm link 111 of the first arm link mechanism 110 has a driving end portion and a supporting end portion. The second arm link 112, the third arm link 113, and the fourth arm link 114 of the first arm link mechanism 110 respectively have first and second end portions. Similarly, the first arm link 121 of the second arm link mechanism 120 has a supporting end portion and a handling end portion. The second arm link 122, the third arm link 123, and the fourth arm link 124 of the second arm link mechanism 120 respectively have first and second end portions.

The first and third arm links 111, 113 of the first arm link mechanism 110 are pivotably connected with each other at the supporting end portion of the first arm link 111 of the first arm link mechanism 110 and the first end portion of the third arm link 113 of the first arm link mechanism 110. The third and second arm links 113, 112 of the first arm link mechanism 110 are pivotably connected with each other at the second end portion of the third arm link 113 of the first arm link mechanism 110 and the first end portion of the second arm link 112 of the first arm link mechanism 110. The second and fourth arm links 112, 114 of the first arm link mechanism 110 are pivotably connected with each other at the second end portion of the second arm link 112 of the first arm link mechanism 110 and the first end portion of the fourth arm link 114 of the first arm link mechanism 110. The fourth and first arm links 114, 111 of the first arm link mechanism 110 are pivotably connected with each other at the second end portion of the fourth arm link 114 of the first arm link mechanism 110 and the driving end portion of the first arm link 111 of the first arm link mechanism 110.

Similarly, the first and third arm links 121, 123 of the second arm link mechanism 120 are pivotably connected with each other at the supporting end portion of the first arm link 121 of the second arm link mechanism 120 and the first end portion of the third arm link 123 of the second arm link mechanism 120. The third and second arm links 123, 122 of the second arm link mechanism 120 are pivotably connected with each other at the second end portion of the third arm link 123 of the second arm link mechanism 120 and the first end portion of the second arm link 122 of the second arm link mechanism 120. The second and fourth arm links 122, 124 of the second arm link mechanism 120 are pivotably connected with each other at the second end portion of the second arm link 122 of the second arm link mechanism 120 and the first end portion of the fourth arm link 124 of the second arm link mechanism 120. The fourth and first arm links 124, 121 of the second arm link mechanism 120 are pivotably connected with each other at the second end portion of the fourth arm link 124 of the second arm link mechanism 120 and the handling end portion of the first arm link 121 of the second arm link mechanism 120. The third arm link 123 of the second arm link mechanism 120 is integrally formed with and fixedly connected with the third arm link 113 of the first arm link mechanism 110.

The link retaining mechanism 140 has a reference line 100*a* as shown in FIG. 1. The link retaining mechanism 140 is adapted to pivotably retain the first arm link mechanism 110 and the second arm link mechanism 120 respectively and keep a first angle substantially equal to a second angle wherein the first angle θ101 is intended to mean an angle formed by a line passing through the first arm link 111 of the first arm link mechanism 110 with the reference line 100*a*, and the second angle θ102 is intended to mean an angle formed by a line passing through the first arm link 121 of the second arm link mechanism 120 with the reference line 100a. The first angle θ101 ranges from 0 to less than 180 degrees.

The link retaining mechanism 140 will be described in detail, hereinlater.

It is assumed that the link retaining mechanism 140 is adapted to pivotably retain the first arm link 111 of the first arm link mechanism 110 and the first arm link 121 of the second arm link mechanism 120 respectively at the supporting end portions of the first arm link 111 of the first arm link mechanism 110 and the first arm link 121 of the second arm link mechanism 120 and keep the first angle θ101 substantially equal to the second angle θ102.

The link retaining mechanism 140 comprises a first joint cross linkage. The first joint cross linkage is a quadric crank chain and includes a first short link 141, a first long link 144, a second short link 142, and a second long link 143. The first short link 141 has first and second end portions. The first long link 144 has first and second end portions and is longer than the first short link 141 of the first joint cross linkage of the link retaining mechanism 140. The first short and long links 141, 144 of the first joint cross linkage of the link retaining mechanism 140 are pivotably connected with each other at the second end portion of the first short link 141 of the first joint cross linkage of the link retaining mechanism 140 and the first end portion of the first long link 144 of the first joint cross linkage of the link retaining mechanism 140. The second short link 142 has first and second end portions and is substantially equal in length to the first short link 141 of the first joint cross linkage of the link retaining mechanism 140. The first long link 144 of the first joint cross linkage of the link retaining mechanism 140 and the second short link 142 of the first joint cross linkage of the link retaining mechanism 140 are pivotably connected with each other at the second end portion of the first long link 144 of the first joint cross linkage of the link retaining mechanism 140 and the first end portion of the second short link 142 of the first joint cross linkage of the link retaining mechanism 140. The second long link 143 has first and second end portions and is substantially equal in length to the first long link 144 of the first joint cross linkage of the link retaining mechanism 140. The second short and long links 142, 143 of the first joint cross linkage of the link retaining mechanism 140 are pivotably connected with each other at the second end portion of the second short link 142 of the first joint cross linkage of the link retaining mechanism 140 and the first end portion of the second long link 143 of the first joint cross linkage of the link retaining mechanism 140. The second long link 143 of the first joint cross linkage of the link retaining mechanism 140 and the first short link 141 of the first joint cross linkage of the link retaining mechanism 140 are pivotably connected with each other at the second end portion of the second long link 143 of the first joint cross linkage of the link retaining mechanism 140 and the first end portion of the first short link 141 of the first joint cross linkage of the link retaining mechanism 140 under the state that the second long link 143 of the first joint cross linkage of the link retaining mechanism 140 is crossed with the first long link 144 of the first joint cross linkage of the link retaining mechanism 140.

The first short link 141 of the first joint cross linkage of the link retaining mechanism 140 is integrally formed with and fixedly connected with the first arm link 121 of the second arm link mechanism 120. The second long link 143 of the first joint cross linkage of the link retaining mechanism 140 is integrally formed with and fixedly connected with the third arm link 113 of the first arm link mechanism 110 and the third arm link 123 of the second arm link mechanism 120.

The link retaining mechanism 140 further comprises a second joint cross linkage. The second joint cross linkage is a quadric crank chain, and includes a first short link 145, a first long link 148, a second short link 146, and a second long link 147. The first short link 145 has first and second end portions. The first short link 145 of the second joint cross linkage of the link retaining mechanism 140 is substantially equal in length to the second long link 143 of the first joint cross linkage of the link retaining mechanism 140, and integrally formed with and fixedly connected with the third arm link 113 of the first arm link mechanism 110 and the third arm link 123 of the second arm link mechanism 120. The first long link 148 has first and second end portions and is longer than the first short link 145 of the second joint cross linkage of the link retaining mechanism 140. The first short and long links 145, 148 of the second joint cross linkage of the link retaining mechanism 140 are pivotably connected with each other at the second end portion of the first short link 145 of the second joint cross linkage of the link retaining mechanism 140 and the first end portion of the first long link 148 of the second joint cross linkage of the link retaining mechanism 140. The second short link 142 of the first joint cross linkage of the link retaining mechanism 140 are integrally formed with and fixedly connected with the first long link 148 of the second joint cross linkage of the link retaining mechanism 140. The second short link 146 has first and second end portions and is substantially equal in length to the first short link 145 of the second joint cross linkage of the link retaining mechanism 140. The first long link 148 of the second joint cross linkage of the link retaining mechanism 140 and the second short link 146 of the second joint cross linkage of the link retaining mechanism 140 are pivotably connected with each other at the second end portion of the first long link 148 of the second joint cross linkage of the link retaining mechanism 140 and the first end portion of the second short link 146 of the second joint cross linkage of the link retaining mechanism 140. The second long link 147 has first and second end portions and is substantially equal in length to the first long link 148 of the second joint cross linkage of the link retaining mechanism 140. The second short and long links 146, 147 of the second joint cross linkage of the link retaining mechanism 140 are pivotably connected with each other at the second end portion of the second short link 146 of the second joint cross linkage of the link retaining mechanism 140 and the first end portion of the second long link 147 of the second joint cross linkage of the link retaining mechanism 140. The second long link 147 of the second joint cross linkage of the link retaining mechanism 140 and the first short link 145 of the second joint cross linkage of the link retaining mechanism 140 are pivotably connected with each other at the second end portion of the second long link 147 of the second joint cross linkage of the link retaining mechanism 140 and the first end portion of the first short link 145 of the second joint cross linkage of the link retaining mechanism 140 under the state that the second long link 147 of the second joint cross linkage of the link retaining mechanism 140 is crossed with the first long link 148 of the second joint cross linkage of the link retaining mechanism 140. The second long link 147 of the second joint cross linkage of the link retaining mechanism 140 is integrally formed with and fixedly connected with the first arm link 111 of the first arm link mechanism 110.

The robot arm driving mechanism 130 comprises a first driving shaft 131 and a second driving shaft 132. The first driving shaft 131 is integrally formed with and fixedly connected with and adapted to rotate the first arm link 111 of the first arm link mechanism 110 around a rotation axis in any one of two rotation directions consisting of a first rotation direction 130a in which the first arm link mechanism 110 and the second arm link mechanism 120 are extended, and a second rotation direction 130b in which the first arm link mechanism 110 and the second arm link mechanism 120 are contracted. The second driving shaft 132 is integrally formed with and fixedly connected with and adapted to rotate the fourth arm link 114 of the first arm link mechanism 110 around the rotation axis in any one of two rotation directions consisting of the first rotation direction 130a and the second rotation direction 130b.

The robot arm member 151 has first and second end portions. The first end portion of the robot arm member 151 is integrally formed with and fixedly connected with one of the second arm link 122 and the fourth arm link 124 of the second arm link mechanism 120.

The handling member 152 is fixedly connected with the second end portion of the robot arm member 151, and adapted to support and handle an object. According to the present invention, the handling member 152 may be adapted to, for example, grip the object.

Figure 2:
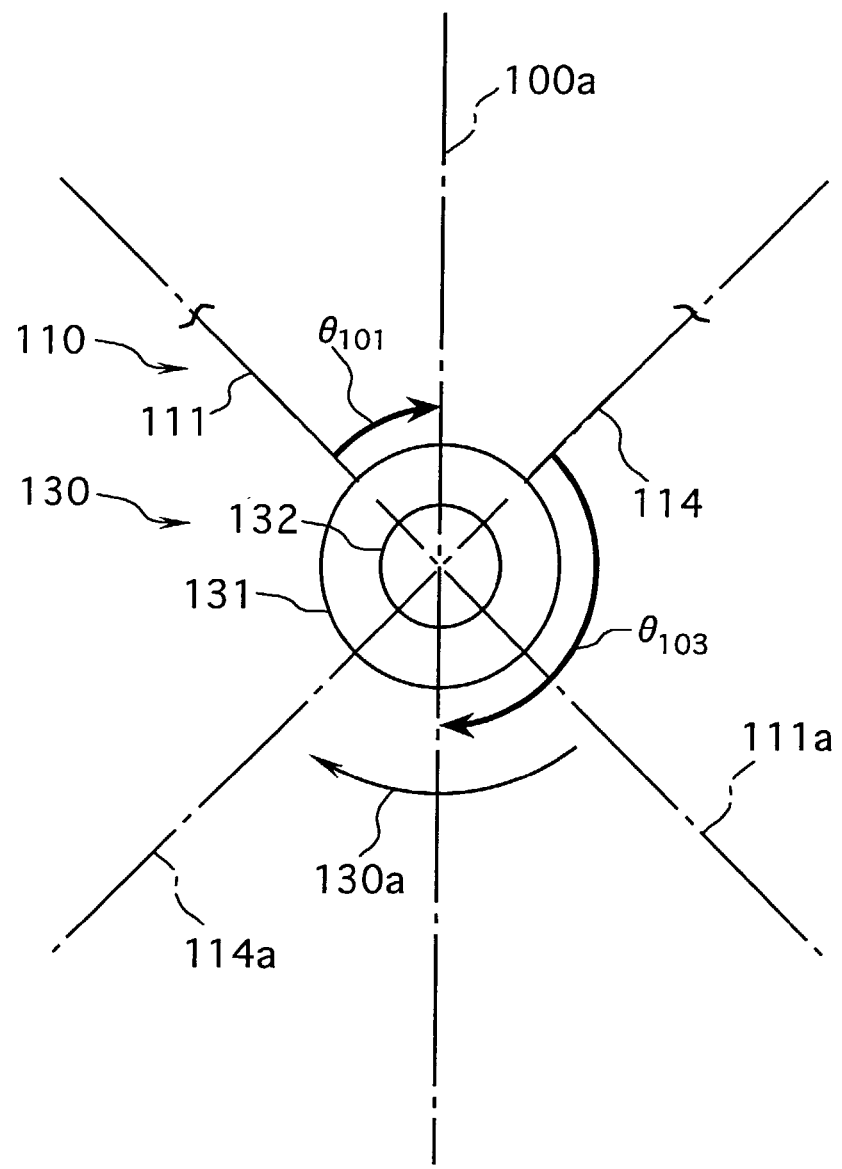
FIG. 2 is an enlarged fragmentary skeleton view of the robot arm mechanism shown in FIG. 1 to be used for explaining the principle of the robot arm mechanism according to the present invention.

Furthermore, the robot arm driving mechanism 130 is adapted to rotate the first arm link 111 of the first arm link mechanism 110 around the rotation axis the first rotation direction 130a, and the fourth arm link 114 of the first arm link mechanism 110 around the rotation axis in any one of two directions consisting of the first rotation direction 130a and the second rotation direction 130b while maintaining the first angle θ101 formed by a line 111a passing through the first arm link 111 of the first arm link mechanism 110 with the reference line 100a less than a third angle θ103 formed by a line 114a passing through the fourth arm link 114 of the first arm link mechanism 110 with the reference line 100a in the first rotation direction 130a as best shown in FIG. 2. The third angle θ103 ranges from 0 to less than 180 degrees.

The operation of the first embodiment of the robot arm mechanism 100 will be described, hereinlater.

Figure 3:
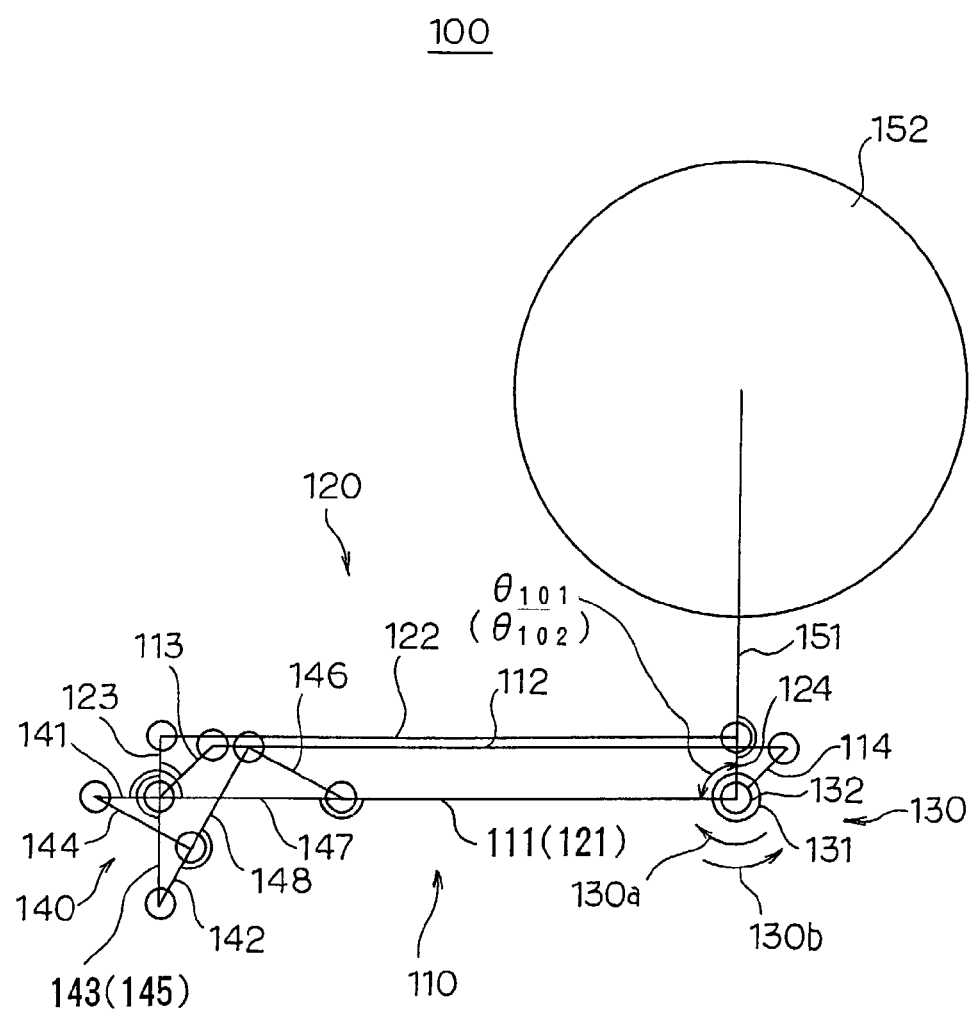
FIG. 3 is a skeleton view of a contracted position of the robot arm mechanism shown in FIG. 1.
Figure 4:
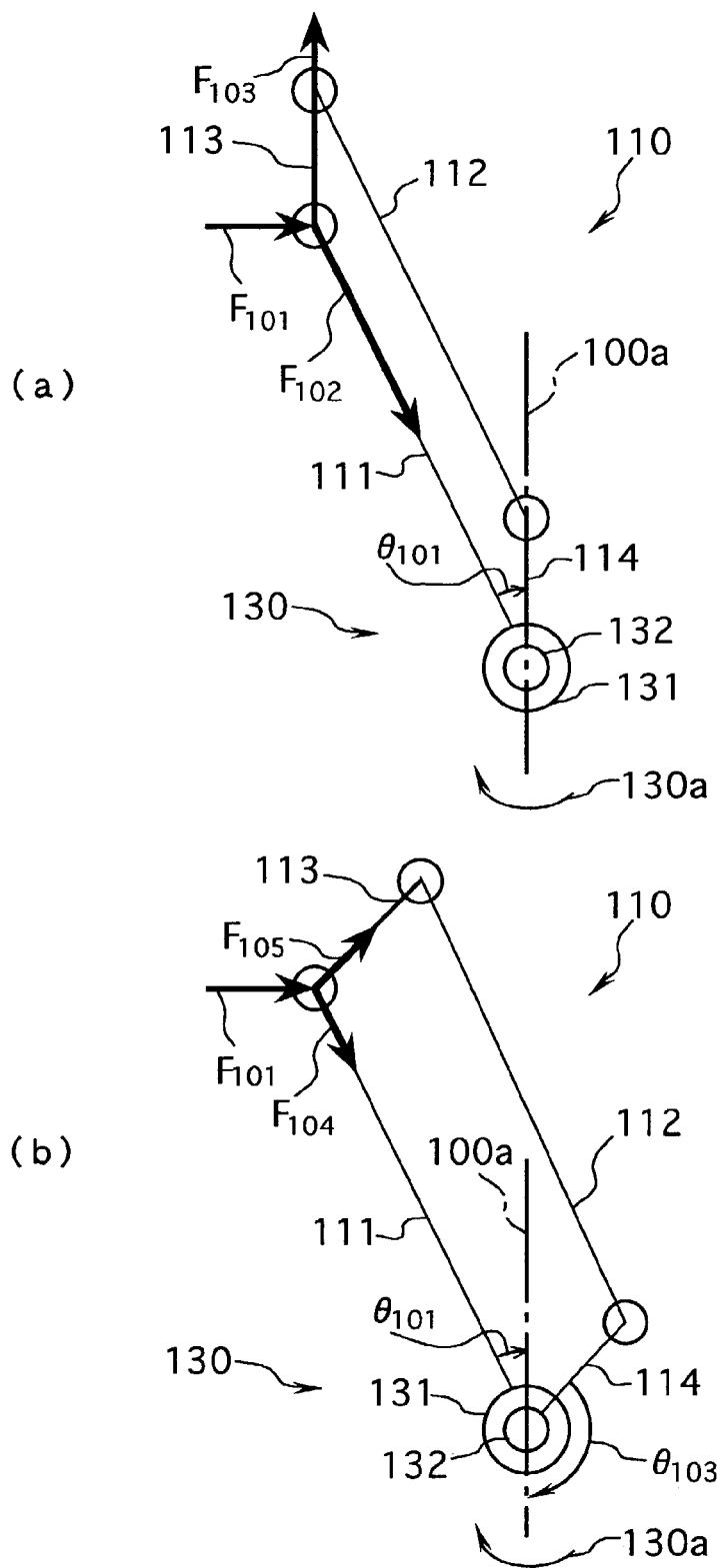
FIG. 4(a) is an enlarged fragmentary skeleton view of one condition of a conventional robot arm mechanism to be used for explaining a drawback of the conventional robot arm mechanism.
FIG. 4(b) is an enlarged fragmentary skeleton view of one condition of the robot arm mechanism shown in FIG. 1 to be used for explaining an advantage of the robot arm mechanism according to the present invention.

As shown in FIG. 2, the first driving shaft 131 is operated to rotate the first arm link 111 of the first arm link mechanism 110 around the rotation axis to change the first angle θ101. The first driving shaft 131 is operated to rotate the first arm link 111 of the first arm link mechanism 110 around the rotation axis in, for example, the first rotation direction 130a, the first arm link mechanism 110 and the second arm link mechanism 120 are then operated to be extended. The first driving shaft 131, on the other hand, is operated to rotate the first arm link 111 of the first arm link mechanism 110 around the rotation axis in, for example, the second rotation direction 130b, the first arm link mechanism 110 and the second arm link mechanism 120 are then operated to be contracted. This means that the first driving shaft 131 may rotate the first arm link 111 of the first arm link mechanism 110 around the rotation axis in the first rotation direction 130a until the first arm link mechanism 110 and the second arm link mechanism 120 assumes an extended position as shown in FIG. 1, and the first driving shaft 131 may rotate the first arm link 111 of the first arm link mechanism 110 around the rotation axis in the second rotation direction 130b until the first arm link mechanism 110 and the second arm link mechanism 120 assumes a contracted position as shown in FIG. 3. Alternatively, the first arm link mechanism 110 and the second arm link mechanism 120 may further be contracted beyond the contracted position shown in FIG. 3.

The first driving shaft 131 and the second driving shaft 132 may respectively rotate the first arm link 111 of the first arm link mechanism 110 and the fourth arm link 114 of the first arm link mechanism 110 around the rotation axis in the same rotation direction, for example, the first rotation direction 130a or the second rotation direction 130b for the same amount of rotation angle, the robot arm mechanism 100 as a whole, including the first arm link mechanism 110 and the second arm link mechanism 120, is then rotated around the rotation axis in the rotation direction.

As described hereinbefore, the robot arm driving mechanism 130 is operated to rotate the first arm link 111 of the first arm link mechanism 110 around the rotation axis in the first rotation direction 130a, in which the first arm link mechanism 110 and the second arm link mechanism 120 are extended, and the fourth arm link 114 of the first arm link mechanism 110 around the rotation axis in any one of two directions consisting of the first rotation direction 130a and the second rotation direction 130b while maintaining the first angle θ101 formed by a line 111a passing through the first arm link 111 of the first arm link mechanism 110 with the reference line 100a less than a third angle θ103 formed by a line 114a passing through the fourth arm link 114 of the first arm link mechanism 110 with the reference line 100a in the first rotation direction 130a as best shown in FIG. 2. This means that the first embodiment of the robot arm mechanism 100, in which the third angle θ103 formed by the line 114a passing through the fourth arm link 114 of the first arm link mechanism 110 with the reference line 100a in the first rotation direction 130a is maintained grater than the first angle θ101 formed by the line 111a passing through the first arm link 111 of the first arm link mechanism 110 with the reference line 100a (see FIG. 2) while the first arm link mechanism 110 and the second arm link mechanism 120 are extended, can prevent the quadric crank chain constituting the first arm link mechanism 110 from being flattened out while the first arm link mechanism 110 and the second arm link mechanism 120 are extended, thereby improving resistance to deformation while the first arm link mechanism 110 and the second arm link mechanism 120 are extended as shown in FIG. 1, in comparison with the conventional robot arm mechanism 900 shown in FIG. 20 for the reason described hereinlater.

Figure 20:
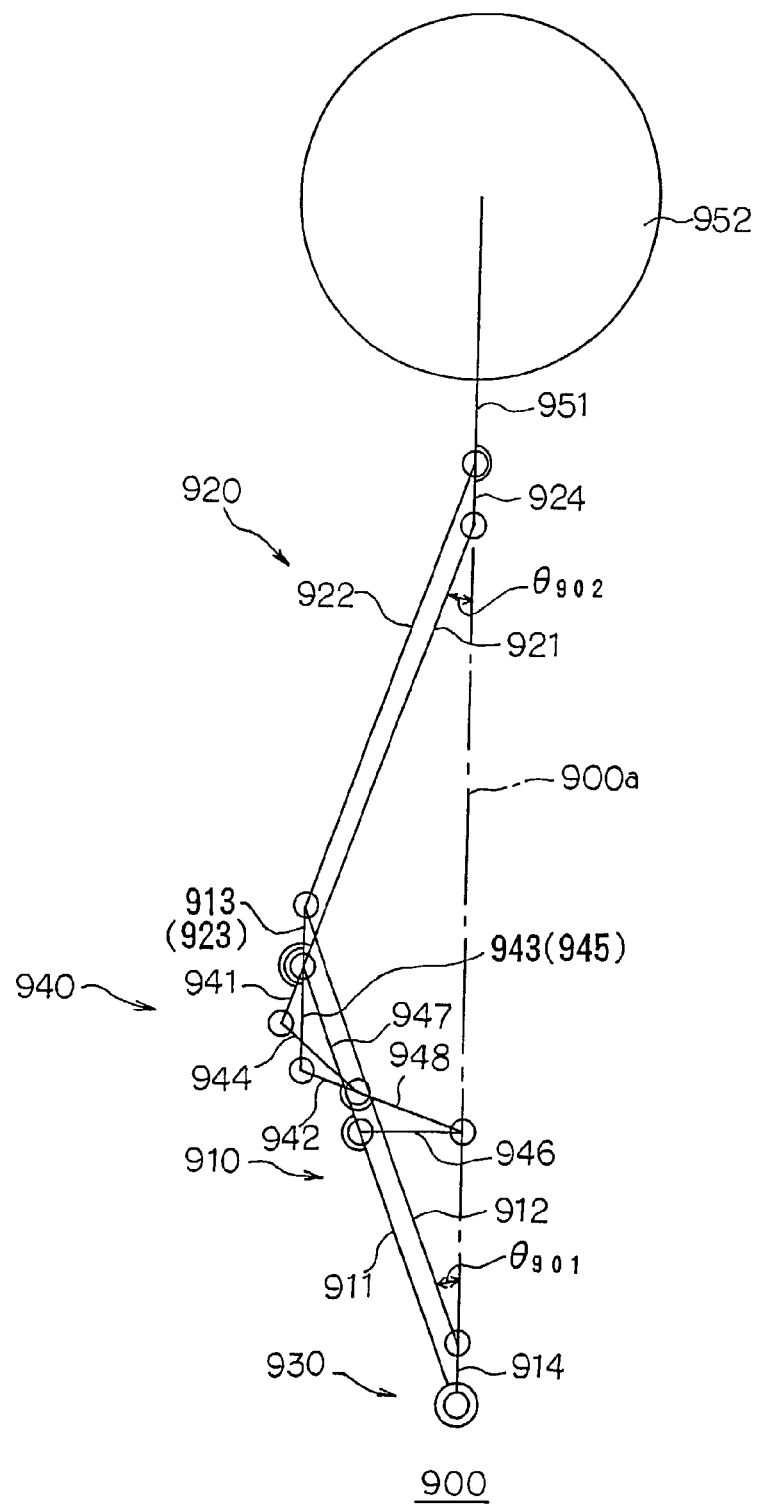
FIG. 20 is a conventional robot arm mechanism.

The quadric crank chain constituting the first arm link mechanism 110 of the first embodiment of the robot arm mechanism 100 does not take on a flattened out condition, in which the third angle θ103 formed by a line 114a passing through the fourth arm link 114 of the first arm link mechanism 110 with the reference line 100a in the first rotation direction 130a is, for example, substantially zero degree as shown in FIG. 4(a), which the quadric crank chain constituting the first arm link mechanism 910 of the conventional robot arm mechanism 900 takes on when the conventional robot arm mechanism 900 assumes, for example, an extended position shown in FIG. 20, because of the fact that the robot arm driving mechanism 130 is operated to rotate the first arm link 111 of the first arm link mechanism 110 and the fourth arm link 114 of the first arm link mechanism 110 around the rotation axis while maintaining the first angle θ101 formed by a line 111a passing through the first arm link 111 of the first arm link mechanism 110 with the reference line 100a less than a third angle θ103 formed by a line 114a passing through the fourth arm link 114 of the first arm link mechanism 110 with the reference line 100a in the first rotation direction 130a as best shown in FIG. 4(b), thereby preventing the first quadric crank chain constituting the first arm link mechanism 110 from being flattened out while the first arm link mechanism 110 and the second arm link mechanism 120 are extended. This means that the third arm link 113 and the fourth arm link 114 of the first arm link mechanism 110 are kept forward in the first rotation direction 130a with respect to the reference line 100a in comparison with the third arm link 913 and the fourth arm link 914 of the first arm link mechanism 910 of the conventional robot arm mechanism 900.

A force F101, for example, substantially perpendicular to the reference line 100a is exerted on the quadric crank chain constituting the first arm link mechanism 110 of the robot arm mechanism 100 on the supposition that the quadric crank chain constituting the first arm link mechanism 110 of the robot arm mechanism 100 should take on a flattened out condition, which the quadric crank chain constituting the first arm link mechanism 910 of the conventional robot arm mechanism 900 takes on when the conventional robot arm mechanism 900 assumes, for example, an extended position as shown in FIG. 20, the force F101 exerted on the first arm link mechanism 110 would be resolved into a component force F102 exerted on the first arm link 111 of the first arm link mechanism 110 and a component force F103 exerted on the third arm link 113 of the first arm link mechanism 110 as shown in FIG. 4(a). The same force F101 substantially perpendicular to the reference line 100a, on the other hand, is exerted on the quadric crank chain constituting the first arm link mechanism 110 of the first embodiment of the robot arm mechanism 100, the force F101 exerted on the first arm link mechanism 110 can be resolved into a component force F104 exerted on the first arm link 111 of the first arm link mechanism 110, which is smaller than the component force F 102, and a component force F105 exerted on the third arm link 113 of the first arm link mechanism 110, which is smaller than the component force F103, as shown in FIG. 4(b).

While it has been described in the above that the force F101 substantially perpendicular to the reference line 100a and exerted on the quadric crank chain constituting the first arm link mechanism 110 of the robot arm mechanism 100 are resolved into component forces F104, F105 respectively exerted on the first arm link 111 of the first arm link mechanism 110 and the third arm link 113 of the first arm link mechanism 110, which are reduced in comparison with component forces F102, F103 to be resolved from the force F101 exerted on the first arm link mechanism 910 and respectively exerted on the third arm link 911 of the first arm link mechanism 910 and the third arm link 913 of the first arm link mechanism 910 of the conventional robot arm mechanism 900, a force parallel with the reference line 100a exerted on the quadric crank chain constituting the first arm link mechanism 110 of the robot arm mechanism 100 may be resolved into component forces exerted on respective arm links constituting the first arm link mechanism 110, which are reduced in comparison with component forces to be resolved from the same force exerted on the first arm link mechanism 910 and exerted on respective arm links constituting the first arm link mechanism 910 of the conventional robot arm mechanism 900 in a similar manner as described above.

From the foregoing descriptions, it is to be understood that the first arm link mechanism 110 of the robot arm mechanism 100 according to the present invention, in which component forces resolved from a force exerted on the first arm link mechanism 110 and exerted on respective arm links constituting the first arm link mechanism 110 are reduced in comparison with component forces to be resolved from the same force exerted on the first arm link mechanism 910 and exerted on respective arm links of the first arm link mechanism 910 of the conventional robot arm mechanism 900, can be resistant to deformation due to an external force while the first arm link mechanism 110 and the second arm link mechanism 120 are extended, and accordingly enhance the operating accuracy of the robot arm mechanism 100 in comparison with the conventional robot arm mechanism 900.

Furthermore, the first arm link mechanism 110 of the robot arm mechanism 100 according to the present invention, in which the third arm link 113 and the fourth arm link 114 of the first arm link mechanism 110 are kept forward in the first rotation direction 130a with respect to the reference line 100a in comparison with the third arm link 913 and the fourth arm link 914 of the first arm link mechanism 910 of the conventional robot arm mechanism 900, is resistant to deformation in comparison with the third arm link 913 and the fourth arm link 914 of the first arm link mechanism 910 of the conventional robot arm mechanism 900 because of the fact that the dimensional errors of arm links constituting the first arm link mechanism 110 occurred due to, for example, a temperature change, machining error and assembly error, are spread through the arm links constituting the first arm link mechanism 110 in directions except for directions substantially perpendicular to and parallel with the reference line 100a, thereby enhancing the operating accuracy of the handling member 152 of the robot arm mechanism 100 while the first robot arm link mechanism 120 and the second robot arm link mechanism 120 are expanded.

According to the present invention, the third angle θ103 formed by a line 114a passing through the fourth arm link 114 of the first arm link mechanism 110 with the reference line 100a in the first rotation direction 130a may be any angle greater than the first angle θ101 formed by a line 111a passing through the first arm link 111 of the first arm link mechanism 110 with the reference line 100a as shown in FIG. 2. The third angle θ103 formed by a line 114a passing through the fourth arm link 114 of the first arm link mechanism 110 with the reference line 100a in the first rotation direction 130a may be set to, for example, an angle so that the first arm link 111 and the fourth arm link 114 of the first arm link mechanism 110 become substantially perpendicular to each other when the first arm link mechanism 110 and the second arm link mechanism 120 are extended to its their limits.

The longer an arm link is, the smaller the machining error of the arm link with respect to the total length of the arm link. In order to attain the object of the present invention, the third arm link 113 and the fourth arm link 114 of the first arm link mechanism 110 may be respectively replaced with a fifth arm link 115 longer than the third arm link 113 and a sixth arm link 116 substantially in parallel relationship with the fifth arm link 115 and longer than the fourth arm link 114 of the first arm link mechanism 110 of the first embodiment of the robot arm mechanism 100 as shown in FIG. 5.

Figure 5:
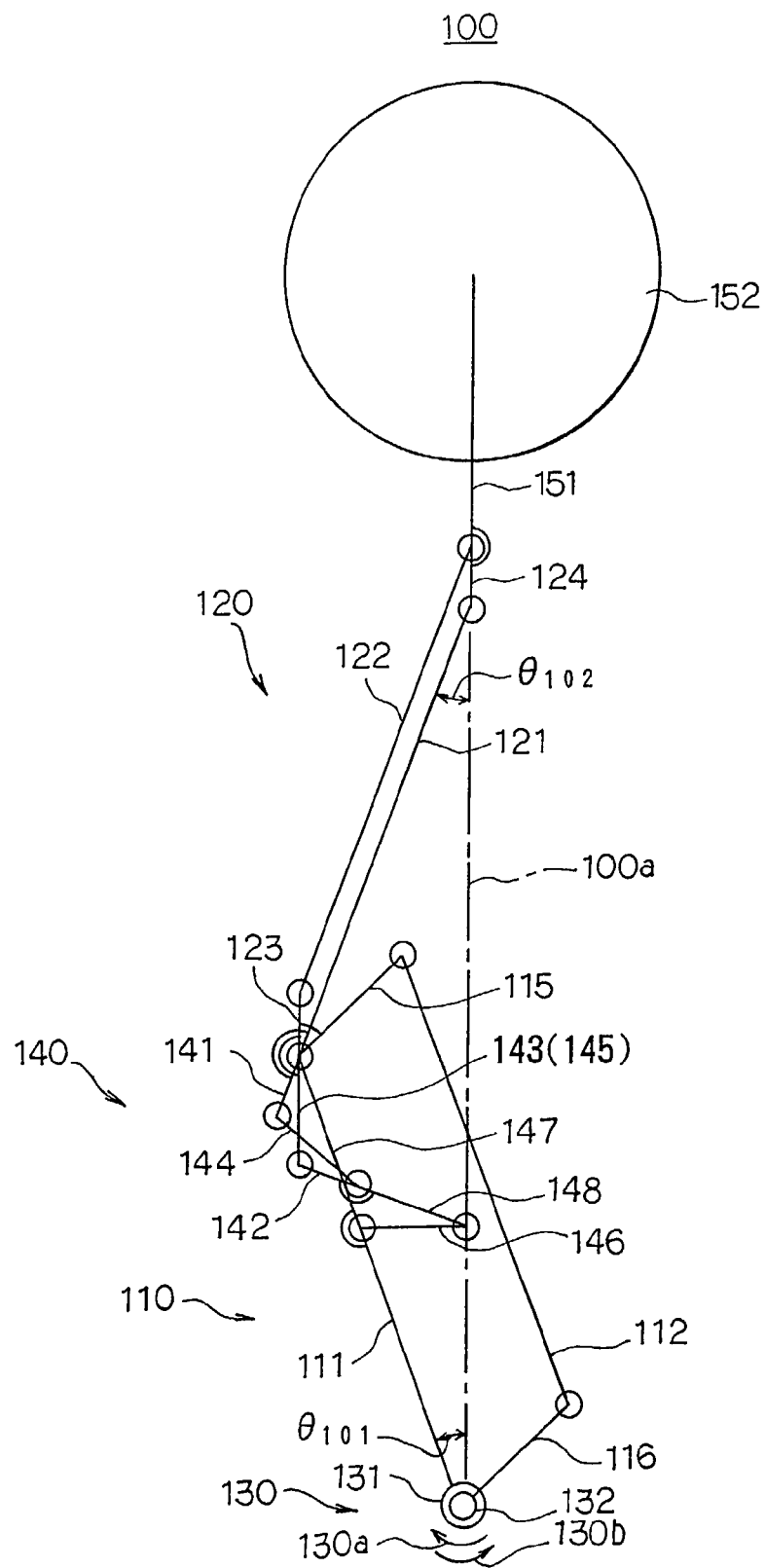
FIG. 5 is a skeleton view of an extended position of a modified first embodiment of the robot arm mechanism in which first and second arm links of a first arm link mechanism are longer than those of the robot arm mechanism shown in FIG. 1.

Referring to FIG. 5 of the drawings, there is shown a modified first embodiment of the robot arm mechanism 100. The modified first embodiment of the robot arm mechanism 100 is similar to the first embodiment of the robot arm mechanism 100 except for the fact that the third arm link 113 and the fourth arm link 114 of the first arm link mechanism 110 are respectively replaced with the fifth arm link 115 and the sixth arm link 116. The modified first embodiment of the robot arm mechanism 100, in which the third arm link 113 and the fourth arm link 114 of the first arm link mechanism 110 are respectively replaced with the fifth arm link 115 and the sixth arm link 116, is resistant to deformation due to the machining error and makes it possible for the handling member 152 to linearly move along the reference line 100*a* while the first arm link mechanism 110 and the second arm link mechanism 120 are expanded, in comparison with the robot arm mechanism 100 shown in FIG. 1, Furthermore, the modified first embodiment of the robot arm mechanism 100 comprising the fifth arm link 115 and the sixth arm link 116 substantially in parallel relationship with each other, and respectively longer than the third arm link 113 and the fourth arm link 114 in place of the third arm link 113 and the fourth arm link 114, may have arm links constituting the first arm link mechanism 110 thicker than those of the first embodiment of the robot arm mechanism 100 shown in FIG. 1, thereby enhancing the rigidity of the first arm link mechanism 110 and the robot arm driving mechanism 130 constituting modified first embodiment of the robot arm mechanism 100.

While it has been described in the above that the link retaining mechanism 140 consists of two quadric crank chains, the link retaining mechanism 140 may be constituted by any mechanism such as, for example, synchronous gears, pulley and belt mechanism publicly known in the art, as long as the link retaining mechanism 140 is operative to pivotably retain the first arm link mechanism 110 and the second arm link mechanism 120 respectively and keep the first angle θ101 formed by a line passing through the first arm link 111 of the first arm link mechanism 110 with the reference line 100*a* equal to the second angle θ102 formed by a line passing through the first arm link 121 of the second arm link mechanism 120 with the reference line 100*a*.

While it has been described in the above that the handling member 152 is fixedly connected with the second end portion of the robot arm member 151, the handling member 152 may be fixedly connected with the second arm link mechanism 120 without the handling member 152 in a manner that the handling member 152 is fixedly connected with, for example, one of the arm links constituting the second arm link mechanism 120 such as, for example, the first, second, and fourth arm link 121, 122, and 124.

From the foregoing description, it is to be understood that the first embodiment of the robot arm mechanism 100 according to the present invention is resistant to deformation while the first arm link mechanism 110 and the second arm link mechanism 120 are extended, and accordingly enhancing the operating accuracy of the robot arm mechanism 100 in comparison with the conventional robot arm mechanism.

Referring to FIGS. 6 to 10 of the drawings, there is shown a second preferred embodiment of the robot arm mechanism 200 according to the present invention.

Figure 6:
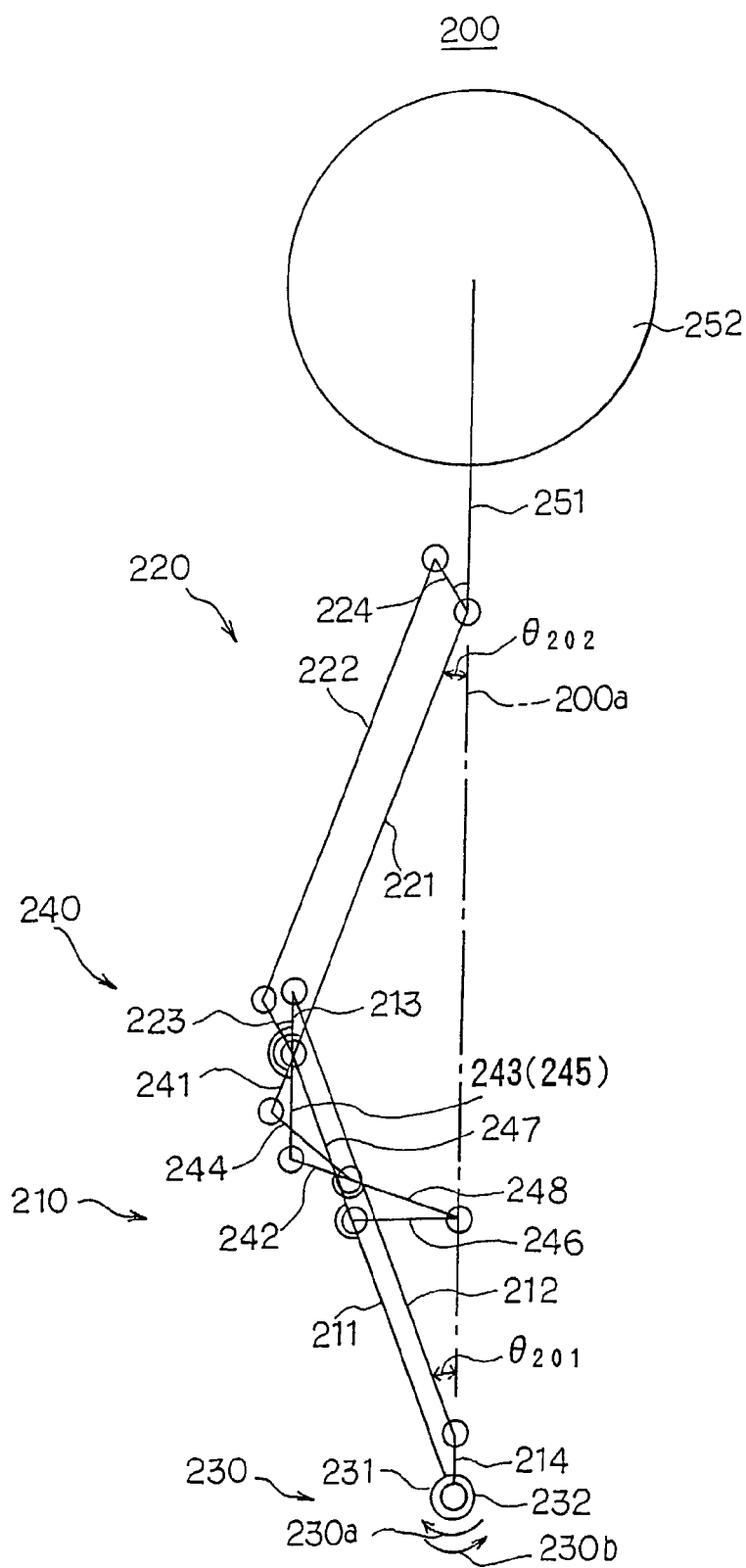
FIG. 6 is a skeleton view of an extended position of a second preferred embodiment of the robot arm mechanism according to the present invention.

The second embodiment of the robot arm mechanism 200 is shown in FIG. 6 as comprising a first arm link mechanism 210, a second arm link mechanism 220, a robot arm driving mechanism 230, a link retaining mechanism 240, a robot arm member 251, and a handling member 252.

The first arm link mechanism 210 consists of a first quadric crank chain comprising a first arm link 211, a second arm link 212, a third arm link 213, and a fourth arm link 214. The second arm link 212 is substantially in parallel relationship with the first arm link 211. The fourth arm link 214 is substantially in parallel relationship with the third arm link 213.

The second arm link mechanism 220 consists of a second quadric crank chain comprising a first arm link 221, a second arm link 222 substantially in parallel relationship with the first arm link 221, a third arm link 223, and a fourth arm link 224 substantially in parallel relationship with the third arm link 223, the second arm link mechanism 220 is pivotably connected with the first arm link mechanism 210. The second arm link 222 is substantially in parallel relationship with the first arm link 221. The fourth arm link 224 is substantially in parallel relationship with the third arm link 223. The second arm link mechanism 220 is pivotably connected with the first arm link mechanism 210.

The first arm link mechanism 210 and the second arm link mechanism 220 will be described in detail, hereinlater.

The first arm link 211 of the first arm link mechanism 210 has a driving end portion and a supporting end portion. The second arm link 212, the third arm link 213, and the fourth arm link 214 of the first arm link mechanism 210 respectively have first and second end portions. The first and third arm links 211, 213 of the first arm link mechanism 210 are pivotably connected with each other at the supporting end portion of the first arm link 211 of the first arm link mechanism 210 and the first end portion of the third arm link 213 of the first arm link mechanism 210. The third and second arm links 213, 212 of the first arm link mechanism 210 are pivotably connected with each other at the second end portion of the third arm link 213 of the first arm link mechanism 210 and the first end portion of the second arm link 212 of the first arm link mechanism 210. The second and fourth arm links 212, 214 of the first arm link mechanism 210 are pivotably connected with each other at the second end portion of the second arm link 212 of the first arm link mechanism 210 and the first end portion of the fourth arm link 214 of the first arm link mechanism 210. The fourth and first arm links 214, 211 of the first arm link mechanism 210 are pivotably connected with each other at the second end portion of the fourth arm link 214 of the first arm link mechanism 210 and the driving end portion of the first arm link 211 of the first arm link mechanism 210.

Similarly, the first arm link 221 of the second arm link mechanism 220 has a supporting end portion and a handling end portion. The second arm link 222, the third arm link 223, and the fourth arm link 224 of the second arm link mechanism 220 respectively have first and second end portions. The first and third arm links 221, 223 of the second arm link mechanism 220 are pivotably connected with each other at the supporting end portion of the first arm link 221 of the second arm link mechanism 220 and the first end portion of the third arm link 223 of the second arm link mechanism 220. The third and second arm links 223, 222 of the second arm link mechanism 220 are pivotably connected with each other at the second end portion of the third arm link 223 of the second arm link mechanism 220 and the first end portion of the second arm link 222 of the second arm link mechanism 220. The second and fourth arm links 222, 224 of the second arm link mechanism 220 are pivotably connected with each other at the second end portion of the second arm link 222 of the second arm link mechanism 220 and the first end portion of the fourth arm link 224 of the second arm link mechanism 220. The fourth and first arm links 224, 221 of the second arm link mechanism 220 are pivotably connected with each other at the second end portion of the fourth arm link 224 of the second arm link mechanism 220 and the handling end portion of the first arm link 221 of the second arm link mechanism 220. The third arm link 223 of the second arm link mechanism 220 is integrally formed with and fixedly connected with the third arm link 213 of the first arm link mechanism 210.

The link retaining mechanism 240 has a reference line 200*a* as shown in FIG. 2. The link retaining mechanism 240 is adapted to pivotably retain the first arm link mechanism 210 and the second arm link mechanism 220 respectively and keep a first angle substantially equal to a second angle, wherein the first angle θ201 is intended to mean an angle formed by a line passing through the second arm link 212 of the first arm link mechanism 210 with the reference line 200a, and the second angle θ202 is intended to mean an angle formed by a line passing through the first arm link 221 of the second arm link mechanism 220 with the reference line 200a. The first angle θ201 ranges from 0 to less than 180 degrees.

The link retaining mechanism 240 will be described in detail, hereinlater.

It is assumed that the link retaining mechanism 240 is operative to pivotably retain the first arm link 211 of the first arm link mechanism 210 and the first arm link 221 of the second arm link mechanism 220 respectively at the supporting end portions of the first arm link 211 of the first arm link mechanism 210 and the first arm link 221 of the second arm link mechanism 220 and keep the first angle substantially equal to the second angle.

The link retaining mechanism 240 comprises a first joint cross linkage. The first joint cross linkage is a quadric crank chain and includes a first short link 241, a first long link 244, a second short link 242, and a second long link 243.

The first short link 241 has first and second end portions. The first long link 244 has first and second end portions and longer than the first short link 241 of the first joint cross linkage of the link retaining mechanism 240. The first short and long links 241, 244 of the first joint cross linkage of the link retaining mechanism 240 are pivotably connected with each other at the second end portion of the first short link 241 of the first joint cross linkage of the link retaining mechanism 240 and the first end portion of the first long link 244 of the first joint cross linkage of the link retaining mechanism 240. The second short link 242 has first and second end portions and substantially equal in length to the first short link 241 of the first joint cross linkage of the link retaining mechanism 240. The first long link 244 of the first joint cross linkage of the link retaining mechanism 240 and the second short link 242 of the first joint cross linkage of the link retaining mechanism 240 are pivotably connected with each other at the second end portion of the first long link 244 of the first joint cross linkage of the link retaining mechanism 240 and the first end portion of the second short link 242 of the first joint cross linkage of the link retaining mechanism 240. The second long link 243 has first and second end portions and substantially equal in length to the first long link 244 of the first joint cross linkage of the link retaining mechanism 240. The second short and long links 242, 243 of the first joint cross linkage of the link retaining mechanism 240 are pivotably connected with each other at the second end portion of the second short link 242 of the first joint cross linkage of the link retaining mechanism 240 and the first end portion of the second long link 243 of the first joint cross linkage of the link retaining mechanism 240. The second long link 243 of the first joint cross linkage of the link retaining mechanism 240 and the first short link 241 of the first joint cross linkage of the link retaining mechanism 240 are pivotably connected with each other at the second end portion of the second long link 243 of the first joint cross linkage of the link retaining mechanism 240 and the first end portion of the first short link 241 of the first joint cross linkage of the link retaining mechanism 240 under the state that the second long link 243 of the first joint cross linkage of the link retaining mechanism 240 is crossed with the first long link 244 of the first joint cross linkage of the link retaining mechanism 240. The first short link 241 of the first joint cross linkage of the link retaining mechanism 240 is integrally formed with and fixedly connected with the first arm link 221 of the second arm link mechanism 220. The second long link 243 of the first joint cross linkage of the link retaining mechanism 240 are integrally formed with and fixedly connected with the third arm link 213 of the first arm link mechanism 210 and the third arm link 223 of the second arm link mechanism 220.

The link retaining mechanism 240 further comprises a second joint cross linkage. The second joint cross linkage is a quadric crank chain and includes a first short link 245, a first long link 248, a second short link 246, and a second long link 247.

The first short link 245 has first and second end portions. The first short link 245 of the second joint cross linkage of the link retaining mechanism 240 is substantially equal in length to the second long link 243 of the first joint cross linkage of the link retaining mechanism 240, and integrally formed with and fixedly connected with third arm link 213 of the first arm link mechanism 210 and the third arm link 223 of the second arm link mechanism 220. The first long link 248 has first and second end portions and longer than the first short link 245 of the second joint cross linkage of the link retaining mechanism 240. The first short and long links 245, 248 of the second joint cross linkage of the link retaining mechanism 240 are pivotably connected with each other at the second end portion of the first short link 245 of the second joint cross linkage of the link retaining mechanism 240 and the first end portion of the first long link 248 of the second joint cross linkage of the link retaining mechanism 240. The second short link 242 of the first joint cross linkage of the link retaining mechanism 240 is integrally formed with and fixedly connected with the first long link 248 of the second joint cross linkage of the link retaining mechanism 240. The second short link 246 having first and second end portions and substantially equal in length to the first short link 245 of the second joint cross linkage of the link retaining mechanism 240, the first long link 248 of the second joint cross linkage of the link retaining mechanism 240 and the second short link 246 of the second joint cross linkage of the link retaining mechanism 240 are pivotably connected with each other at the second end portion of the first long link 248 of the second joint cross linkage of the link retaining mechanism 240 and the first end portion of the second short link 246 of the second joint cross linkage of the link retaining mechanism 240. The second long link 247 has first and second end portions and substantially equal in length to the first long link 248 of the second joint cross linkage of the link retaining mechanism 240. The second short and long links 246, 247 of the second joint cross linkage of the link retaining mechanism 240 are pivotably connected with each other at the second end portion of the second short link 246 of the second joint cross linkage of the link retaining mechanism 240 and the first end portion of the second long link 247 of the second joint cross linkage of the link retaining mechanism 240. The second long link 247 of the second joint cross linkage of the link retaining mechanism 240 and the first short link 245 of the second joint cross linkage of the link retaining mechanism 240 are pivotably connected with each other at the second end portion of the second long link 247 of the second joint cross linkage of the link retaining mechanism 240 and the first end portion of the first short link 245 of the second joint cross linkage of the link retaining mechanism 240 under the state that the second long link 247 of the second joint cross linkage of the link retaining mechanism 240 is crossed with the first long link 248 of the second joint cross linkage of the link retaining mechanism 240. The second long link 247 of the second joint cross linkage of the link retaining mechanism 240 is integrally formed with and fixedly connected with the first arm link 211 of the first arm link mechanism 210.

The robot arm member 251 has first and second end portions. The first end portion of the robot arm member 251 is integrally formed with and fixedly connected with the fourth arm link 224 of the second arm link mechanism 220. The handling member 252 is fixedly connected with the second end portion of the robot arm member 251. The handling member 252 is adapted to support and handle an object. According to the present invention, the handling member 252 may be adapted to, for example, grip the object.

The robot arm driving mechanism 230 comprises a first driving shaft 231 and a second driving shaft 232. The first driving shaft 231 is adapted to rotate the first arm link 211 of the first arm link mechanism 210 around a rotation axis in any one of two rotation directions consisting of a first rotation direction 230a in which the first arm link 221 of the second arm link mechanism 220 rotates in a rotation direction 230b opposite to the first rotation direction 230a, and the first arm link mechanism 210 and the second arm link mechanism 220 are extended, and a second rotation direction 230b in which the first arm link 221 of the second arm link mechanism 220 rotates in a rotation direction 230a opposite to the second rotation direction 230b, and the first arm link mechanism 210 and the second arm link mechanism 220 are contracted. The second driving shaft 232 is adapted to rotate the fourth arm link 214 of the first arm link mechanism 210 around the rotation axis in any one of two rotation directions consisting of the first rotation direction 230a and the second rotation direction 230b.

Figure 7:
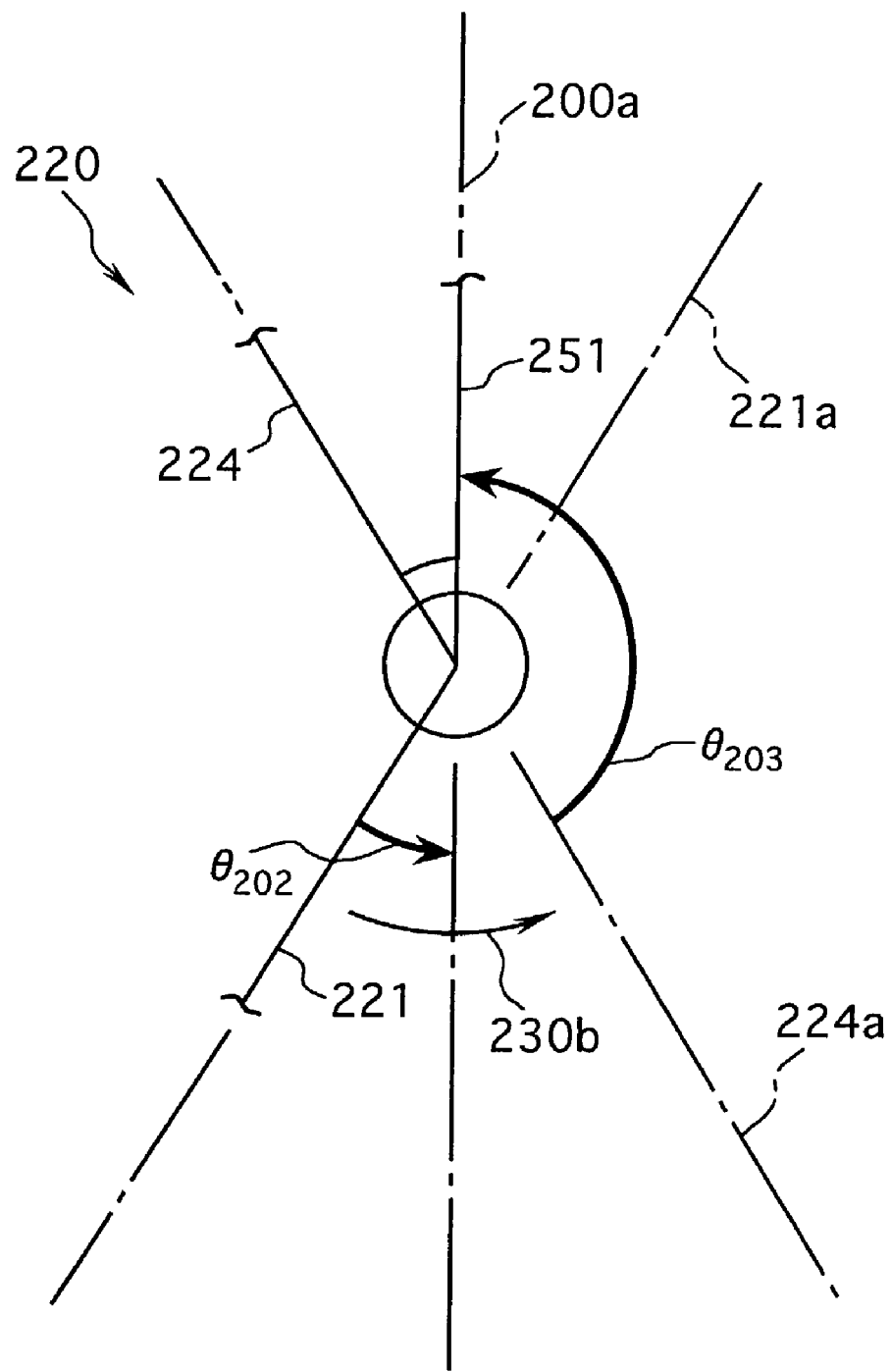
FIG. 7 is an enlarged fragmentary skeleton view of the robot arm mechanism shown in FIG. 6 to be used for explaining the principle of the robot arm mechanism according to the present invention.

Furthermore, the robot arm driving mechanism 230 is adapted to rotate the first arm link 211 of the first arm link mechanism 210 around the rotation axis in the first rotation direction 230a, and the fourth arm link 214 of the first arm link mechanism 210 around the rotation axis in any one of two directions consisting of the first rotation direction 230a and the second rotation direction 230b while maintaining the second angle θ202 formed by a line 221a passing through the first arm link 221 of the second arm link mechanism 220 with the reference line 200a less than a third angle θ203 formed by a line 224a passing through the fourth arm link 224 of the second arm link mechanism 220 with the reference line 200a in the rotation direction 230b opposite to the first rotation direction 230a as shown in FIG. 7. The third angle θ203 ranges from 0 to less than 180 degrees.

The operation of the second embodiment of the robot arm mechanism 200 will be described, hereinlater.

The first driving shaft 231 is operated to rotate the first arm link 211 of the first arm link mechanism 210 around the rotation axis in, for example, the first rotation direction 230a, the first arm link 221 of the second arm link mechanism 220 is then operated to rotate around the rotation axis in a rotation direction 230b opposite to the first rotation direction 230a, and the first arm link mechanism 210 and the second arm link mechanism 220 are operated to be extended. The first driving shaft 231, on the other hand, is operated to rotate the first arm link 211 of the first arm link mechanism 210 around a rotation axis in, for example, the second rotation direction 230b, the first arm link 221 of the second arm link mechanism 220 is then operated to rotate around the rotation axis in a rotation direction 230a opposite to the second rotation direction 230b, and the first arm link mechanism 210 and the second arm link mechanism 220 are contracted. The first driving shaft 231 is operated to rotate the first arm link 211 of the first arm link mechanism 210 around the rotation axis to change the first angle θ201, and the first arm link 211 of the first arm link mechanism 210 is operated to rotate around the rotation axis to change the second angle θ202 formed by a line 221a passing through the first arm link 221 of the second arm link mechanism 220 with the reference line 200a wherein the first angle θ201 is substantially equal to the second angle θ202 as described earlier.

Figure 8:
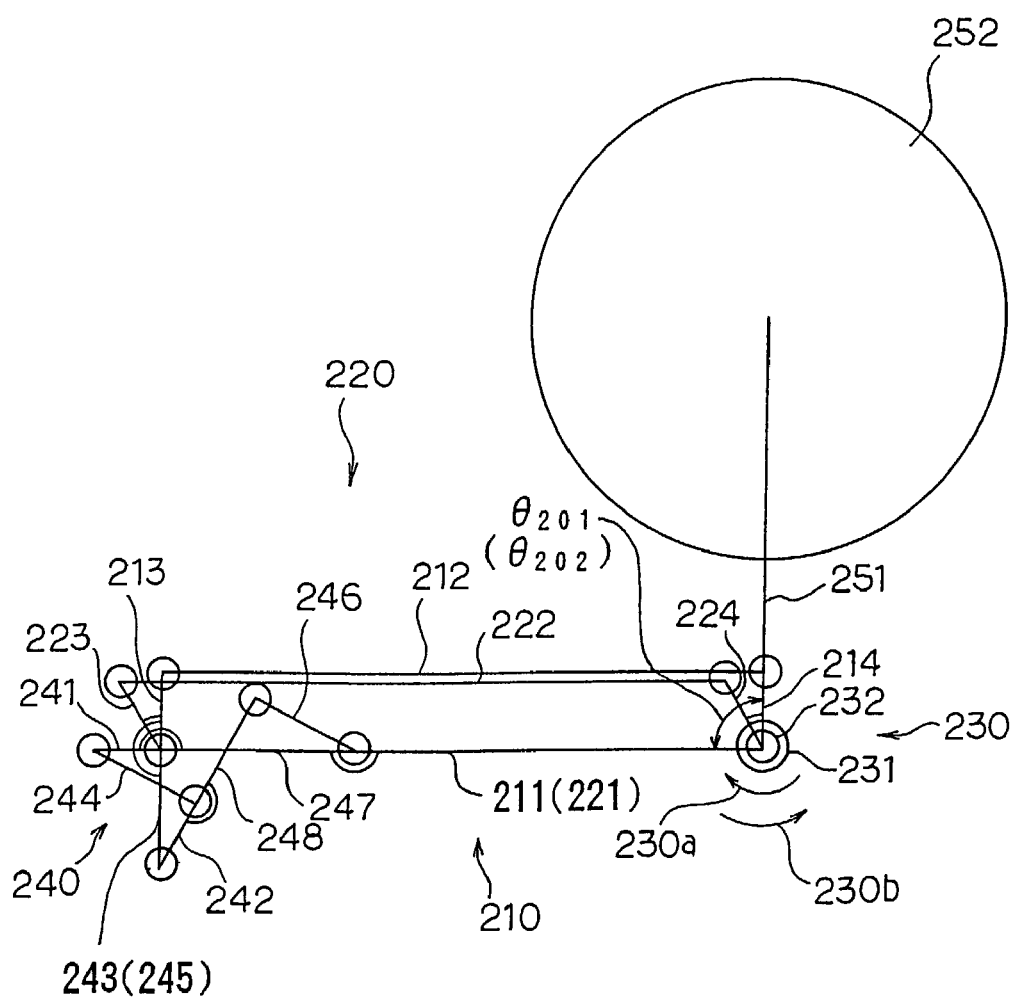
FIG. 8 is a skeleton view of a contracted position of the robot arm mechanism shown in FIG. 6.
Figure 9:
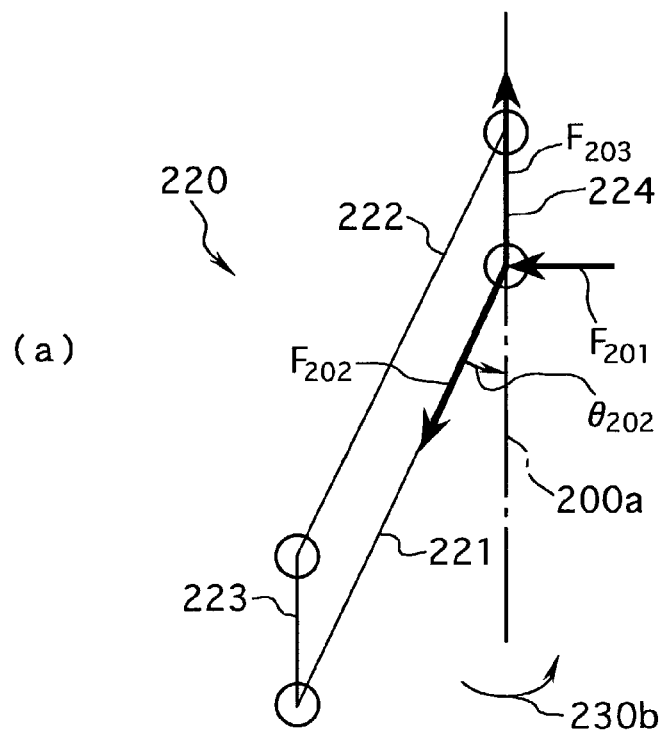
FIG. 9(a) is an enlarged fragmentary skeleton view of one condition of the conventional robot arm mechanism to be used for explaining a drawback of the conventional robot arm mechanism.
FIG. 9(b) is an enlarged fragmentary skeleton view of one condition of the robot arm mechanism shown in FIG. 6 to be used for explaining an advantage of the robot arm mechanism according to the present invention.
Figure 9:
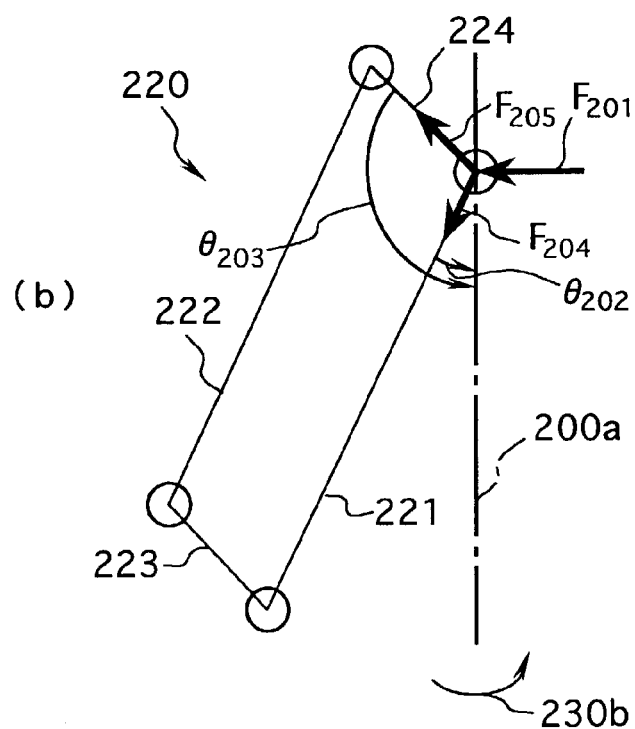

This means that the first driving shaft 231 may rotate the first arm link 211 of the first arm link mechanism 210 around the rotation axis in the first rotation direction 230a, and the first arm link 221 of the second arm link mechanism 220 may rotate around the rotation axis in a rotation direction 230b opposite to the first rotation direction 230a until the first arm link mechanism 210 and the second arm link mechanism 220 assumes an extended position as shown in FIG. 6. The first driving shaft 231, on the other hand, may rotate the first arm link 211 of the first arm link mechanism 210 around the rotation axis in the second rotation direction 230b, and the first arm link 221 of the second arm link mechanism 220 may rotate around the rotation axis in a rotation direction 230a opposite to the second rotation direction 230b, and the first arm link mechanism 210 and the second arm link mechanism 220 are contracted until the first arm link mechanism 210 and the second arm link mechanism 220 assumes a contracted position as shown in FIG. 8. Alternatively, the first arm link mechanism 210 and the second arm link mechanism 220 may further be contracted beyond the contracted position shown in FIG. 8.

The first driving shaft 231 and the second driving shaft 232 may respectively rotate the first arm link 211 of the first arm link mechanism 210 and the fourth arm link 214 of the first arm link mechanism 210 around the rotation axis in the same rotation direction, for example, the first rotation direction 230a or the second rotation direction 230b for the same amount of rotation angle, the robot arm mechanism 200 as a whole, including the first arm link mechanism 210 and the second arm link mechanism 220, is then rotated around the rotation axis in the rotation direction.

As described hereinbefore, the robot arm driving mechanism 230 is operated to rotate the first arm link 211 of the first arm link mechanism 210 around the rotation axis in the first rotation direction 230a, and the fourth arm link 214 of the first arm link mechanism 210 around the rotation axis in any one of two directions consisting of the first rotation direction 230a and the second rotation direction 230b while maintaining the second angle θ202 formed by the line 221a passing through the first arm link 221 of the second arm link mechanism 220 with the reference line 200a less than the third angle θ203 formed by the line 224a passing through the fourth arm link 224 of the second arm link mechanism 220 with the reference line 200a in the rotation direction 230b opposite to the first rotation direction 230a as shown in FIG. 7 wherein the third angle θ203 ranges from 0 to less than 180 degrees. This means that the second embodiment of the robot arm mechanism 200, in which the third angle θ203 formed by the line 224a passing through the fourth arm link 224 of the second arm link mechanism 220 with the reference line 200a in the rotation direction 230b opposite to the first rotation direction 230a is maintained greater than the second angle θ202 formed by the line 221a passing through the first arm link 221 of the second arm link mechanism 220 with the reference line 200a (see FIG. 7) while the first arm link mechanism 210 and the second arm link mechanism 220 are extended, can prevent the quadric crank chain constituting the second arm link mechanism 220 from being flattened out while the first arm link mechanism 210 and the second arm link mechanism 220 are extended, thereby improving resistance to deformation while the first arm link mechanism 210 and the second arm link mechanism 220 are extended as shown in FIG. 6, in comparison with the conventional robot arm mechanism 900 shown in FIG. 20 for the reason described hereinafter.

The quadric crank chain constituting the second arm link mechanism 220 of the second embodiment of the robot arm mechanism 200 does not take on a flattened out condition, in which the third angle θ203 formed by the line 224a passing through the fourth arm link 224 of the second arm link mechanism 220 with the reference line 200a in the rotation direction 230b opposite to the first rotation direction 230a is, for example, substantially zero degree as shown in FIG. 9(a), which the quadric crank chain constituting the second arm link mechanism 920 of the conventional robot arm mechanism 900 takes on when the conventional robot arm mechanism 900 assumes, for example, an extended position shown in FIG. 20, because of the fact that the robot arm driving mechanism 230 is operated to rotate the first arm link 211 of the first arm link mechanism 210 and the fourth arm link 214 of the first arm link mechanism 210 around the rotation axis while maintaining the second angle θ202 formed by the line 221a passing through the first arm link 221 of the second arm link mechanism 220 with the reference line 200a less than the third angle θ203 formed by the line 224a passing through the fourth arm link 224 of the second arm link mechanism 220 with the reference line 200a in the rotation direction 230b opposite to the first rotation direction 230a as best shown in FIG. 9(b), thereby preventing the first quadric crank chain constituting the second arm link mechanism 220 from being flattened out while the first arm link mechanism 210 and the second arm link mechanism 220 are extended. This means that the third arm link 223 and the fourth arm link 224 of the second arm link mechanism 220 are kept forward in the rotation direction 230b opposite to the first rotation direction 230a with respect to the reference line 200a in comparison with the third arm link 923 and the fourth arm link 924 of the second arm link mechanism 920 of the conventional robot arm mechanism 900.

A force F201, for example, substantially perpendicular to the reference line 200a is exerted on the quadric crank chain constituting the second arm link mechanism 220 of the robot arm mechanism 200 on the supposition that the quadric crank chain constituting the second arm link mechanism 220 of the robot arm mechanism 200 should take on a flattened out condition, which the quadric crank chain constituting the second arm link mechanism 920 of the conventional robot arm mechanism 900 takes on when the conventional robot arm mechanism 900 assumes, for example, an extended position shown in FIG. 20, the force F201 exerted on the second arm link mechanism 220 can be resolved into a component force F202 exerted on the first arm link 221 of the second arm link mechanism 220 and a component force F203 exerted on the fourth arm link 224 of the second arm link mechanism 220 as shown in FIG. 9(a). The same force F201 substantially perpendicular to the reference line 200a, on the other hand, is exerted on the quadric crank chain constituting the second arm link mechanism 220 of the second embodiment of the robot arm mechanism 200, the force F201 exerted on the second arm link mechanism 220 can be resolved into a component force F204 exerted on the first arm link 221 of the second arm link mechanism 220, which is smaller than the component force F202, and a component force F205 exerted on the fourth arm link 224 of the second arm link mechanism 220, which is smaller than the component force F203, as shown in FIG. 4(b).

While it has been described in the above that the force F201 substantially perpendicular to the reference line 100a and exerted on the quadric crank chain constituting the second arm link mechanism 220 of the robot arm mechanism 200 are resolved into component forces F204, F205 respectively exerted on the first arm link 221 of second arm link mechanism 220 and the fourth arm link 224 of the second arm link mechanism 220, which are reduced in comparison with component forces F202, F203 to be resolved from the force F201 exerted on the second arm link mechanism 920 and respectively exerted on the first arm link 921 of the second arm link mechanism 920 and the fourth arm link 924 of the second arm link mechanism 920 of the conventional robot arm mechanism 900, a force parallel with the reference line 200a exerted on the quadric crank chain constituting the second arm link mechanism 220 of the robot arm mechanism 200 may be resolved into component forces exerted on respective arm links constituting the second arm link mechanism 220, which are reduced in comparison with component forces to be resolved from the same force exerted on the second arm link mechanism 920 and exerted on respective arm links constituting the second arm link mechanism 920 of the conventional robot arm mechanism 900 in a similar manner as described above.

While it has been described in the above that the handling member 252 is fixedly connected with the second end portion of the robot arm member 251, the handling member 252 may be fixedly connected with the second arm link mechanism 220 without the handling member 252 in a manner that the handling member 252 is fixedly connected with, for example, one of the arm links constituting the second arm link mechanism 120 such as, for example, the first, second, and fourth arm link 221, 222, and 224.

From the foregoing descriptions, it is to be understood that the second arm link mechanism 220 of the robot arm mechanism 200 according to the present invention, in which component forces resolved from a force exerted on the second arm link mechanism 220 and exerted on respective arm links constituting the second arm link mechanism 220 are reduced in comparison with component forces to be resolved from the same force exerted on the second arm link mechanism 920 and exerted on respective arm links of the second arm link mechanism 920 of the conventional robot arm mechanism 900, can be resistant to deformation due to an external force while the first arm link mechanism 210 and the second arm link mechanism 220 are extended, and accordingly enhance the operating accuracy of the robot arm mechanism 200 in comparison with the conventional robot arm mechanism 900.

Furthermore, the second arm link mechanism 220 of the robot arm mechanism 200 according to the present invention, in which the third arm link 223 and the fourth arm link 224 of the second arm link mechanism 220 are kept forward in the rotation direction 230b opposite to the first rotation direction 230a with respect to the reference line 200a in comparison with the third arm link 923 and the fourth arm link 924 of the second arm link mechanism 920 of the conventional robot arm mechanism 900, is resistant to deformation in comparison with the third arm link 923 and the fourth arm link 924 of the second arm link mechanism 920 of the conventional robot arm mechanism 900 because of the fact that the dimensional errors of arm links constituting the second arm link mechanism 220 occurred due to, for example, a temperature change, machining error and assembly error, are spread through the arm links constituting the second arm link mechanism 220 in directions except for directions substantially perpendicular to and parallel with the reference line 100a, thereby enhancing the operating accuracy of the handling member 252 of the robot arm mechanism 200 while the first robot arm link mechanism 220 and the second robot arm link mechanism 220 are expanded.

According to the present invention, the third angle θ203 formed by the line 224a passing through the fourth arm link 224 of the second arm link mechanism 220 with the reference line 200a in the rotation direction 230b opposite to the first rotation direction 230a may be any angle greater than the second angle θ202 formed by the line 221a passing through the first arm link 221 of the second arm link mechanism 220 with the reference line 200a as shown in FIG. 7. The third angle θ203 formed by the line 224a passing through the fourth arm link 224 of the second arm link mechanism 220 with the reference line 200a in the rotation direction 230b opposite to the first rotation direction 230a may be set to, for example, an angle so that the first arm link 221 and the fourth arm link 224 of the second arm link mechanism 220 become substantially perpendicular to each other when the first arm link mechanism 210 and the second arm link mechanism 220 are extended to its their limits.

The longer an arm link is, the smaller the machining error of the arm link with respect to the total length of the arm link. In order to attain the object of the present invention, the third arm link 223 and the fourth arm link 224 of the second arm link mechanism 220 may be respectively replaced with a fifth arm link 225 longer than the third arm link 223 and a sixth arm link 226 substantially in parallel relationship with the fifth arm link 225 and longer than the fourth arm link 224 of the second arm link mechanism 220 of the second embodiment of the robot arm mechanism 200 as shown in FIG. 10.

Figure 10:
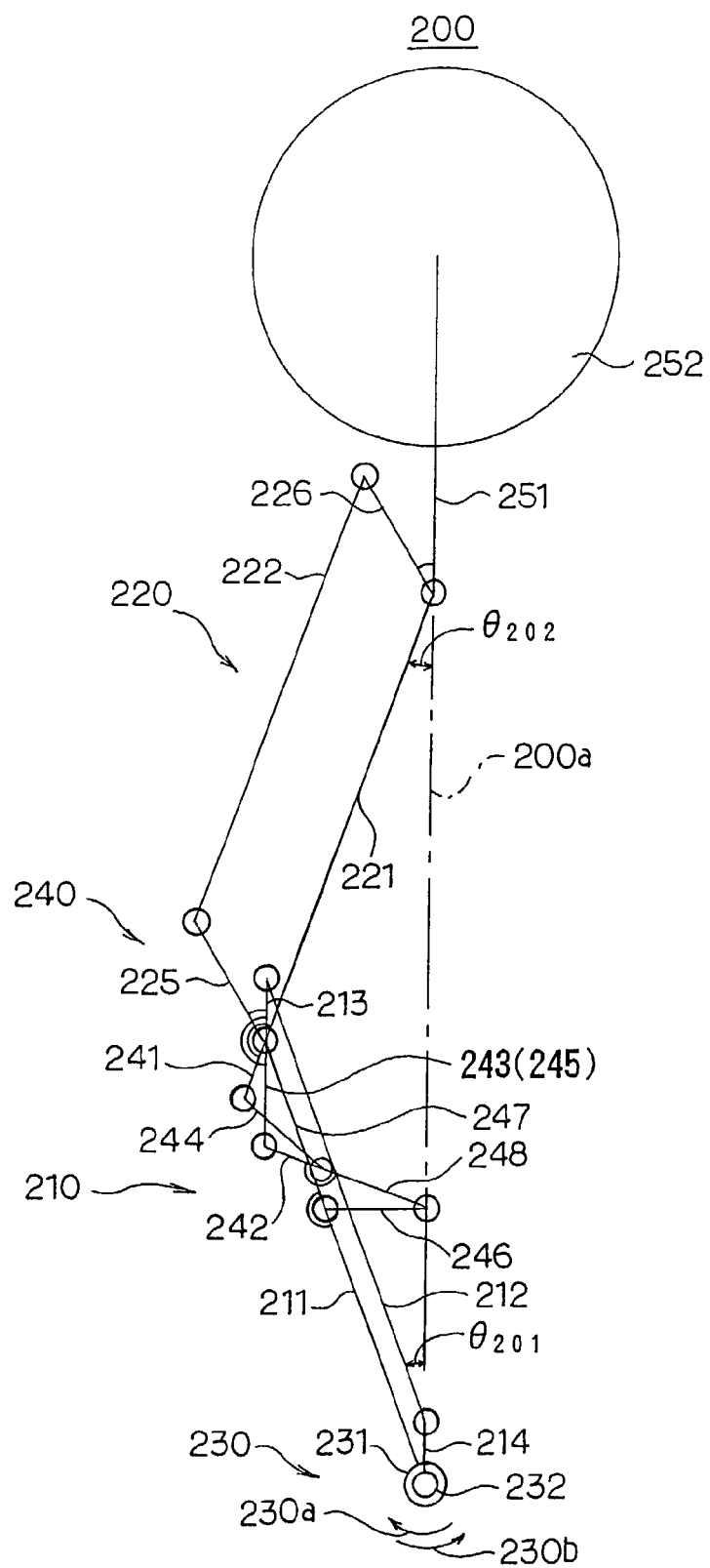
FIG 10 is a skeleton view of an extended position of the second embodiment of the robot arm mechanism in which first and second arm links of a first arm link mechanism are longer than those of the robot arm mechanism shown in FIG 6.

Referring to FIG. 10 of the drawings, there is shown a modified second embodiment of the robot arm mechanism 200. The modified second embodiment of the robot arm mechanism 200 is similar to the second embodiment of the robot arm mechanism except for the fact that the third arm link 223 and the fourth arm link 224 of the second arm link mechanism 220 are respectively replaced with the fifth arm link 225 and the sixth arm link 226. The modified second embodiment of the robot arm mechanism 200, in which the third arm link 223 and the fourth arm link 224 of the second arm link mechanism 220 are respectively replaced with the fifth arm link 225 and the sixth arm link 226, is resistant to deformation due to the machining error and makes it possible for the handling member 152 to linearly move along the reference line 200a while the first arm link mechanism 210 and the second arm link mechanism 220 are expanded, in comparison with the robot arm mechanism 200 shown in FIG. 6.

Furthermore, the modified second embodiment of the robot arm mechanism 200, comprising the fifth arm link 225 and the sixth arm link 226 substantially in parallel relationship with each other, and respectively longer than the third arm link 223 and the fourth arm link 224 in place of the third arm link 223 and the fourth arm link 224, may have arm links constituting the second arm link mechanism 220 thicker than those of the second embodiment of the robot arm mechanism 200 shown in FIG. 6, thereby enhancing the rigidity of the second arm link mechanism 220 constituting modified second embodiment of the robot arm mechanism 200.

While it has been described in the above that the link retaining mechanism 240 consists of two quadric crank chains, the link retaining mechanism 240 may be constituted by any link retaining mechanism such as, for example, synchronous gears, pulley and belt mechanism publicly known in the art, as long as the link retaining mechanism is operative to pivotably retain the first arm link mechanism 210 and the second arm link mechanism 220 respectively and keep the first angle θ201 formed by a line passing through the second arm link 212 of the first arm link mechanism 210 with the reference line 200a equal to the second angle θ202 formed by a line passing through the first arm link 221 of the second arm link mechanism 220 with the reference line 200a.

From the foregoing description, it is to be understood that the second embodiment of the robot arm mechanism 200 according to the present invention is resistant to deformation while the first arm link mechanism 210 and the second arm link mechanism 220 are extended, and accordingly enhancing the operating accuracy of the robot arm mechanism 200 in comparison with the conventional robot arm mechanism.

Figure 11:
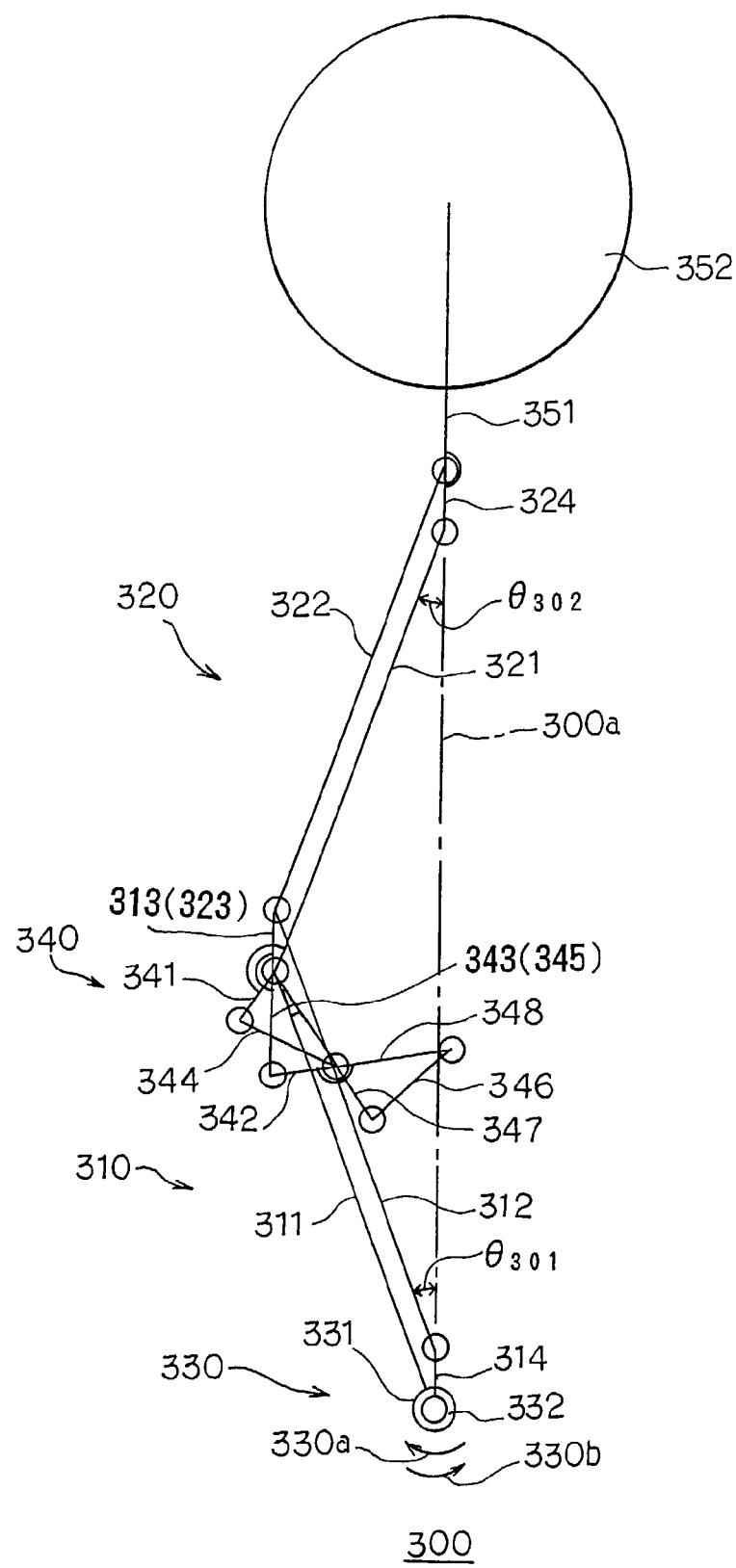
FIG. 11 is a skeleton view of an extended position of a third preferred embodiment of the robot arm mechanism according to the present invention.

Referring to FIGS. 11 to 17 of the drawings, there is shown a third embodiment of the robot arm mechanism 300 according to the present invention. The third embodiment of the robot arm mechanism 300 is shown in FIG. 11 as comprising a first arm link mechanism 310, a second arm link mechanism 320, a link retaining mechanism 340, a robot arm driving mechanism 330, a robot arm member 351, and a handling member 352.

The first arm link mechanism 310 consists of a first quadric crank chain comprising a first arm link 311, a second arm link 312, a third arm link 313, and a fourth arm link 314 wherein the second arm link 312 is substantially in parallel relationship with the first arm link 311 and the fourth arm link 314 is substantially in parallel relationship with the third arm link 313. The second arm link mechanism 320 consists of a second quadric crank chain comprising a first arm link 321, a second arm link 322, a third arm link 323, and a fourth arm link 32 wherein the second arm link 322 is substantially in parallel relationship with the first arm link 321 and the fourth arm link 324 is substantially in parallel relationship with the third arm link 323. The second arm link mechanism 320 is pivotably connected with the first arm link mechanism 310.

The first arm link mechanism 310 and the second arm link mechanism 320 will be described in detail, hereinlater.

The first arm link 311 of the first arm link mechanism 310 has a driving end portion and a supporting end portion. The second arm link 312, the third arm link 313, and the fourth arm link 314 respectively have first and second end portions. The first and third arm links 311, 313 of the first arm link mechanism 310 are pivotably connected with each other at the supporting end portion of the first arm link 311 of the first arm link mechanism 310 and the first end portion of the third arm link 313 of the first arm link mechanism 310. The third and second arm links 313, 312 of the first arm link mechanism 310 are pivotably connected with each other at the second end portion of the third arm link 313 of the first arm link mechanism 310 and the first end portion of the second arm link 312 of the first arm link mechanism 310. The second and fourth arm links 312, 314 of the first arm link mechanism 310 are pivotably connected with each other at the second end portion of the second arm link 312 of the first arm link mechanism 310 and the first end portion of the fourth arm link 314 of the first arm link mechanism 310. The fourth and first arm links 314, 311 of the first arm link mechanism 310 are pivotably connected with each other at the second end portion of the fourth arm link 314 of the first arm link mechanism 310 and the driving end portion of the first arm link 311 of the first arm link mechanism 310.

Similarly, the first arm link 321 of the second arm link mechanism 320 has a supporting end portion and a handling end portion. The second arm link 322, the third arm link 323, and the fourth arm link 324 of the second arm link mechanism 320 respectively have first and second end portions. The first and third arm links 321, 223 of the second arm link mechanism 320 are pivotably connected with each other at the supporting end portion of the first arm link 321 of the second arm link mechanism 320 and the first end portion of the third arm link 323 of the second arm link mechanism 320. The third and second arm links 323, 222 of the second arm link mechanism 320 are pivotably connected with each other at the second end portion of the third arm link 323 of the second arm link mechanism 320 and the first end portion of the second arm link 322 of the second arm link mechanism 320. The second and fourth arm links 322, 224 of the second arm link mechanism 320 are pivotably connected with each other at the second end portion of the second arm link 322 of the second arm link mechanism 320 and the first end portion of the fourth arm link 324 of the second arm link mechanism 320. The fourth and first arm links 324, 221 of the second arm link mechanism 320 are pivotably connected with each other at the second end portion of the fourth arm link 324 of the second arm link mechanism 320 and the handling end portion of the first arm link 321 of the second arm link mechanism 320. The third arm link 323 of the second arm link mechanism 320 is integrally formed with and fixedly connected with the third arm link 313 of the first arm link mechanism 310.

The link retaining mechanism 340 has a reference line 300a as shown in FIG. 11. The link retaining mechanism 340 is adapted to pivotably retain the first arm link mechanism 310 and the second arm link mechanism 320 respectively and keep a first angle substantially equal to a second angle wherein the first angle θ301 is intended to mean an angle formed by a line passing through the second arm link 312 of the first arm link mechanism 310 with the reference line 300a and the second angle θ302 is intended to mean an angle formed by a line passing through the first arm link 321 of the second arm link mechanism 320 with the reference line 300a.

The link retaining mechanism 340 comprises a first joint cross linkage and a second joint cross linkage. The first joint cross linkage of the link retaining mechanism 340 consists of a third quadric crank chain including a first short link 341, a first long link 344, a second short link 342, and a second long link 343. The first long link 344 is longer than the first short link 341 of the first joint cross linkage of the link retaining mechanism 340. The second short link 342 is substantially equal in length to the first short link 341 of the first joint cross linkage of the link retaining mechanism 340. The second long link 343 is substantially equal in length to the first long link 344 of the first joint cross linkage of the link retaining mechanism 340, and crossed with the first long link 344 of the first joint cross linkage of the link retaining mechanism 340. The second joint cross linkage of the link retaining mechanism 340 consists of a fourth quadric crank chain including a first short link 345, a first long link 348, a second short link 346, and a second long link 347. The first short link 345 is substantially equal in length to the second long link 343 of the first joint cross linkage of the link retaining mechanism 340. The first long link 348 is longer than the first short link 345 of the second joint cross linkage of the link retaining mechanism 340. The second short link 346 is substantially equal in length to the first short link 345 of the second joint cross linkage of the link retaining mechanism 340. The second long link 347 is substantially equal in length to the first long link 348 of the second joint cross linkage of the link retaining mechanism 340, and crossed with the first long link 348 of the second joint cross linkage of the link retaining mechanism 340.

One of the first short link 341 and the second short link 342 of the first joint cross linkage of the link retaining mechanism 340 is fixedly connected with one of the first arm link 311 and the second arm link 312 of the first arm link mechanism 310 and the first arm link 321 and the second arm link 322 of the second arm link mechanism 320. In the present case, it is assumed that the first short link 341 of the first joint cross linkage of the link retaining mechanism 340 is integrally formed with and fixedly connected with the first arm link 321 of the second arm link mechanism 320.

One of the first long link 344 and the second long link 343 of the first joint cross linkage of the link retaining mechanism 340 is fixedly connected with one of the third arm link 313 and the fourth arm link 314 of the first arm link mechanism 310. In the present case, it is assumed that the second long link 343 of the first joint cross linkage of the link retaining mechanism 340 is integrally formed with and fixedly connected with the third arm link 313 of the first arm link mechanism 310 and the second arm link 322 of the second arm link mechanism 320.

One of the first short link 345 and the second short link 346 of the second joint cross linkage of the link retaining mechanism 340 is fixedly connected with one of the first long link 344 and the second long link 343 of the first joint cross linkage of the link retaining mechanism 340. In the present case, it is assumed that the first short link 345 of the second joint cross linkage of the link retaining mechanism 340 is integrally formed with and fixedly connected with the second long link 343 of the first joint cross linkage of the link retaining mechanism 340 and the first short link 345 of the second joint cross linkage of the link retaining mechanism 340 is integrally formed with and fixedly connected with the third arm link 313 of the first arm link mechanism 310 and the third arm link 323 of the second arm link mechanism 320.

One of the first long link 348 and the second long link 347 of the second joint cross linkage of the link retaining mechanism 340 has a first end portion fixedly connected with one of the remaining ones of the first arm link 311 and the second arm link 312 of the first arm link mechanism 310 and the first arm link 321 and the second arm link 322 of the second arm link mechanism 320, and a second end portion fixedly connected with one of the remaining ones of the first short link 341 and the second short link 342 of the first joint cross linkage of the link retaining mechanism 340. In the present case, it is assumed that the second short link 342 of the first joint cross linkage of the link retaining mechanism 340 is integrally formed with and fixedly connected with the first long link 348 of the second joint cross linkage of the link retaining mechanism 340.

The link retaining mechanism 340 of the robot arm mechanism 300 in the present case will be described in detail, hereinlater.

The first short link 341 having first and second end portions. The first short link 341 of the first joint cross linkage of the link retaining mechanism 340 is integrally formed with and fixedly connected with the first arm link 321 of the second arm link mechanism 320. The first long link 344 has first and second end portions and longer than the first short link 341 of the first joint cross linkage of the link retaining mechanism 340. The first short and long links 341, 344 of the first joint cross linkage of the link retaining mechanism 340 are pivotably connected with each other at the second end portion of the first short link 341 of the first joint cross linkage of the link retaining mechanism 340 and the first end portion of the first long link 344 of the first joint cross linkage of the link retaining mechanism 340. The second short link 342 has first and second end portions and substantially equal in length to the first short link 341 of the first joint cross linkage of the link retaining mechanism 340. The first long link 344 of the first joint cross linkage of the link retaining mechanism 340 and the second short link 342 of the first joint cross linkage of the link retaining mechanism 340 are pivotably connected with each other at the second end portion of the first long link 344 of the first joint cross linkage of the link retaining mechanism 340 and the first end portion of the second short link 342 of the first joint cross linkage of the link retaining mechanism 340. The second long link 343 has first and second end portions and substantially equal in length to the first long link 344 of the first joint cross linkage of the link retaining mechanism 340. The second short and long links 342, 343 of the first joint cross linkage of the link retaining mechanism 340 are pivotably connected with each other at the second end portion of the second short link 342 of the first joint cross linkage of the link retaining mechanism 340 and the first end portion of the second long link 343 of the first joint cross linkage of the link retaining mechanism 340. The second long link 343 of the first joint cross linkage of the link retaining mechanism 340 and the first short link 341 of the first joint cross linkage of the link retaining mechanism 340 are pivotably connected with each other at the second end portion of the second long link 343 of the first joint cross linkage of the link retaining mechanism 340 and the first end portion of the first short link 341 of the first joint cross linkage of the link retaining mechanism 340 under the state that the second long link 343 of the first joint cross linkage of the link retaining mechanism 340 is crossed with the first long link 344 of the first joint cross linkage of the link retaining mechanism 340. The second long link 343 of the first joint cross linkage of the link retaining mechanism 340 is integrally formed with and fixedly connected with the third arm link 313 of the first arm link mechanism 310.

Similarly, the first short link 345 of the second joint cross linkage has first and second end portions. The first short link 345 of the second joint cross linkage of the link retaining mechanism 340 is substantially equal in length to the second long link 343 of the first joint cross linkage of the link retaining mechanism 340, and fixedly connected with the third arm link 323 of the second arm link mechanism 320. The first long link 348 has first and second end portions and is longer than the first short link 345 of the second joint cross linkage of the link retaining mechanism 340. The first short and long links 345, 348 of the second joint cross linkage of the link retaining mechanism 340 are pivotably connected with each other at the second end portion of the first short link 345 of the second joint cross linkage of the link retaining mechanism 340 and the first end portion of the first long link 348 of the second joint cross linkage of the link retaining mechanism 340. The second short link 342 of the first joint cross linkage of the link retaining mechanism 340 is integrally formed with and fixedly connected with the first long link 348 of the second joint cross linkage of the link retaining mechanism 340. The second short link 346 has first and second end portions and is substantially equal in length to the first short link 345 of the second joint cross linkage of the link retaining mechanism 340. The first long link 348 of the second joint cross linkage of the link retaining mechanism 340 and the second short link 346 of the second joint cross linkage of the link retaining mechanism 340 are pivotably connected with each other at the second end portion of the first long link 348 of the second joint cross linkage of the link retaining mechanism 340 and the first end portion of the second short link 346 of the second joint cross linkage of the link retaining mechanism 340. The second long link 347 has first and second end portions and is substantially equal in length to the first long link 348 of the second joint cross linkage of the link retaining mechanism 340. The second short and long links 346, 347 of the second joint cross linkage of the link retaining mechanism 340 are pivotably connected with each other at the second end portion of the second short link 346 of the second joint cross linkage of the link retaining mechanism 340 and the first end portion of the second long link 347 of the second joint cross linkage of the link retaining mechanism 340. The second long link 347 of the second joint cross linkage of the link retaining mechanism 340 and the first short link 345 of the second joint cross linkage of the link retaining mechanism 340 are pivotably connected with each other at the second end portion of the second long link 347 of the second joint cross linkage of the link retaining mechanism 340 and the first end portion of the first short link 345 of the second joint cross linkage of the link retaining mechanism 340 under the state that the second long link 347 of the second joint cross linkage of the link retaining mechanism 340 is crossed with the first long link 348 of the second joint cross linkage of the link retaining mechanism 340. The second long link 347 of the second joint cross linkage of the link retaining mechanism 340 is integrally formed with and fixedly connected with the first arm link 311 of the first arm link mechanism 310.

The robot arm member 351 has first and second end portions. The first end portion of the robot arm member 351 is integrally formed with and fixedly connected with the fourth arm link 324 of the second arm link mechanism 320. The handling member 352 is fixedly connected with the second end portion of the robot arm member 351, and adapted to support and handle an object. According to the present invention, the handling member 352 may be adapted to, for example, grip the object.

The robot arm driving mechanism 330 comprise a first driving shaft 331 and a second driving shaft 332.

The first driving shaft 331 is adapted to rotate the first arm link 311 of the first arm link mechanism 310 around a rotation axis in any one of two rotation directions consisting of a first rotation direction 330a in which the first arm link 321 of the second arm link mechanism 320 rotates in a rotation direction 330b opposite to the first rotation direction 330a, and the first arm link mechanism 310 and the second arm link mechanism 320 are extended, and a second rotation direction 330b in which the first arm link 321 of the second arm link mechanism 320 rotates in a rotation direction 330a opposite to the second rotation direction 330b, and the first arm link mechanism 310 and the second arm link mechanism 320 are contracted. The second driving shaft 332 is adapted to rotate the fourth arm link 314 of the first arm link mechanism 310 around the rotation axis in any one of two rotation directions consisting of the first rotation direction 330a and the second rotation direction 330b.

Furthermore, the link retaining mechanism 340 is adapted to keep a line passing through the one of the first short link 341 and the second short link 342 of the first joint cross linkage of the link retaining mechanism 340 forward in a rotation direction 330a; 330b, in which the first arm link mechanism 310 and the second arm link mechanism 320 are contracted, with respect to a line passing through the one of the first long link 344 and the second long link 343 of the first joint cross linkage of the link retaining mechanism 340 in comparison with a line passing through the one of the first short link 341 and the second short link 342 of the first joint cross linkage of the link retaining mechanism 340 expected to be placed with respect to a line passing through the one of the first long link 344 and the second long link 343 of the first joint cross linkage of the link retaining mechanism 340 when the one of the first short link 341 and the second short link 342 of the first joint cross linkage of the link retaining mechanism 340 and the one of the first long link 348 and the second long link 347 of the second joint cross linkage of the link retaining mechanism 340 are respectively placed in substantially collinear relationship with the one of the first arm link 311 and the second arm link 312 of the first arm link mechanism 310 and the first arm link 321 and the second arm link 322 of the second arm link mechanism 320 and the one of the remaining ones of the first arm link 311 and the second arm link 312 of the first arm link mechanism 310 and the first arm link 321 and the second arm link 322 of the second arm link mechanism 320.

In the present case, the link retaining mechanism 340 is adapted to keep a line passing through the first short link 341 of the first joint cross linkage of the link retaining mechanism 340 forward in a rotation direction 330a, in which the first arm link mechanism 310 and the second arm link mechanism 320 are contracted, with respect to a line passing through the second long link 343 of the first joint cross linkage of the link retaining mechanism 340 in comparison with a line passing through the first short link 341 of the first joint cross linkage of the link retaining mechanism 340 expected to be placed with respect to a line passing through the second long link 343 of the first joint cross linkage of the link retaining mechanism 340 when the first short link 341 of the first joint cross linkage of the link retaining mechanism 340 and the second long link 347 of the second joint cross linkage of the link retaining mechanism 340 are respectively placed in substantially collinear relationship with the first arm link 321 of the second arm link mechanism 320 and the first arm link 311 of the first arm link mechanism 310 as best shown in FIGS. 12(a) and (b).

The concept of "keeping the line forward" will be described in detail, hereinlater.

The line 341a passing through the first short link 341 of the first joint cross linkage of the link retaining mechanism 340 is expected to be placed with respect to the line passing through the second long link 343 of the first joint cross linkage of the link retaining mechanism 340 to form a third angle θ303 when the first short link 341 of the first joint cross linkage of the link retaining mechanism 340 and the second long link 347 of the second joint cross linkage of the link retaining mechanism 340 are respectively placed in substantially collinear relationship with the first arm link 321 of the second arm link mechanism 320 and the first arm link 311 of the first arm link mechanism 310 as shown in FIG. 12(a). In the robot arm mechanism 300 according to the present invention, the link retaining mechanism 340, on the other hand, is adapted to keep the line 341a passing through the first short link 341 of the first joint cross linkage of the link retaining mechanism 340 with respect to the line passing through the second long link 343 of the first joint cross linkage of the link retaining mechanism 340 so as to form an additional fourth angle θ304 with the line passing through the first arm link 321 of the second arm link mechanism 320 in the rotation direction 330a as shown in FIG. 12(b), which is expected to be in collinear relationship with the first short link 341 of the first joint cross linkage of the link retaining mechanism 340 when the first short link 341 of the first joint cross linkage of the link retaining mechanism 340 and the second long link 347 of the second joint cross linkage of the link retaining mechanism 340 are respectively placed in substantially collinear relationship with the first arm link 321 of the second arm link mechanism 320 and the first arm link 311 of the first arm link mechanism 310 as shown in FIG. 12(a). This means that the line 341a passing through the first short link 341 of the first joint cross linkage of the link retaining mechanism 340 is kept "forward" in a rotation direction 330a, in which the first arm link mechanism 310 and the second arm link mechanism 320 are contracted, with respect to a line passing through the second long link 343 of the first joint cross linkage of the link retaining mechanism 340 for the additional fourth angle "θ304" as shown in FIG. 12(b) in comparison with a line passing through the first short link 341 of the first joint cross linkage of the link retaining mechanism 340 expected to be placed with respect to a line passing through the second long link 343 of the first joint cross linkage of the link retaining mechanism 340 when the first short link 341 of the first joint cross linkage of the link retaining mechanism 340 and the second long link 347 of the second joint cross linkage of the link retaining mechanism 340 are respectively placed in substantially collinear relationship with the first arm link 321 of the second arm link mechanism 320 and the first arm link 311 of the first arm link mechanism 310 as shown in FIG. 12(a).

The operation of the third embodiment of the robot arm mechanism 300 will be described, hereinlater.

Figure 13:
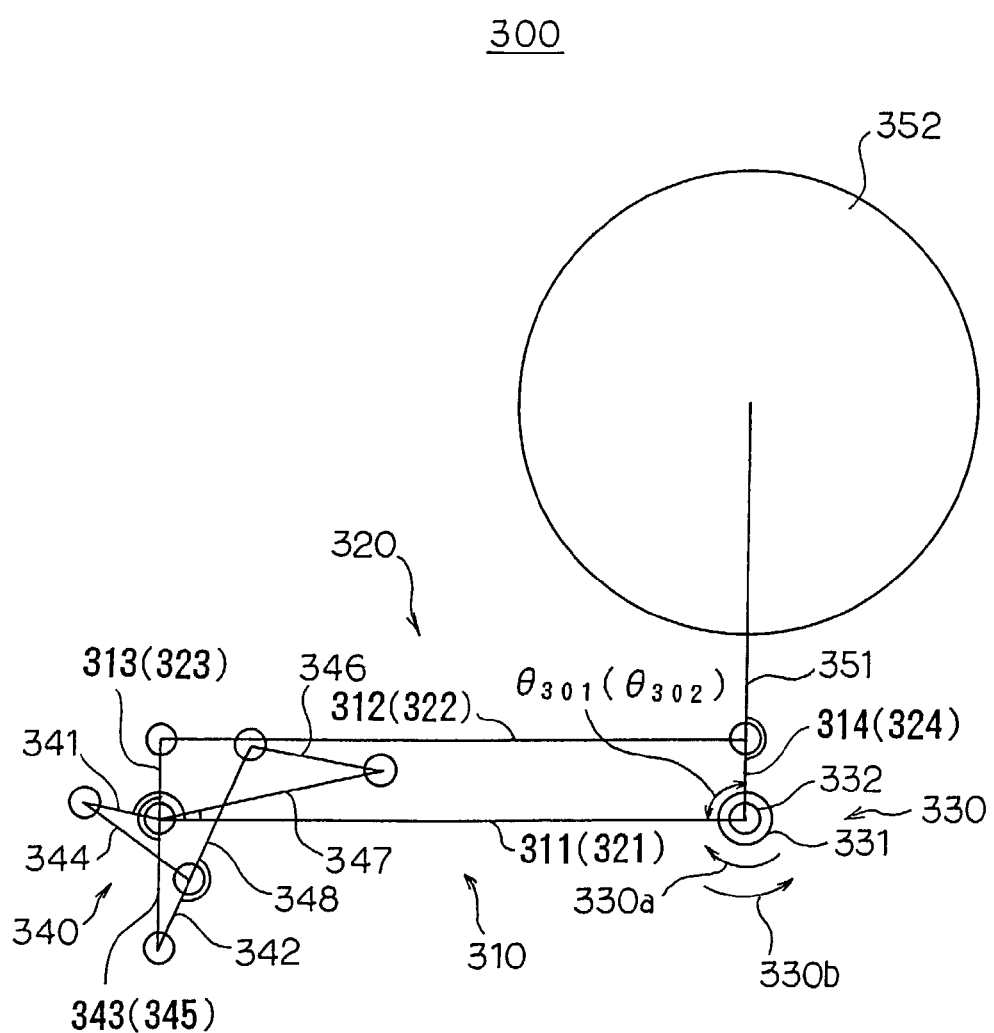
FIG. 13 is a skeleton view of a contracted position of the robot arm mechanism shown in FIG. 11.
Figure 14:
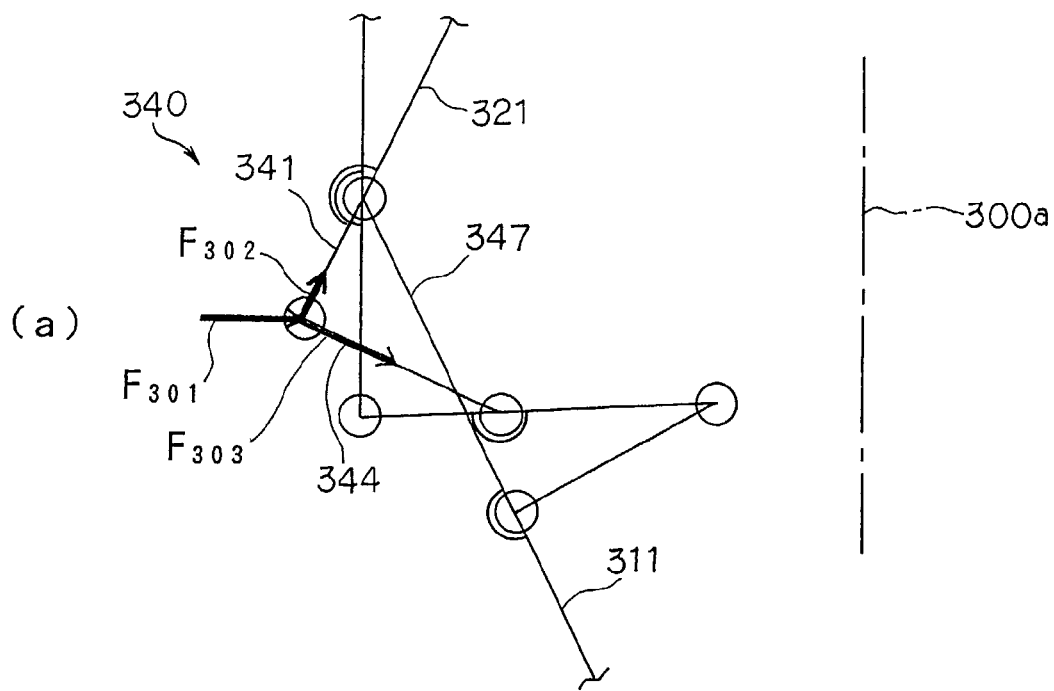
FIG. 14(*b*) is an enlarged fragmentary skeleton view of the condition of the robot arm mechanism shown in FIG. 12(*b*) to be used for explaining an advantage of the robot arm mechanism according to the present invention.
Figure 14:
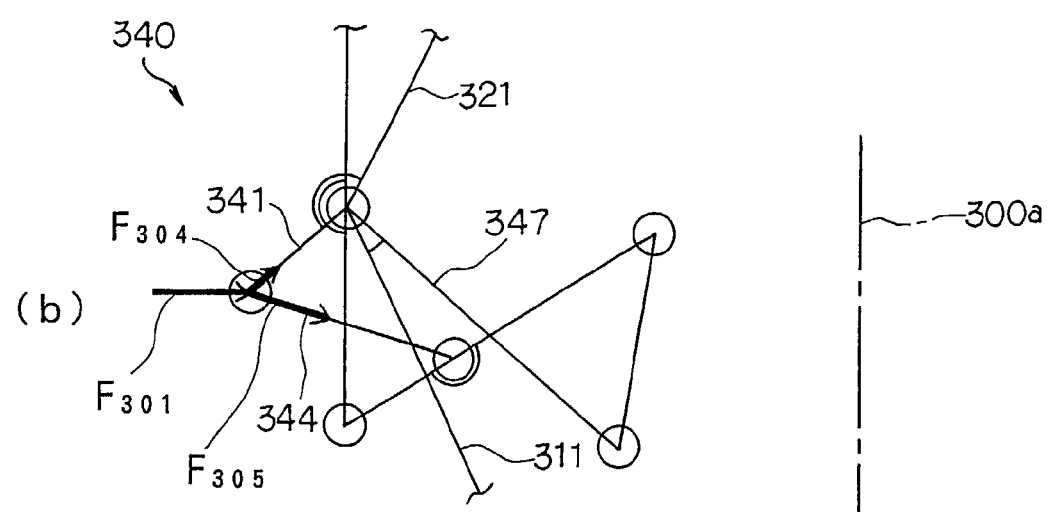

As shown in FIG. 11, the first driving shaft 331 is operated to rotate the first arm link 311 of the first arm link mechanism 310 around the rotation axis to change the first angle θ301. The first driving shaft 331 is operated to rotate the first arm link 311 of the first arm link mechanism 310 around the rotation axis in, for example, the first rotation direction 330a, the first arm link mechanism 310 and the second arm link mechanism 320 are then operated to be extended. The first driving shaft 331, on the other hand, is operated to rotate the first arm link 311 of the first arm link mechanism 310 around the rotation axis in, for example, the second rotation direction 330b, the first arm link mechanism 310 and the second arm link mechanism 320 are then operated to be contracted. This means that the first driving shaft 331 may rotate the first arm link 311 of the first arm link mechanism 310 around the rotation axis in the first rotation direction 330a until the first arm link mechanism 310 and the second arm link mechanism 320 assumes an extended position as shown in FIG. 11, and the first driving shaft 331 may rotate the first arm link 311 of the first arm link mechanism 310 around the rotation axis in the second rotation direction 330b until the first arm link mechanism 310 and the second arm link mechanism 320 assumes a contracted position as shown in FIG. 13. Alternatively, the first arm link mechanism 310 and the second arm link mechanism 320 may further be contracted beyond the contracted position shown in FIG. 13.

The first driving shaft 331 and the second driving shaft 332 may respectively rotate the first arm link 311 of the first arm link mechanism 310 and the fourth arm link 314 of the first arm link mechanism 310 around the rotation axis in the same rotation direction, for example, the first rotation direction 330a or the second rotation direction 330b for the same amount of rotation angle, the robot arm mechanism 300 as a whole, including the first arm link mechanism 310 and the second arm link mechanism 320, is then rotated around the rotation axis in the rotation direction.

As described hereinbefore, the line 341a passing through the first short link 341 of the first joint cross linkage of the link retaining mechanism 340 is kept "forward" in a rotation direction 330a, in which the first arm link mechanism 310 and the second arm link mechanism 320 are contracted, with respect to a line passing through the second long link 343 of the first joint cross linkage of the link retaining mechanism 340 for the additional fourth angle "θ304" as shown in FIG. 12(b) in comparison with a line passing through the first short link 341 of the first joint cross linkage of the link retaining mechanism 340 expected to be placed with respect to a line passing through the second long link 343 of the first joint cross linkage of the link retaining mechanism 340 when the first short link 341 of the first joint cross linkage of the link retaining mechanism 340 and the second long link 347 of the second joint cross linkage of the link retaining mechanism 340 are respectively placed in substantially collinear relationship with the first arm link 321 of the second arm link mechanism 320 and the first arm link 311 of the first arm link mechanism 310 as shown in FIG. 12(a). This means that the third embodiment of the robot arm mechanism 300, in which the line 341a passing through the first short link 341 of the first joint cross linkage of the link retaining mechanism 340 is kept "forward" in a rotation direction 330a, in which the first arm link mechanism 310 and the second arm link mechanism 320 are contracted, can prevent the quadric crank chains constituting the link retaining mechanism 340 from being flattened out while the first arm link mechanism 310 and the second arm link mechanism 320 are extended, thereby improving resistance to deformation while the first arm link mechanism 310 and the second arm link mechanism 320 are extended as shown in FIG. 11, in comparison with the link retaining mechanism 940 of the conventional robot arm mechanism 900 shown in FIG. 20 for the reason described hereinlater.

A force F301, for example, substantially perpendicular to the reference line 300a is exerted on a quadric crank chain constituting the link retaining mechanism 340, in which the first short link 341 of the first joint cross linkage of the link retaining mechanism 340 and the second long link 347 of the second joint cross linkage of the link retaining mechanism 340 are respectively placed in substantially collinear relationship with the first arm link 321 of the second arm link mechanism 320 and the first arm link 311 of the first arm link mechanism 310 as shown in FIG. 12(a), which is similar to the quadric crank chain constituting the link retaining mechanism 940 of the conventional robot arm mechanism 900 shown in FIG. 20, the force F301 exerted on the link retaining mechanism 340 can be resolved into a component force F302 exerted on the first short link 341 of the first joint cross linkage of the link retaining mechanism 340 and a component force F303 exerted on the first long link 344 of the first joint cross linkage of the link retaining mechanism 340 as shown in FIG. 14(a).

The same force F301 substantially perpendicular to the reference line 300a, on the other hand, is exerted on the quadric crank chain constituting link retaining mechanism 340 of the third embodiment of the robot arm mechanism 300, in which the line 341a passing through the first short link 341 of the first joint cross linkage of the link retaining mechanism 340 is kept "forward" in a rotation direction 330a, in which the first arm link mechanism 310 and the second arm link mechanism 320 are contracted, the force F301 exerted on the link retaining mechanism 340 can be resolved into a component force F304 exerted on the first short link 341 of the first joint cross linkage of the link retaining mechanism 340, which is smaller than the F302, and a component force F305 exerted on the first long link 344 of the first joint cross linkage of the link retaining mechanism 340, which is smaller than F303, as shown in FIG. 14(b).

While it has been described in the above that the force F301 substantially perpendicular to the reference line 300a and exerted on the quadric crank chain constituting the link retaining mechanism 340 of the robot arm mechanism 300 are resolved into component forces F304, F305 respectively exerted on the first short link 341 of the first joint cross linkage of the link retaining mechanism 340 and the first long link 344 of the first joint cross linkage of the link retaining mechanism 340, which are reduced in comparison with the quadric crank chain constituting the link retaining mechanism 940 of the conventional robot arm mechanism 900 shown in FIG. 20, a force parallel with the reference line 300a exerted on the quadric crank chain constituting the link retaining mechanism 340 of the robot arm mechanism 300 may be resolved into component forces exerted on respective arm links constituting the link retaining mechanism 340, which are reduced in comparison with component forces to be resolved from the same force exerted on the link retaining mechanism 940 and exerted on respective arm links constituting the link retaining mechanism 940 of the conventional robot arm mechanism 900 in a similar manner as described above.

While it has been described in the above that the handling member 352 is fixedly connected with the second end portion of the robot arm member 351, the handling member 352 may be fixedly connected with the second arm link mechanism 320 without the handling member 352 in a manner that the handling member 352 is fixedly connected with, for example, one of the arm links constituting the second arm link mechanism 320 such as, for example, the first, second, and fourth arm link 321, 322, and 324.

From the foregoing descriptions, it is to be understood that the link retaining mechanism 340 of the robot arm mechanism 300 according to the present invention, in which component forces resolved from a force exerted on the link retaining mechanism 340 and exerted on respective arm links constituting the link retaining mechanism 340 are reduced in comparison with component forces to be resolved from the same force exerted on the link retaining mechanism 940 and exerted on respective arm links of the link retaining mechanism 940 of the conventional robot arm mechanism 900, can be resistant to deformation due to an external force while the first arm link mechanism 110 and the second arm link mechanism 120 are extended, and accordingly enhance the operating accuracy of the robot arm mechanism 300 in comparison with the conventional robot arm mechanism 900.

According to the present invention, the additional fourth angle θ304 formed by the line 341a passing through the first short link 341 of the first joint cross linkage of the link retaining mechanism 340 with the line 321a passing through the first arm link 321 of the second arm link mechanism 320 in the rotation direction 330a may be any angle. The additional fourth angle θ304 formed by the line 341a passing through the first short link 341 of the first joint cross linkage of the link retaining mechanism 340 with the line 321a the first arm link 321 of the second arm link mechanism 320 in the rotation direction 330a may be set to for example, an angle so that the first and short link 341, 342 of the first joint cross linkage of the link retaining mechanism 340 become substantially parallel with each other when the first arm link mechanism 310 and the second arm link mechanism 320 are extended to its their limits.

Figure 12:
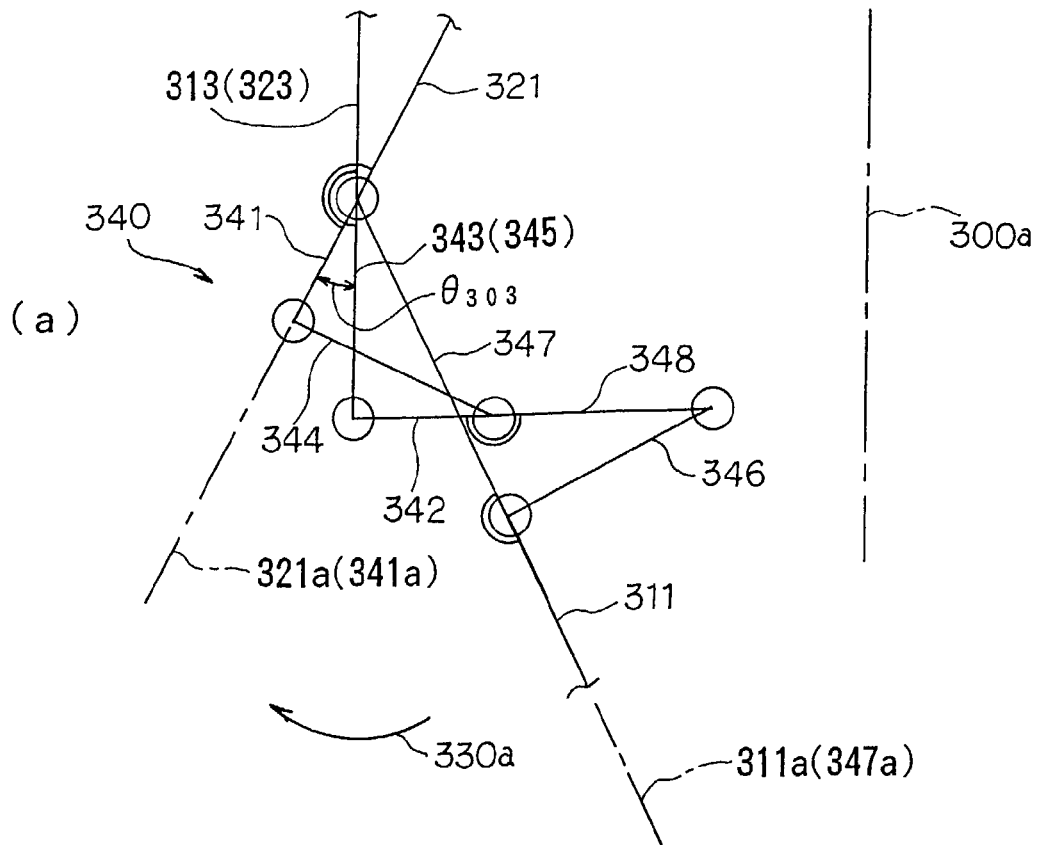
FIG. 12(a) is an enlarged fragmentary skeleton view of one condition of the robot arm mechanism shown in FIG. 11 to be used for explaining a drawback of the conventional robot arm mechanism.
FIG. 12(b) is an enlarged fragmentary skeleton view of one condition of the robot arm mechanism shown in FIG. 11 to be used for explaining the principle of the robot arm mechanism according to the present invention.
Figure 12:
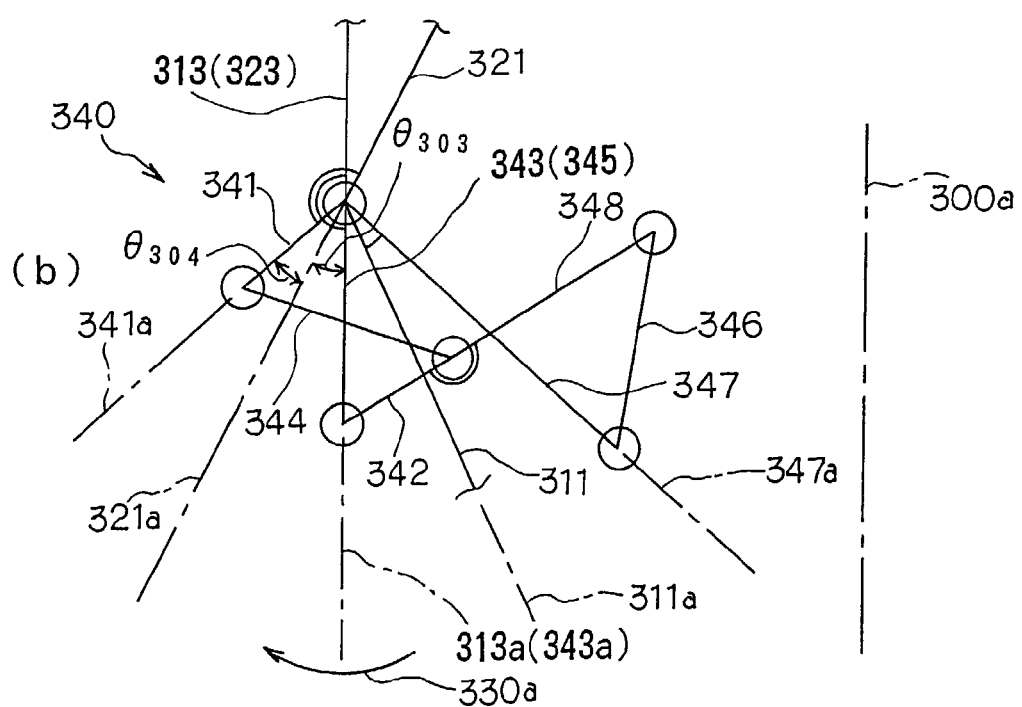

While it has been described in the above, that the link retaining mechanism 340 is mounted on the first arm link mechanism 310 and the second arm link mechanism 320 in a manner that the line 313a passing through third arm link 313 of the first arm link mechanism 310 is substantially in collinear relationship with the line 343a passing through the second long link 343 of the first joint cross linkage of the link retaining mechanism 340 as shown in FIG. 12(*b*), the link retaining mechanism 340 may mounted on the first arm link mechanism 310 and the second arm link mechanism 320 in various manners other than shown in FIG. 12(*b*).

Figure 15:
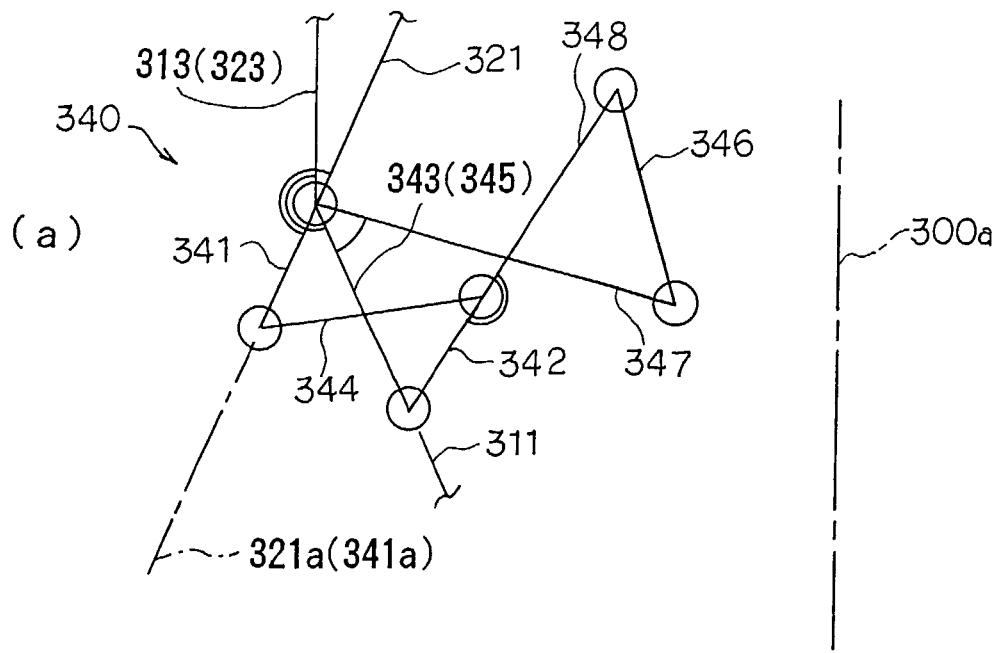
FIG. 15(*a*) is an enlarged fragmentary skeleton view of another condition of the third embodiment of the robot arm mechanism wherein a link retaining mechanism is mounted on first and second arm link mechanism in a manner different from the robot arm mechanism shown in FIG. 12(*b*)
Figure 15:
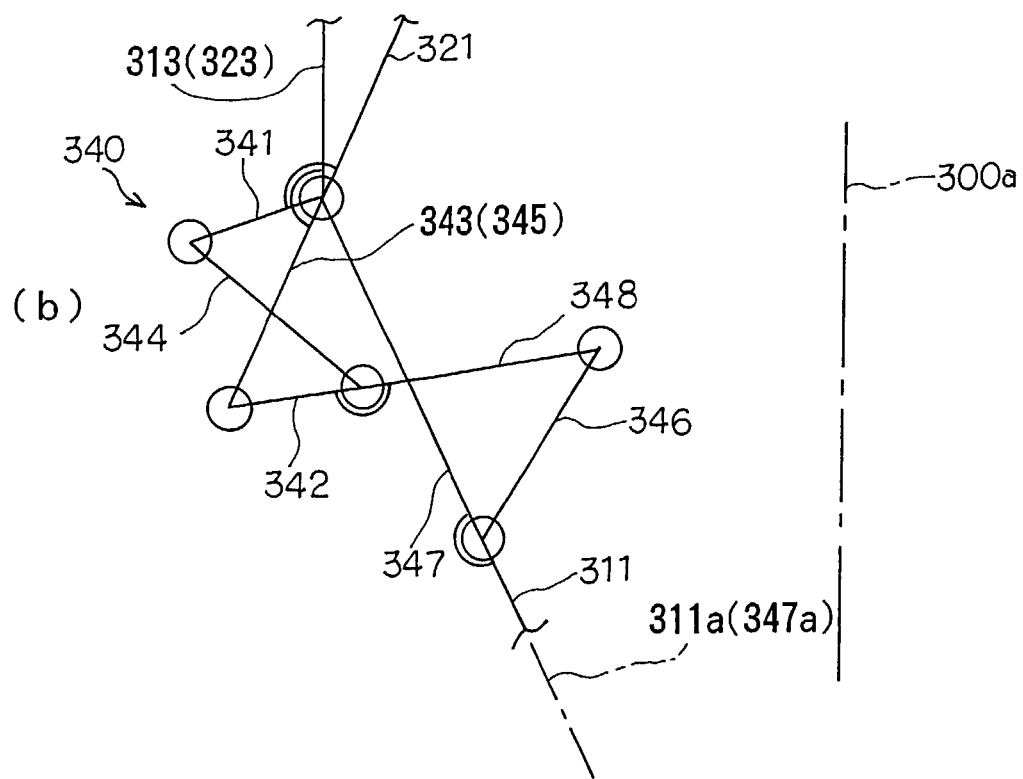

The link retaining mechanism 340 may be mounted on the first arm link mechanism 310 and the second arm link mechanism 320 in, for example, a manner that the line 321a passing through third arm link 321 of the second arm link mechanism 320 is substantially in collinear relationship with the line 341a passing through the first short link 341 of the first joint cross linkage of the link retaining mechanism 340 as shown in FIG. 15(*a*). Alternatively, the link retaining mechanism 340 may be mounted on the first arm link mechanism 310 and the second arm link mechanism 320 in, for example, a manner that the line 311a passing through third arm link 311 of the first arm link mechanism 310 is substantially in collinear relationship with the line 347a passing through the second long link 347 of the second joint cross linkage of the link retaining mechanism 340 as shown in FIG. 15(*b*).

Figure 16:
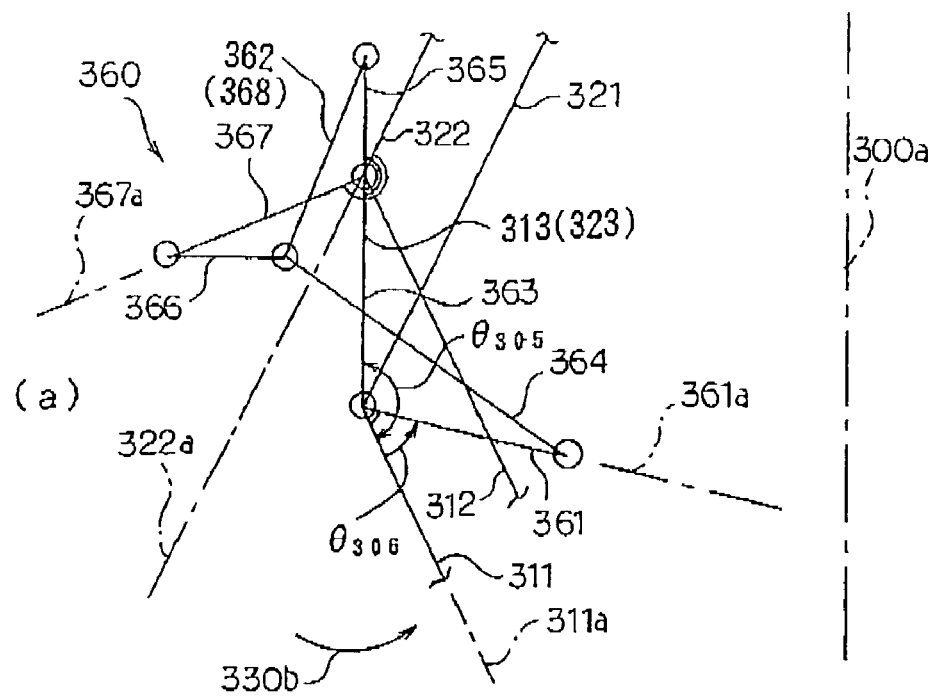
FIG. 16(*a*) is an enlarged fragmentary skeleton view of another condition of the third embodiment of the robot arm mechanism comprising a link retaining mechanism different from the one shown in FIG. 12(*b*)
Figure 16:
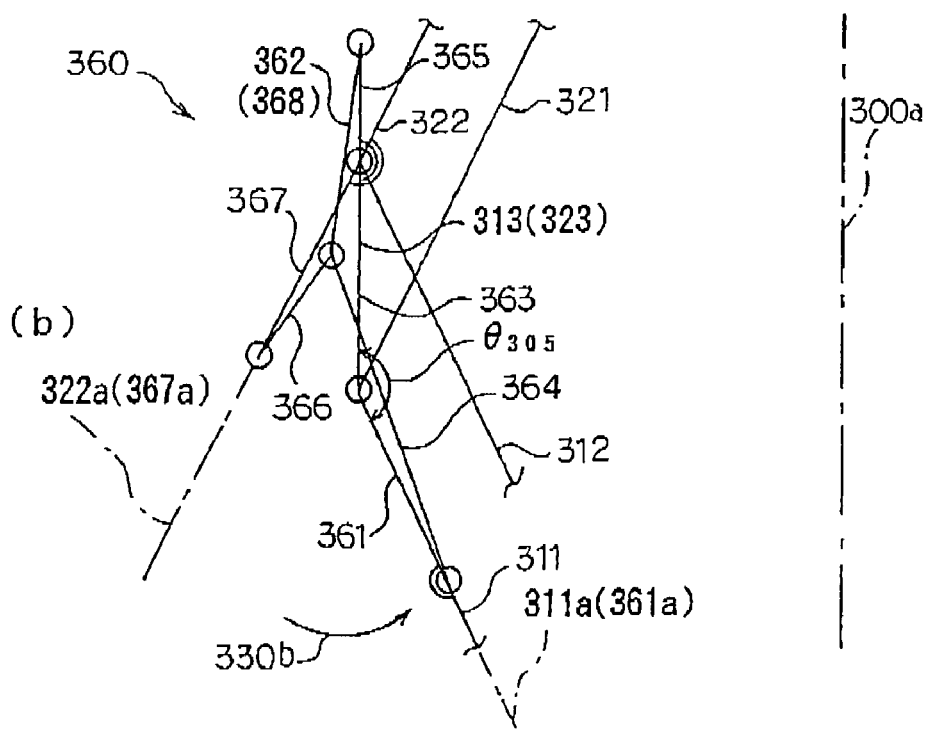
Figure 17:
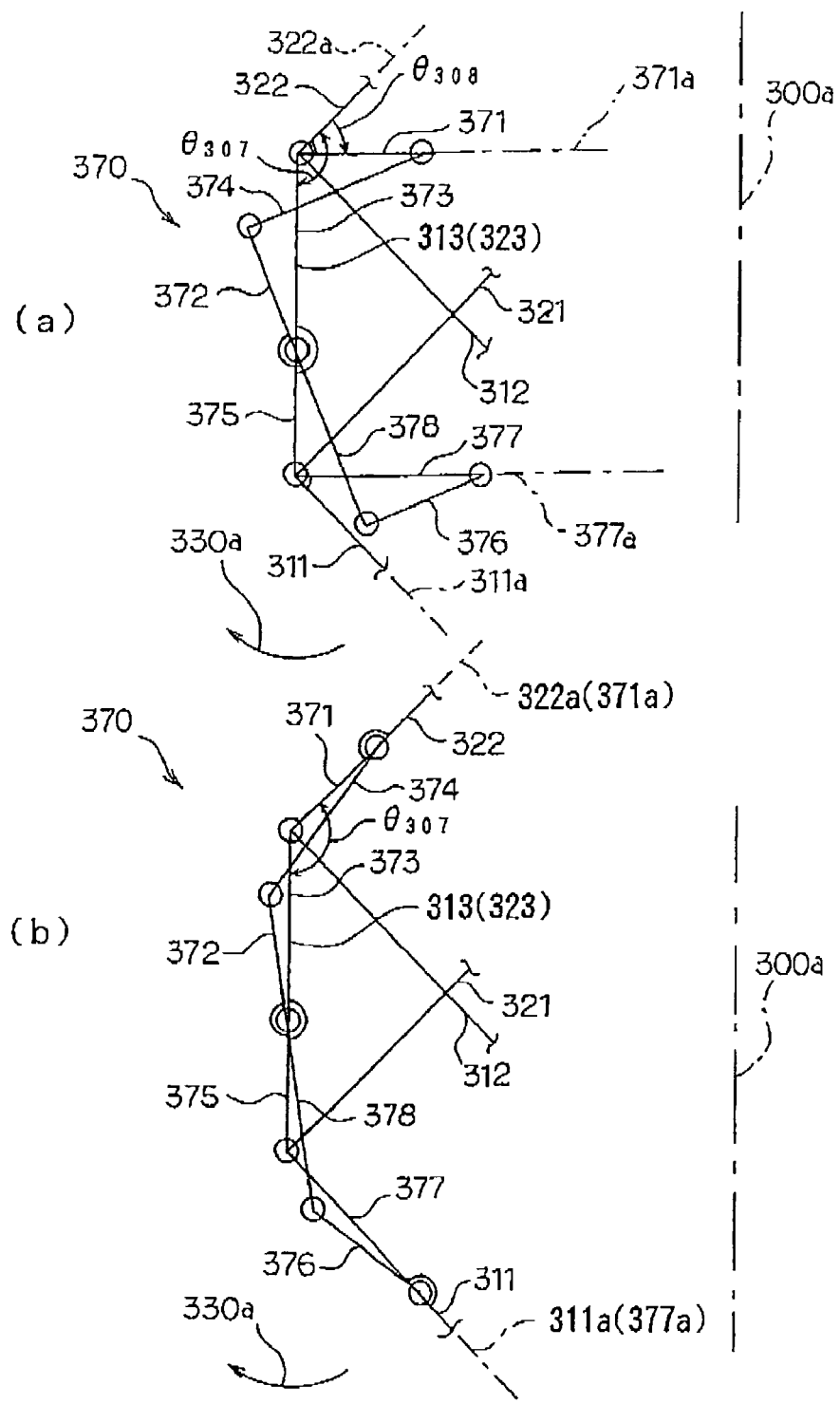
FIG. 17(*a*) is an enlarged fragmentary skeleton view of another condition of the third embodiment of the robot arm mechanism comprising a link retaining mechanism different from the one shown in FIGS. 12(*b*) and 16(*a*)

While it has been described in the above that the third embodiment of the robot arm mechanism 300 comprises the link retaining mechanism 340, the third embodiment of the robot arm mechanism 300 according to the present invention may comprise a link retaining mechanism comprising two quadric crank chains other than the link retaining mechanism 340, such as, for example, a link retaining mechanism 360 shown in FIG. 16(*a*) and a link retaining mechanism 370 shown in FIG. 17(*a*) in place of the link retaining mechanism 340.

Description hereinlater will be directed to the link retaining mechanism 360 with reference to FIG. 16(*a*).

The link retaining mechanism 360 comprises a first joint cross linkage and a second joint cross linkage. The first joint cross linkage is a quadric crank chain and includes a first short link 361, a second short link 362, a second long link 363, and a first long link 364. The first long link 364 is longer than the first short link 361 of the first joint cross linkage of the link retaining mechanism 360. The second short link 362 is substantially equal in length to the first short link 361 of the first joint cross linkage of the link retaining mechanism 360. The second long link 363 is substantially equal in length to the first long link 364 of the first joint cross linkage of the link retaining mechanism 360, and crossed with the first long link 364 of the first joint cross linkage of the link retaining mechanism 360. The first short link 361 of the first joint cross linkage of the link retaining mechanism 360 is integrally formed with and fixedly connected with the first arm link 311 of the first arm link mechanism 310. The second long link 363 of the first joint cross linkage of the link retaining mechanism 360 is integrally formed with and fixedly connected with the third arm link 313 of the first arm link mechanism 310 and the third arm link 323 of the second arm link mechanism 320.

The second joint cross linkage is a quadric crank chain and includes a first short link 365, a first long link 368, a second short link 366, and a second long link 367. The first long link 368 is longer than the first short link 365 of the second joint cross linkage of the link retaining mechanism 360. The second short link 366 is substantially equal in length to the first short link 365 of the second joint cross linkage of the link retaining mechanism 360. The second long link 367 is substantially equal in length to the first long link 368 of the second joint cross linkage of the link retaining mechanism 360, and crossed with the first long link 368 of the second joint cross linkage of the link retaining mechanism 360. The first short link 365 of the second joint cross linkage of the link retaining mechanism 360 is integrally formed with and fixedly connected with the third arm link 313 of the first arm link mechanism 310 and the third arm link 323 of the second arm link mechanism 320. The second long link 367 of the second joint cross linkage of the link retaining mechanism 360 is integrally formed with and fixedly connected with the second arm link 322 of the second arm link mechanism 320. The first long link 368 of the second joint cross linkage of the link retaining mechanism 360 is integrally formed with and fixedly connected with the second short link 362 of the first joint cross linkage of the link retaining mechanism 360.

The link retaining mechanism 360 thus constructed is adapted to keep the line 361a passing through the first short link 361 of the first joint cross linkage of the link retaining mechanism 360 forward in the rotation direction 330b, in which the first arm link mechanism 310 and the second arm link mechanism 320 are contracted, with respect to the line passing through the second long link 363 of the first joint cross linkage of the link retaining mechanism 360 as shown in FIG. 16(*a*), in comparison with a line passing through the first short link 361 of the first joint cross linkage of the link retaining mechanism 360 expected to be placed with respect to a line passing through the second long link 363 of the first joint cross linkage of the link retaining mechanism 360 when the line 361a passing through the first short link 361 of the first joint cross linkage of the link retaining mechanism 360 and the line 367a passing through the second long link 367 of the second joint cross linkage of the link retaining mechanism 360 are respectively placed in substantially collinear relationship with the line 311a passing through the first arm link 311 of the first arm link mechanism 310 and the line 322a passing through the second arm link 322 of the second arm link mechanism 320 as best shown in FIG. 16(*b*) for the reason described hereinlater.

The line passing through the first short link 361 of the first joint cross linkage of the link retaining mechanism 360 forms a fifth angle θ305 with a line passing through the second long link 363 of the first joint cross linkage of the link retaining mechanism 360 in the rotation direction 33b when the line 361a passing through the first short link 361 of the first joint cross linkage of the link retaining mechanism 360 and the line 367a passing through the second long link 367 of the second joint cross linkage of the link retaining mechanism 360 are respectively placed in substantially collinear relationship with the line 311a passing through the first arm link 311 of the first arm link mechanism 310 and the line 322a passing through the second arm link 322 of the second arm link mechanism 320 as shown in FIG. 16(*b*) while, on the other hand, the link retaining mechanism 360 is adapted to keep the line 361a passing through the first short link 361 of the first joint cross linkage of the link retaining mechanism 360 "forward" in the rotation direction 330b, in which the first arm link mechanism 310 and the second arm link mechanism 320 are contracted, with respect to the line passing through the second long link 363 of the first joint cross linkage of the link retaining mechanism 360 so that an angle formed by the line passing through the first short link 361 of the first joint cross linkage of the link retaining mechanism 360 with a line passing through the second long link 363 of the first joint cross linkage of the link retaining mechanism 360 in the rotation direction 33*b* becomes substantially equal to the fifth angle θ305 minus a sixth angle θ306 as shown in FIG. 16(*a*). This means that the link retaining mechanism 360 is adapted to keep the line 361*a* passing through the first short link 361 of the first joint cross linkage of the link retaining mechanism 360 "forward" in the rotation direction 330*b*, in which the first arm link mechanism 310 and the second arm link mechanism 320 are contracted, with respect to the line passing through the second long link 363 of the first joint cross linkage of the link retaining mechanism 360 for the sixth angle θ306 as shown in FIG. 16(*a*) in comparison with a line passing through the first short link 361 of the first joint cross linkage of the link retaining mechanism 360 expected to be placed with respect to a line passing through the second long link 363 of the first joint cross linkage of the link retaining mechanism 360 when the line 361*a* passing through the first short link 361 of the first joint cross linkage of the link retaining mechanism 360 and the line 367*a* passing through the second long link 367 of the second joint cross linkage of the link retaining mechanism 360 are respectively placed in substantially collinear relationship with the line 311*a* passing through the first arm link 311 of the first arm link mechanism 310 and the line 322*a* passing through the second arm link 322 of the second arm link mechanism 320 as best shown in FIG. 16(*b*).

Description hereinlater will be directed to the link retaining mechanism 370 with reference to FIG. 17(*a*). The link retaining mechanism 370 is similar to the link retaining mechanism 360. Therefore, the detailed description of the link retaining mechanism 370 will be thus omitted from the following description.

In the link retaining mechanism 370, the first short link 371 of the first joint cross linkage of the link retaining mechanism 370 is integrally formed with and fixedly connected with the second arm link 322 of the second arm link mechanism 320, the second long link 373 of the first joint cross linkage of the link retaining mechanism 370 is integrally formed with and fixedly connected with the third arm link 313 of the first arm link mechanism 310 and the third arm link 323 of the second arm link mechanism 320, the first short link 375 of the second joint cross linkage of the link retaining mechanism 370 is integrally formed with and fixedly connected with the third arm link 313 of the first arm link mechanism 310 and the third arm link 323 of the second arm link mechanism 320, the second long link 377 of the second joint cross linkage of the link retaining mechanism 370 is integrally formed with and fixedly connected with the first arm link 311 of the first arm link mechanism 310, and the first long link 378 of the second joint cross linkage of the link retaining mechanism 370 is integrally formed with and fixedly connected with the second short link 372 of the first joint cross linkage of the link retaining mechanism 370.

The link retaining mechanism 370 thus constructed is adapted to keep the line 371*a* passing through the first short link 371 of the first joint cross linkage of the link retaining mechanism 370 forward in the rotation direction 330*a*, in which the first arm link mechanism 310 and the second arm link mechanism 320 are contracted, with respect to the line passing through the second long link 373 of the first joint cross linkage of the link retaining mechanism 370 as shown in FIG. 17(*a*), in comparison with a line passing through the first short link 371 of the first joint cross linkage of the link retaining mechanism 370 expected to be placed with respect to a line passing through the second long link 373 of the first joint cross linkage of the link retaining mechanism 370 when the line 371*a* passing through the first short link 371 of the first joint cross linkage of the link retaining mechanism 370 and the line 377*a* passing through the second long link 377 of the second joint cross linkage of the link retaining mechanism 370 are respectively placed in substantially collinear relationship with the line 322*a* passing through the first arm link 322 of the second arm link mechanism 320 and the line 311*a* passing through the second arm link 311 of the first arm link mechanism 310 as best shown in FIG. 17(*b*) for the reason described hereinlater.

The line passing through the first short link 371 of the first joint cross linkage of the link retaining mechanism 370 forms a seventh angle θ307 with a line passing through the second long link 373 of the first joint cross linkage of the link retaining mechanism 370 when the line 371*a* passing through the first short link 371 of the first joint cross linkage of the link retaining mechanism 370 and the line 377*a* passing through the second long link 377 of the second joint cross linkage of the link retaining mechanism 370 are respectively placed in substantially collinear relationship with the line 322*a* passing through the first arm link 322 of the second arm link mechanism 320 and the line 311*a* passing through the second arm link 311 of the first arm link mechanism 310 as best shown in FIG. 17(*b*) while, on the other hand, the link retaining mechanism 370 is adapted to keep the line 371*a* passing through the first short link 371 of the first joint cross linkage of the link retaining mechanism 370 "forward" in the rotation direction 330*a*, in which the first arm link mechanism 310 and the second arm link mechanism 320 are contracted, with respect to the line passing through the second long link 373 of the first joint cross linkage of the link retaining mechanism 370 so that an angle formed by the line passing through the first short link 371 of the first joint cross linkage of the link retaining mechanism 370 with a line passing through the second long link 373 of the first joint cross linkage of the link retaining mechanism 370 in the rotation direction 33*b* becomes substantially equal to the seventh angle θ307 minus an eighth angle θ308 as shown in FIG. 17(*a*). This means that the link retaining mechanism 370 is adapted to keep the line 371*a* passing through the first short link 371 of the first joint cross linkage of the link retaining mechanism 370 "forward" in the rotation direction 330*a*, in which the first arm link mechanism 310 and the second arm link mechanism 320 are contracted, with respect to the line passing through the second long link 373 of the first joint cross linkage of the link retaining mechanism 370 for the eighth angle θ308 as shown in FIG. 17(*a*) in comparison with a line passing through the first short link 371 of the first joint cross linkage of the link retaining mechanism 370 expected to be placed with respect to a line passing through the second long link 373 of the first joint cross linkage of the link retaining mechanism 370 when the line 371*a* passing through the first short link 371 of the first joint cross linkage of the link retaining mechanism 370 and the line 377*a* passing through the second long link 377 of the second joint cross linkage of the link retaining mechanism 370 are respectively placed in substantially collinear relationship with the line 322*a* passing through the first arm link 322 of the second arm link mechanism 320 and the line 311*a* passing through the second arm link 311 of the first arm link mechanism 310 as best shown in FIG. 17(*b*).

Figure 18:
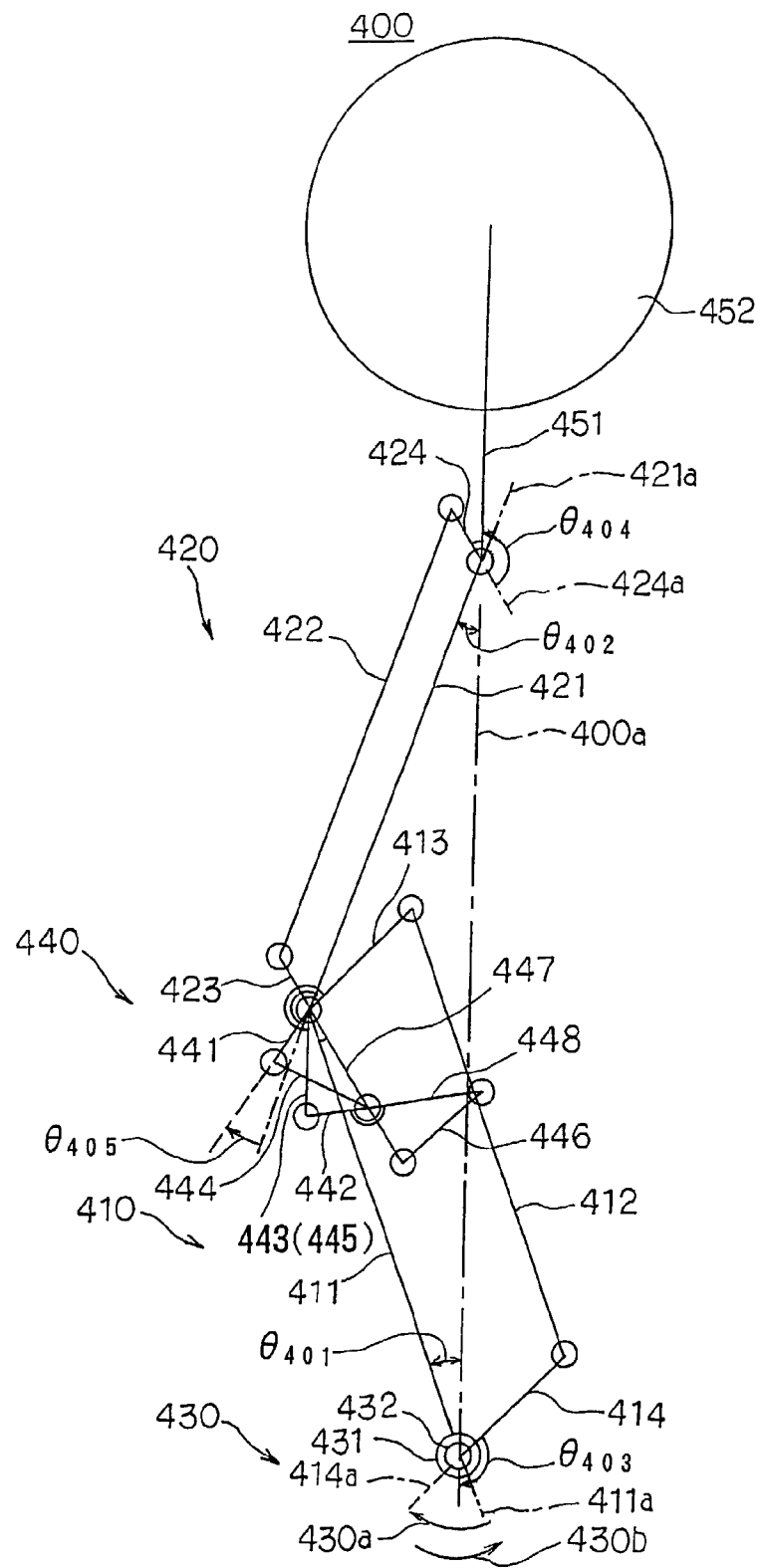
FIG. 18 is a skeleton view of an extended position of a fourth preferred embodiment of the robot arm mechanism according to the present invention.
Figure 19:
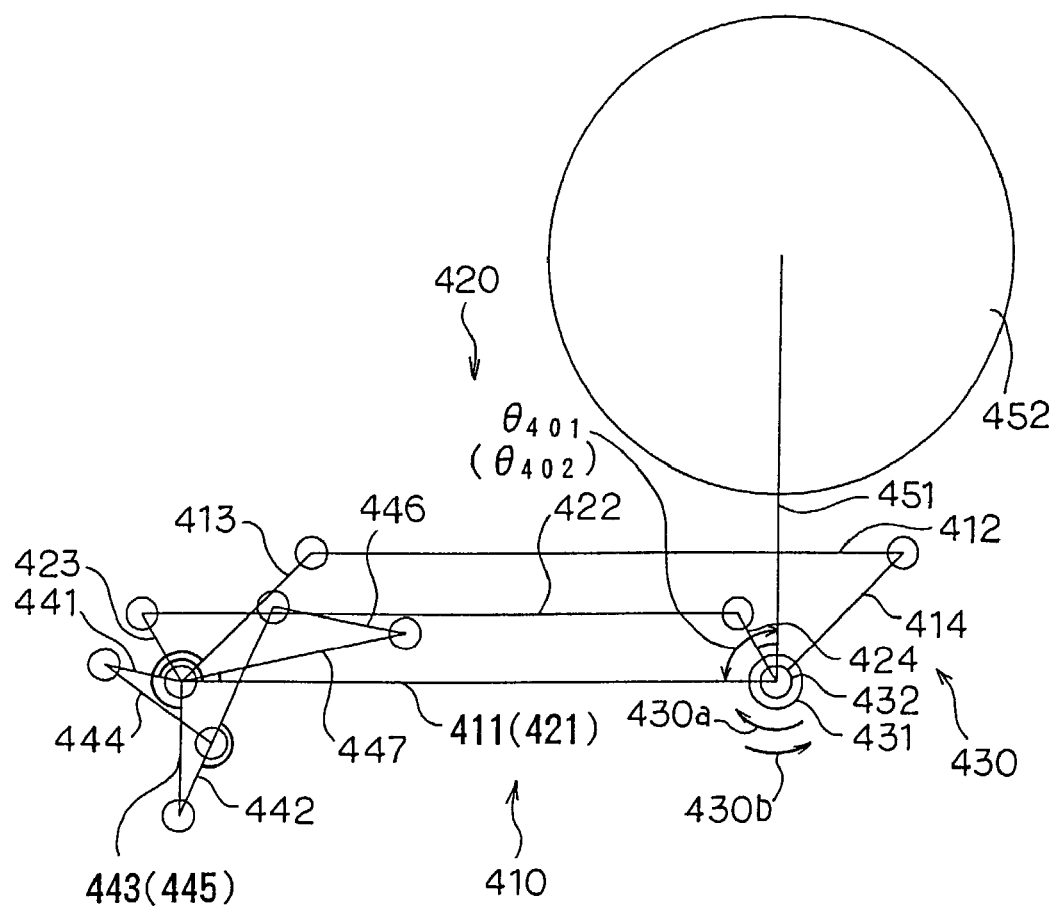
FIG. 19 is a skeleton view of a contracted position of the robot arm mechanism shown in FIG. 18.

Referring to FIGS. 18 and 19 of the drawings, there is shown a fourth preferred embodiment of the robot arm mechanism 400 according to the present invention. The fourth embodiment of the robot arm mechanism 400 is shown in FIG. 18 as comprising: a first arm link mechanism 410, a second arm link mechanism 420, a link retaining mechanism 440, and a robot arm driving mechanism 430.

The first arm link mechanism 410 consists of a first quadric crank chain comprising a first arm link 411, a second arm link 412, a third arm link 413, and a fourth arm link 414. The second arm link 412 is substantially in parallel relationship with the first arm link 411. The fourth arm link 414 is substantially in parallel relationship with the third arm link 413. The second arm link mechanism 420 consists of a second quadric crank chain comprising a first arm link 421, a second arm link 422, a third arm link 423, and a fourth arm link 424. The second arm link mechanism 420 is pivotably connected with the first arm link mechanism 410. The second arm link 422 is substantially in parallel relationship with the first arm link 421. The fourth arm link 424 is substantially in parallel relationship with the third arm link 423.

The link retaining mechanism 440 has a reference line 400a as shown in FIG. 18. The link retaining mechanism 440 is adapted to pivotably retain the first arm link mechanism 410 and the second arm link mechanism 420 respectively and keep a first angle substantially equal to a second angle, wherein the first angle θ401 is intended to mean an angle formed by a line passing through the first arm link 411 of the first arm link mechanism 410 with the reference line 400a and the second angle θ402 is intended to mean an angle formed by a line passing through the first arm link 421 of the second arm link mechanism 420 with the reference line 400a.

The link retaining mechanism 440 comprises a first joint cross linkage and a second joint cross linkage. The first joint cross linkage consists of a third quadric crank chain including a first short link 441, a first long link 444, a second short link 442, and a second long link 443. The first long link 444 is longer than the first short link 441 of the first joint cross linkage of the link retaining mechanism 440. The second short link 442 is substantially equal in length to the first short link 441 of the first joint cross linkage of the link retaining mechanism 440. The second long link 443 is substantially equal in length to the first long link 444 of the first joint cross linkage of the link retaining mechanism 440, and crossed with the first long link 444 of the first joint cross linkage of the link retaining mechanism 440. The first short link 441 of the first joint cross linkage of the link retaining mechanism 440 is integrally formed with and fixedly connected with the first arm link 421 of the second arm link mechanism 420. The second long link 443 of the first joint cross linkage of the link retaining mechanism 440 is integrally formed with and fixedly connected with the third arm link 413 of the first arm link mechanism 410 and third arm link 423 of the second arm link mechanism 420.

The second joint cross linkage consists of a fourth quadric crank chain including a first short link 445, a first long link 448, a second short link 446, and a second long link 447. The first short link 445 is substantially equal in length to the second long link 443 of the first joint cross linkage of the link retaining mechanism 440. The first long link 448 is longer than the first short link 445 of the second joint cross linkage of the link retaining mechanism 440. The second short link 446 is substantially equal in length to the first short link 445 of the second joint cross linkage of the link retaining mechanism 440. The second long link 447 is substantially equal in length to the first long link 448 of the second joint cross linkage of the link retaining mechanism 440, and crossed with the first long link 448 of the second joint cross linkage of the link retaining mechanism 440. The first short link 445 of the second joint cross linkage of the link retaining mechanism 440 is integrally formed with and fixedly connected with third arm link 413 of the first arm link mechanism 410 and third arm link 423 of the second arm link mechanism 420. The second long link 447 of the second joint cross linkage of the link retaining mechanism 440 is integrally formed with and fixedly connected with the first arm link 411 of the first arm link mechanism 410. The first long link 448 of the second joint cross linkage of the link retaining mechanism 440 is integrally formed with and fixedly connected with the second short link 442 of the first joint cross linkage of the link retaining mechanism 440.

The link retaining mechanism 440 is adapted to keep a line passing through the first short link 441 of the first joint cross linkage of the link retaining mechanism 440 forward in a rotation direction 430a, in which the first arm link mechanism 410 and the second arm link mechanism 420 are contracted, with respect to a line passing through the second long link 443 of the first joint cross linkage of the link retaining mechanism 440 in comparison with a line passing through the first short link 441 of the first joint cross linkage of the link retaining mechanism 440 expected to be placed with respect to a line passing through the second long link 443 of the first joint cross linkage of the link retaining mechanism 440 when the first short link 441 of the first joint cross linkage of the link retaining mechanism 440 and the second long link 447 of the second joint cross linkage of the link retaining mechanism 440 are respectively placed in substantially collinear relationship with the first arm link 421 of the second arm link mechanism 420 and the first arm link 411 of the first arm link mechanism 410

The robot arm driving mechanism 430 comprises a first driving shaft 431 and a second driving shaft 432. The first driving shaft 431 is adapted to rotate the first arm link 411 of the first arm link mechanism 410 around a rotation axis in any one of two rotation directions consisting of a first rotation direction 430a in which the first arm link mechanism 410 and the second arm link mechanism 420 are extended, and a second rotation direction 430b in which the first arm link mechanism 410 and the second arm link mechanism 420 are contracted. The second driving shaft 432 is adapted to rotate the fourth arm link 414 of the first arm link mechanism 410 around the rotation axis in any one of two rotation directions consisting of the first rotation direction 430a and the second rotation direction 430b.

The first arm link mechanism 410, the second arm link mechanism 420, the link retaining mechanism 440, and the robot arm driving mechanism 430 of the robot arm mechanism 400 are similar to the first arm link mechanism 110, the second arm link mechanism 120, the link retaining mechanism 110, and the robot arm driving mechanism 130 of the first embodiment of the robot arm mechanism 100. Therefore, the detailed description will be thus omitted from the following description.

The robot arm mechanism 400 further comprises a robot arm member 451 and a handling member 452. The robot arm member 451 has first and second end portions. The first end portion of the robot arm member 451 is integrally formed with and fixedly connected with one of the second arm link 122 and the fourth arm link 124 of the second arm link mechanism 120. The handling member 452 is integrally formed with and fixedly connected with the second end portion of the robot arm member 451, and adapted to support and handle an object. According to the present invention, the handling member 452 may be adapted to, for example, grip the object.

The robot arm driving mechanism 430 is adapted to rotate the first arm link 411 of the first arm link mechanism 410 around the rotation axis in the first rotation direction 430a, and the fourth arm link 414 of the first arm link mechanism 410 around the rotation axis in any one of two directions consisting of the first rotation direction 430a and the second rotation direction 430b while maintaining the first angle θ401 formed by a line passing through the first arm link 411 of the first arm link mechanism 410 with the reference line 400a less than a third angle θ403 formed by a line passing through the fourth arm link 414 of the first arm link mechanism 410 with the reference line 400a in the first rotation direction 430a as well as maintaining the second angle θ402 formed by a line passing through the first arm link 421 of the second arm link mechanism 420 with the reference line 400a less than a fourth angle θ404 formed by a line passing through the fourth arm link 424 of the second arm link mechanism 420 with the reference line 400a in the rotation direction 430b opposite to the first rotation direction 430a.

The fourth embodiment of the robot arm mechanism 400 has the following features:

Feature 1

The robot arm mechanism 400 in which the robot arm driving mechanism 430 is operative to rotate the first arm link 411 of the first arm link mechanism 410 around the rotation axis in the first rotation direction 430a, and the fourth arm link 414 of the first arm link mechanism 410 around the rotation axis in any one of two directions consisting of the first rotation direction 430a and the second rotation direction 430b while maintaining the first angle θ401 formed by a line passing through the first arm link 411 of the first arm link mechanism 410 with the reference line 400a less than a third angle θ403 formed by a line passing through the fourth arm link 414 of the first arm link mechanism 410 with the reference line 400a in the first rotation direction 430a, can prevent the quadric crank chain constituting the first arm link mechanism 410 from being flattened out while the first arm link mechanism 410 and the second arm link mechanism 420 are extended, thereby improving resistance to deformation while the first arm link mechanism 410 and the second arm link mechanism 420 are extended as shown in FIG. 18, in comparison with the conventional robot arm mechanism 900 shown in FIG. 20.

Feature 2

The robot arm mechanism 400, in which the robot arm driving mechanism 430 is adapted to rotate the first arm link 411 of the first arm link mechanism 410 around the rotation axis in the first rotation direction 430a, and the fourth arm link 414 of the first arm link mechanism 410 around the rotation axis in any one of two directions consisting of the first rotation direction 430a and the second rotation direction 430b while maintaining the second angle θ402 formed by a line 421a passing through the first arm link 421 of the second arm link mechanism 420 with the reference line 400a less than a fourth angle θ404 formed by a line 424a passing through the fourth arm link 424 of the second arm link mechanism 420 with the reference line 400a in the rotation direction 430b opposite to the first rotation direction 430a, can prevent the quadric crank chain constituting the second arm link mechanism 420 from being flattened out while the first arm link mechanism 410 and the second arm link mechanism 420 are extended, thereby improving resistance to deformation while the first arm link mechanism 410 and the second arm link mechanism 420 are extended as shown in FIG. 18, in comparison with the conventional robot arm mechanism 900 shown in FIG. 20.

Feature 3

The robot arm mechanism 400, in which the line 441a passing through the first short link 441 of the first joint cross linkage of the link retaining mechanism 440 is kept "forward" in a rotation direction 430a, in which the first arm link mechanism 410 and the second arm link mechanism 420 are contracted, can prevent the quadric crank chains constituting the link retaining mechanism 440 from being flattened out while the first arm link mechanism 410 and the second arm link mechanism 420 are extended, thereby improving resistance to deformation while the first arm link mechanism 410 and the second arm link mechanism 420 are extended as shown in FIG., in comparison with the link retaining mechanism 940 of the conventional robot arm mechanism 900 shown in FIG. 20 for the reason described hereinlater.

While it has been described in the above that the handling member 452 is fixedly connected with the second end portion of the robot arm member 451, the handling member 452 may be fixedly connected with the second arm link mechanism 420 with out the handling member 452 in a manner that the handling member 452 is fixedly connected with, for example, one of the arm links constituting the second arm link mechanism 420 such as, for example, the first, second, and fourth arm link 421, 422, and 424.

From the foregoing description, it is to be understood that the fourth embodiment of the robot arm mechanism 400 has functions and advantages similar to the first embodiment of the robot arm mechanism 100 (see FIG. 1), the second embodiment of the robot arm mechanism 200 (see FIG. 6), and the third embodiment of the robot arm mechanism 300 (see FIG. 11).

The fourth embodiment of the robot arm mechanism 400 may have at least two of the above features. In the fourth embodiment of the robot arm mechanism 400 having the aforesaid Features 1 and 2 only, the link retaining mechanism 440 of the robot arm mechanism 400 may be replaced by any link retaining mechanism such as, for example, synchronous gears, pulley and belt mechanism publicly known in the art, as long as the link retaining mechanism is operative to pivotably retain the first arm link mechanism 410 and the second arm link mechanism 420 respectively and keep the first angle θ401 formed by a line passing through the first arm link 411 of the first arm link mechanism 410 with the reference line 400a substantially equal to the second angle θ402 formed by a line passing through the first arm link 421 of the second arm link mechanism 420 with the reference line 400a.

As will be seen from the above, there has been described in the previous preferred embodiments of the robot arm mechanism according to the present invention that arm links constituting the first arm link mechanism or the second arm link mechanism are kept forward in a rotation direction, in which the first arm link mechanism and the second arm link mechanism are extended, or the first short link of the first joint cross linkage of the link retaining mechanism is kept "forward" in a rotation direction, in which the first arm link mechanism and the second arm link mechanism are contracted in order to provide a robot arm mechanism which is resistant to deformation while the first arm link mechanism and the second arm link mechanism are extended. On the contrary, arm links constituting the first arm link mechanism or the second arm link mechanism of the robot arm mechanism according to the present invention may be kept backward in a rotation direction, in which the first arm link mechanism and the second arm link mechanism are extended, or the first short link of the first joint cross linkage of the link retaining mechanism of the robot arm mechanism according to the present invention may be kept "backward" in a rotation direction, in which the first arm link mechanism and the second arm link mechanism are contracted in order to provide a robot arm mechanism which is resistant to deformation while the first arm link mechanism and the second arm link mechanism are contracted.

The many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described herein, and accordingly, all suitable modifications and equivalents may be construed as being encompassed within the scope of the invention.

What is claimed is:

1. A robot arm mechanism comprising:
   a first arm link mechanism consisting of a first quadric crank chain comprising a first arm link, a second arm link substantially in parallel relationship with said first arm link, a third arm link, and a fourth arm link substantially in parallel relationship with said third arm link;
   a second arm link mechanism consisting of a second quadric crank chain comprising a first arm link, a second arm link substantially in parallel relationship with said first arm link, a third arm link, and a fourth arm link substantially in parallel relationship with said third arm link, said third arm link of said second arm link mechanism being fixedly connected with said third arm link of said first arm link mechanism, said second arm link mechanism is pivotably connected with said first arm link mechanism;
   a link retaining mechanism having a reference line, said link retaining mechanism pivotably retaining said first arm link mechanism and said second arm link mechanism respectively and keeping a first angle substantially equal to a second angle, said first angle being an angle formed by a line passing through said first arm link of said first arm link mechanism with said reference line, said second angle being an angle formed by a line passing through said first arm link of said second arm link mechanism with said reference line;
   a robot arm driving mechanism comprising; a first driving shaft operative to rotate said first arm link of said first arm link mechanism around a rotation axis in any one of two rotation directions consisting of a first rotation direction in which said first arm link mechanism and said second arm link mechanism are extended, and a second rotation direction in which said first arm link mechanism and said second arm link mechanism are contracted; and
   a handling member for supporting and handling an object, connected with said second arm link mechanism, whereby
   said robot arm driving mechanism is operative to rotate said first arm link of said first arm link mechanism around said rotation axis in said first rotation direction, and said fourth arm link of said first arm link mechanism around said rotation axis in any one of two directions consisting of said first rotation direction and said second rotation direction while maintaining said first angle formed by a line passing through said first arm link of said first arm link mechanism with said reference line less than a third angle formed to be less than 180 degrees by a line passing through said fourth arm link of said first arm link mechanism with said reference line in said first rotation direction.

2. A robot arm mechanism as set forth in claim 1, in which said third angle is set to an angle so that said first arm link and said fourth arm link of said first arm link mechanism become substantially perpendicular to each other when said first arm link mechanism and said second arm link mechanism are extended to its their limits.

3. A robot arm mechanism as set forth in claim 1, in which said first arm link of said first arm link mechanism has a driving end portion and a supporting end portion, said second arm link, said third arm link, and said fourth arm link of said first arm link mechanism respectively have first and second end portions, said first and third arm links of said first arm link mechanism are pivotably connected with each other at said supporting end portion of said first arm link of said first arm link mechanism and said first end portion of said third arm link of said first arm link mechanism, said third and second arm links of said first arm link mechanism are pivotably connected with each other at said second end portion of said third arm link of said first arm link mechanism and said first end portion of said second arm link of said first arm link mechanism, said second and fourth arm links of said first arm link mechanism are pivotably connected with each other at said second end portion of said second arm link of said first arm link mechanism and said first end portion of said fourth arm link of said first arm link mechanism, said fourth and first arm links of said first arm link mechanism are pivotably connected with each other at said second end portion of said fourth arm link of said first arm link mechanism and said driving end portion of said first arm link of said first arm link mechanism, said first arm link of said second arm link mechanism has a supporting end portion and a handling end portion, said second arm link, said third arm link, and said fourth arm link of said second arm link mechanism respectively have first and second end portions, said first and third arm links of said second arm link mechanism are pivotably connected with each other at said supporting end portion of said first arm link of said second arm link mechanism and said first end portion of said third arm link of said second arm link mechanism, said third and second arm links of said second arm link mechanism are pivotably connected with each other at said second end portion of said third arm link of said second arm link mechanism and said first end portion of said second arm link of said second arm link mechanism, said second and fourth arm links of said second arm link mechanism are pivotably connected with each other at said second end portion of said second arm link of said second arm link mechanism and said first end portion of said fourth arm link of said second arm link mechanism, said fourth and first arm links of said second arm link mechanism are pivotably connected with each other at said second end portion of said fourth arm link of said second arm link mechanism and said handling end portion of said first arm link of said second arm link mechanism, said link retaining mechanism comprises:

a first joint cross linkage including
- a first short link having first and second end portions, said first short link of said first joint cross linkage of said link retaining mechanism fixedly connected with said first arm link of said second arm link mechanism,
- a first long link having first and second end portions and longer than said first short link of said first joint cross linkage of said link retaining mechanism, said first short and long links of said first joint cross linkage of said link retaining mechanism pivotably connected with each other at said second end portion of said first short link of said first joint cross linkage of said link retaining mechanism and said first end portion of said first long link of said first joint cross linkage of said link retaining mechanism,
- a second short link having first and second end portions and substantially equal in length to said first short link of said first joint cross linkage of said link retaining mechanism, said first long link of said first joint cross linkage of said link retaining mechanism and said second short link of said first joint cross linkage of said link retaining mechanism pivotably connected with each other at said second end portion of said first long link of said first joint cross linkage of said link retaining mechanism and said first end portion of said second short link of said first joint cross linkage of said link retaining mechanism, and
- a second long link having first and second end portions and substantially equal in length to said first long link of said first joint cross linkage of said link retaining mechanism, said second short and long links of said first joint cross linkage of said link retaining mechanism pivotably connected with each other at said second end portion of said second short link of said first joint cross linkage of said link retaining mechanism and said first end portion of said second long link of said first joint cross linkage of said link retaining mechanism, said second long link of said first joint cross linkage of said link retaining mechanism and said first short link of said first joint cross linkage of said link retaining mechanism pivotably connected with each other at said second end portion of said second long link of said first joint cross linkage of said link retaining mechanism and said first end portion of said first short link of said first joint cross linkage of said link retaining mechanism under the state that said second long link of said first joint cross linkage of said link retaining mechanism is crossed with said first long link of said first joint cross linkage of said link retaining mechanism, said second long link of said first joint cross linkage of said link retaining mechanism fixedly connected with said third arm link of said first arm link mechanism, a second joint cross linkage including:
- a first short link having first and second end portions, said first short link of said second joint cross linkage of said link retaining mechanism substantially equal in length to said second long link of said first joint cross linkage of said link retaining mechanism, and fixedly connected with said third arm link of said second arm link mechanism,
- a first long link having first and second end portions and longer than said first short link of said second joint cross linkage of said link retaining mechanism, said first short and long links of said second joint cross linkage of said link retaining mechanism pivotably connected with each other at said second end portion of said first short link of said second joint cross linkage of said link retaining mechanism and said first end portion of said first long link of said second joint cross linkage of said link retaining mechanism, said second short link of said first joint cross linkage of said link retaining mechanism fixedly connected with said first long link of said second joint cross linkage of said link retaining mechanism,
- a second short link having first and second end portions and substantially equal in length to said first short link of said second joint cross linkage of said link retaining mechanism, said first long link of said second joint cross linkage of said link retaining mechanism and said second short link of said second joint cross linkage of said link retaining mechanism pivotably connected with each other at said second end portion of said first long link of said second joint cross linkage of said link retaining mechanism and said first end portion of said second short link of said second joint cross linkage of said link retaining mechanism, and
- a second long link having first and second end portions and substantially equal in length to said first long link of said second joint cross linkage of said link retaining mechanism, said second short and long links of said second joint cross linkage of said link retaining mechanism pivotably connected with each other at said second end portion of said second short link of said second joint cross linkage of said link retaining mechanism and said first end portion of said second long link of said second joint cross linkage of said link retaining mechanism, said second long link of said second joint cross linkage of said link retaining mechanism and said first short link of said second joint cross linkage of said link retaining mechanism pivotably connected with each other at said second end portion of said second long link of said second joint cross linkage of said link retaining mechanism and said first end portion of said first short link of said second joint cross linkage of said link retaining mechanism under the state that said second long link of said second joint cross linkage of said link retaining mechanism is crossed with said first long link of said second joint cross linkage of said link retaining mechanism, said second long link of said second joint cross linkage of said link retaining mechanism fixedly connected with said first arm link of said first arm link mechanism.

4. A robot arm mechanism comprising:
- a first arm link mechanism consisting of a first quadric crank chain comprising a first arm link, a second arm link substantially in parallel relationship with said first arm link, a third arm link, and a fourth arm link substantially in parallel relationship with said third arm link;
- a second arm link mechanism consisting of a second quadric crank chain comprising a first arm link, a second arm link substantially in parallel relationship with said first arm link, a third arm link, and a fourth arm link substantially in parallel relationship with said third arm link, said third arm link of said second arm link mechanism being fixedly connected with said third arm link of said first arm link mechanism, said second arm link mechanism is pivotably connected with said first arm link mechanism;

a link retaining mechanism having a reference line, said link retaining mechanism pivotably retaining said first arm link mechanism and said second arm link mechanism respectively and keeping a first angle substantially equal to a second angle, said first angle being an angle formed by a line passing through said second arm link of said first arm link mechanism with said reference line, said second angle being an angle formed by a line passing through said first arm link of said second arm link mechanism with said reference line;

a handling member for supporting and handling an object, connected with said second arm link mechanism; and a robot arm driving mechanism comprising: a first driving shaft operative to rotate said first arm link of said first arm link mechanism around a rotation axis in any one of two rotation directions consisting of a first rotation direction in which said first arm link of said second arm link mechanism rotates in a rotation direction opposite to said first rotation direction, and said first arm link mechanism and said second arm link mechanism are extended, and a second rotation direction in which said first arm link of said second arm link mechanism rotates in a rotation direction opposite to said second rotation direction, and said first arm link mechanism and said second arm link mechanism are contracted, whereby said robot arm driving mechanism is operative to rotate said first arm link of said first arm link mechanism around said rotation axis in said first rotation direction, and said fourth arm link of said first arm link mechanism around said rotation axis in any one of two directions consisting of said first rotation direction and said second rotation direction while maintaining said second angle formed to be less than 180 degrees by a line passing through said first arm link of said second arm link mechanism with said reference line less than a third angle formed by a line passing through said fourth arm link of said second arm link mechanism with said reference line in said rotation direction opposite to said first rotation direction.

5. A robot arm mechanism as set forth in claim 4, in which said third angle is set to an angle so that said first arm link and said fourth arm link of said second arm link mechanism become substantially perpendicular to each other when said first arm link mechanism and said second arm link mechanism are extended to its their limits.

6. A robot arm mechanism as set forth in claim 4, in which said first arm link of said first arm link mechanism has a driving end portion and a supporting end portion, said second arm link, said third arm link, and said fourth arm link of said first arm link mechanism respectively have first and second end portions, said first and third arm links of said first arm link mechanism are pivotably connected with each other at said supporting end portion of said first arm link of said first arm link mechanism and said first end portion of said third arm link of said first arm link mechanism, said third and second arm links of said first arm link mechanism are pivotably connected with each other at said second end portion of said third arm link of said first arm link mechanism and said first end portion of said second arm link of said first arm link mechanism, said second and fourth arm links of said first arm link mechanism are pivotably connected with each other at said second end portion of said second arm link of said first arm link mechanism and said first end portion of said fourth arm link of said first arm link mechanism, said fourth and first arm links of said first arm link mechanism are pivotably connected with each other at said second end portion of said fourth arm link of said first arm link mechanism and said driving end portion of said first arm link of said first arm link mechanism, said first arm link of said second arm link mechanism has a supporting end portion and a handling end portion, said second arm link, said third arm link, and said fourth arm link of said second arm link mechanism respectively have first and second end portions, said first and third arm links of said second arm link mechanism are pivotably connected with each other at said supporting end portion of said first arm link of said second arm link mechanism and said first end portion of said third arm link of said second arm link mechanism, said third and second arm links of said second arm link mechanism are pivotably connected with each other at said second end portion of said third arm link of said second arm link mechanism and said first end portion of said second arm link of said second arm link mechanism, said second and fourth arm links of said second arm link mechanism are pivotably connected with each other at said second end portion of said second arm link of said second arm link mechanism and said first end portion of said fourth arm link of said second arm link mechanism, said fourth and first arm links of said second arm link mechanism are pivotably connected with each other at said second end portion of said fourth arm link of said second arm link mechanism and said handling end portion of said first arm link of said second arm link mechanism, said link retaining mechanism comprises:

a first joint cross linkage including:

a first short link having first and second end portions, said first short link of said first joint cross linkage of said link retaining mechanism fixedly connected with said first arm link of said second arm link mechanism, a first long link having first and second end portions and longer than said first short link of said first joint cross linkage of said link retaining mechanism, said first short and long links of said first joint cross linkage of said link retaining mechanism pivotably connected with each other at said second end portion of said first short link of said first joint cross linkage of said link retaining mechanism and said first end portion of said first long link of said first joint cross linkage of said link retaining mechanism, a second short link having first and second end portions and substantially equal in length to said first short link of said first joint cross linkage of said link retaining mechanism, said first long link of said first joint cross linkage of said link retaining mechanism and said second short link of said first joint cross linkage of said link retaining mechanism pivotably connected with each other at said second end portion of said first long link of said first joint cross linkage of said link retaining mechanism and said first end portion of said second short link of said first joint cross linkage of said link retaining mechanism, and a second long link having first and second end portions and substantially equal in length to said first long link of said first joint cross linkage of said link retaining mechanism, said second short and long links of said first joint cross linkage of said link retaining mechanism pivotably connected with each other at said second end portion of said second short link of said first joint cross linkage of said link retaining mechanism and said first end portion of said second long link of said first joint cross linkage of said link retaining mechanism, said second long link of said first joint cross linkage of said link retaining mechanism and said first short link of said first joint cross linkage of said link retaining mechanism pivotably connected with each other at said second end portion of said second long link of said first joint cross linkage of said link retaining mechanism and said first end portion of said first short link of said first joint cross linkage of said link retaining mechanism under the state that said second long link of said first joint cross linkage of said link retaining mechanism is crossed with said first long link of said first joint cross linkage of said link retaining mechanism, said second long link of said first joint cross linkage of said link retaining mechanism fixedly connected with said third arm link of said first arm link mechanism, a second joint cross linkage including:

a first short link having first and second end portions, said first short link of said second joint cross linkage of said link retaining mechanism substantially equal in length to said second long link of said first joint cross linkage of said link retaining mechanism, and fixedly connected with said third arm link of said second arm link mechanism, a first long link having first and second end portions and longer than said first short link of said second joint cross linkage of said link retaining mechanism, said first short and long links of said second joint cross linkage of said link retaining mechanism pivotably connected with each other at said second end portion of said first short link of said second joint cross linkage of said link retaining mechanism and said first end portion of said first long link of said second joint cross linkage of said link retaining mechanism, said second short link of said first joint cross linkage of said link retaining mechanism fixedly connected with said first long link of said second joint cross linkage of said link retaining mechanism, a second short link having first and second end portions and substantially equal in length to said first short link of said second joint cross linkage of said link retaining mechanism, said first long link of said second joint cross linkage of said link retaining mechanism and said second short link of said second joint cross linkage of said link retaining mechanism pivotably connected with each other at said second end portion of said first long link of said second joint cross linkage of said link retaining mechanism and said first end portion of said second short link of said second joint cross linkage of said link retaining mechanism, and a second long link having first and second end portions and substantially equal in length to said first long link of said second joint cross linkage of said link retaining mechanism, said second short and long links of said second joint cross linkage of said link retaining mechanism pivotably connected with each other at said second end portion of said second short link of said second joint cross linkage of said link retaining mechanism and said first end portion of said second long link of said second joint cross linkage of said link retaining mechanism, said second long link of said second joint cross linkage of said link retaining mechanism and said first short link of said second joint cross linkage of said link retaining mechanism pivotably connected with each other at said second end portion of said second long link of said second joint cross linkage of said link retaining mechanism and said first end portion of said first short link of said second joint cross linkage of said link retaining mechanism under the state that said second long link of said second joint cross linkage of said link retaining mechanism is crossed with said first long link of said second joint cross linkage of said link retaining mechanism, said second long link of said second joint cross linkage of said link retaining mechanism fixedly connected with said first arm link of said first arm link mechanism.

7. A robot arm mechanism comprising:

a first arm link mechanism consisting of a first quadric crank chain comprising a first arm link, a second arm link substantially in parallel relationship with said first arm link, a third arm link, and a fourth arm link substantially in parallel relationship with said third arm link;

a second arm link mechanism consisting of a second quadric crank chain comprising a first arm link, a second arm link substantially in parallel relationship with said first arm link, a third arm link, and a fourth arm link substantially in parallel relationship with said third arm link, said second arm link mechanism is pivotably connected with said first arm link mechanism; and a link retaining mechanism having a reference line, said link retaining mechanism pivotably retaining said first arm link mechanism and said second arm link mechanism respectively and keeping a first angle substantially equal to a second angle, said first angle being an angle formed by a line passing through said second arm link of said first arm link mechanism with said reference line, said second angle being an angle formed by a line passing through said first arm link of said second arm link mechanism with said reference line;

said link retaining mechanism comprising:

a first joint cross linkage consisting of a third quadric crank chain including: a first short link, a first long link longer than said first short link of said first joint cross linkage of said link retaining mechanism, a second short link substantially equal in length to said first short link of said first joint cross linkage of said link retaining mechanism, and a second long link substantially equal in length to said first long link of said first joint cross linkage of said link retaining mechanism, and crossed with said first long link of said first joint cross linkage of said link retaining mechanism, one of said first short link and said second short link of said first joint cross linkage of said link retaining mechanism fixedly connected with one of said first arm link and said second arm link of said first arm link mechanism and said first arm link and said second arm link of said second arm link mechanism and one of said first long link and said second long link of said first joint cross linkage of said link retaining mechanism fixedly connected with one of said third arm link and said fourth arm link of said first arm link mechanism, a second joint cross linkage consisting of a fourth quadric crank chain including: a first short link, a first long link longer than said first short link of said second joint cross linkage of said link retaining mechanism, a second short link substantially equal in length to said first short link of said second joint cross linkage of said link retaining mechanism, and a second long link substantially equal in length to said first long link of said second joint cross linkage of said link retaining mechanism, and crossed with said first long link of said second joint cross linkage of said link retaining mechanism, one of said first short link and said second short link of said second joint cross linkage of said link retaining mechanism fixedly connected with one of said first long link and said second long link of said first joint cross linkage of said link retaining mechanism, one of said first long link and said second long link of said second joint cross linkage of said link retaining mechanism fixedly connected with one of the remaining ones of said first arm link and said second arm link of said first arm link mechanism and said first arm link and said second arm link of said second arm link mechanism, and the other one of said first long link and said second long link of said second joint cross linkage of said link retaining mechanism fixedly connected with one of the remaining ones of said first short link and said second short link of said first joint cross linkage of said link retaining mechanism, a handling member for supporting and handling an object, connected with said second arm link mechanism, and a robot arm driving mechanism comprising: a first driving shaft operative to rotate said first arm link of said first arm link mechanism around a rotation axis in any one of two rotation directions consisting of a first rotation direction in which said first arm link of said second arm link mechanism rotates in a rotation direction opposite to said first rotation direction, and said first arm link mechanism and said second arm link mechanism are extended, and a second rotation direction in which said first arm link of said second arm link mechanism rotates in a rotation direction opposite to said second rotation direction, and said first arm link mechanism and said second arm link mechanism are contracted, whereby said link retaining mechanism is operative to keep a line passing through said one of said first short link and said second short link of said first joint cross linkage of said link retaining mechanism forward in a rotation direction, in which said first arm link mechanism and said second arm link mechanism are contracted, with respect to a line passing through said one of said first long link and said second long link of said first joint cross linkage of said link retaining mechanism in comparison with a line passing through said one of said first short link and said second short link of said first joint cross linkage of said link retaining mechanism expected to be placed with respect to a line passing through said one of said first long link and said second long link of said first joint cross linkage of said link retaining mechanism when said one of said first short link and said second short link of said first joint cross linkage of said link retaining mechanism and said one of said first long link and said second long link of said second joint cross linkage of said link retaining mechanism are respectively placed in substantially collinear relationship with said one of said first arm link and said second arm link of said first arm link mechanism and said first arm link and said second arm link of said second arm link mechanism and said one of the remaining ones of said first arm link and said second arm link of said first arm link mechanism and said first arm link and said second arm link of said second arm link mechanism.

8. A robot arm mechanism as set forth in claim 7, in which said first arm link of said first arm link mechanism has a driving end portion and a supporting end portion, said second arm link, said third arm link, and said fourth arm link respectively have first and second end portions, said first and third arm links of said first arm link mechanism are pivotably connected with each other at said supporting end portion of said first arm link of said first arm link mechanism and said first end portion of said third arm link of said first arm link mechanism, said third and second arm links of said first arm link mechanism are pivotably connected with each other at said second end portion of said third arm link of said first arm link mechanism and said first end portion of said second arm link of said first arm link mechanism, said second and fourth arm links of said first arm link mechanism are pivotably connected with each other at said second end portion of said second arm link of said first arm link mechanism and said first end portion of said fourth arm link of said first arm link mechanism, said fourth and first arm links of said first arm link mechanism are pivotably connected with each other at said second end portion of said fourth arm link of said first arm link mechanism and said driving end portion of said first arm link of said first arm link mechanism, said first arm link of said second arm link mechanism has a supporting end portion and a handling end portion, said second arm link, said third arm link, and said fourth arm link of said second arm link mechanism respectively have first and second end portions, said first and third arm links of said second arm link mechanism are pivotably connected with each other at said supporting end portion of said first arm link of said second arm link mechanism and said first end portion of said third arm link of said second arm link mechanism, said third and second arm links of said second arm link mechanism are pivotably connected with each other at said second end portion of said third arm link of said second arm link mechanism and said first end portion of said second arm link of said second arm link mechanism, said second and fourth arm links of said second arm link mechanism are pivotably connected with each other at said second end portion of said second arm link of said second arm link mechanism and said first end portion of said fourth arm link of said second arm link mechanism, said fourth and first arm links of said second arm link mechanism are pivotably connected with each other at said second end portion of said fourth arm link of said second arm link mechanism and said handling end portion of said first arm link of said second arm link mechanism, said third arm link of said second arm link mechanism fixedly connected with said third arm link of said first arm link mechanism, said first short link of said first joint cross linkage of said link retaining mechanism has first and second end portions, and is fixedly connected with said first arm link of said second arm link mechanism, said first long link has first and second end portions and is longer than said first short link of said first joint cross linkage of said link retaining mechanism, said first short and long links of said first joint cross linkage of said link retaining mechanism are pivotably connected with each other at said second end portion of said first short link of said first joint cross linkage of said link retaining mechanism and said first end portion of said first long link of said first joint cross linkage of said link retaining mechanism, said second short link has first and second end portions and is substantially equal in length to said first short link of said first joint cross linkage of said link retaining mechanism, said first long link of said first joint cross linkage of said link retaining mechanism and said second short link of said first joint cross linkage of said link retaining mechanism are pivotably connected with each other at said second end portion of said first long link of said first joint cross linkage of said link retaining mechanism and said first end portion of said second short link of said first joint cross linkage of said link retaining mechanism, said second long link has first and second end portions and is substantially equal in length to said first long link of said first joint cross linkage of said link retaining mechanism, said second short and long links of said first joint cross linkage of said link retaining mechanism are pivotably connected with each other at said second end portion of said second short link of said first joint cross linkage of said link retaining mechanism and said first end portion of said second long link of said first joint cross linkage of said link retaining mechanism, said second long link of said first joint cross linkage of said link retaining mechanism and said first short link of said first joint cross linkage of said link retaining mechanism are pivotably connected with each other at said second end portion of said second long link of said first joint cross linkage of said link retaining mechanism and said first end portion of said first short link of said first joint cross linkage of said link retaining mechanism under the state that said second long link of said first joint cross linkage of said link retaining mechanism is crossed with said first long link of said first joint cross linkage of said link retaining mechanism, said second long link of said first joint cross linkage of said link retaining mechanism is fixedly connected with said third arm link of said first arm link mechanism, said first short link of said second joint cross linkage of said link retaining mechanism has first and second end portions, is substantially equal in length to said second long link of said first joint cross linkage of said link retaining mechanism, and fixedly connected with said third arm link of said second arm link mechanism, said first long link has first and second end portions and is longer than said first short link of said second joint cross linkage of said link retaining mechanism, said first short and long links of said second joint cross linkage of said link retaining mechanism are pivotably connected with each other at said second end portion of said first short link of said second joint cross linkage of said link retaining mechanism and said first end portion of said first long link of said second joint cross linkage of said link retaining mechanism, said second short link of said first joint cross linkage of said link retaining mechanism is fixedly connected with said first long link of said second joint cross linkage of said link retaining mechanism, said second short link has first and second end portions and is substantially equal in length to said first short link of said second joint cross linkage of said link retaining mechanism, said first long link of said second joint cross linkage of said link retaining mechanism and said second short link of said second joint cross linkage of said link retaining mechanism are pivotably connected with each other at said second end portion of said first long link of said second joint cross linkage of said link retaining mechanism and said first end portion of said second short link of said second joint cross linkage of said link retaining mechanism, said second long link has first and second end portions and is substantially equal in length to said first long link of said second joint cross linkage of said link retaining mechanism, said second short and long links of said second joint cross linkage of said link retaining mechanism are pivotably connected with each other at said second end portion of said second short link of said second joint cross linkage of said link retaining mechanism and said first end portion of said second long link of said second joint cross linkage of said link retaining mechanism, and said second long link of said second joint cross linkage of said link retaining mechanism and said first short link of said second joint cross linkage of said link retaining mechanism are pivotably connected with each other at said second end portion of said second long link of said second joint cross linkage of said link retaining mechanism and said first end portion of said first short link of said second joint cross linkage of said link retaining mechanism under the state that said second long link of said second joint cross linkage of said link retaining mechanism is crossed with said first long link of said second joint cross linkage of said link retaining mechanism, and said second long link of said second joint cross linkage of said link retaining mechanism is fixedly connected with said first arm link of said first arm link mechanism, whereby said link retaining mechanism is operative to keep a line passing through said first short link of said first joint cross linkage of said link retaining mechanism forward in a rotation direction, in which said first arm link mechanism and said second arm link mechanism are contracted, with respect to a line passing through said second long link of said first joint cross linkage of said link retaining mechanism in comparison with a line passing through said first short link of said first joint cross linkage of said link retaining mechanism expected to be placed with respect to a line passing through said second long link of said first joint cross linkage of said link retaining mechanism when said first short link of said first joint cross linkage of said link retaining mechanism and said second long link of said second joint cross linkage of said link retaining mechanism are respectively placed in substantially collinear relationship with said first arm link of said second arm link mechanism and said first arm link of said first arm link mechanism.

9. A robot arm mechanism as set forth in claim 7, in which
said first short link of said first joint cross linkage of said link retaining mechanism is fixedly connected with said first arm link of said first arm link mechanism, said second long link of said first joint cross linkage of said link retaining mechanism is fixedly connected with said third arm link of said first arm link mechanism, said first short link of said second joint cross linkage of said link retaining mechanism is fixedly connected with said third arm link of said second arm link mechanism, said second long link of said second joint cross linkage of said link retaining mechanism is fixedly connected with said second arm link of said second arm link mechanism, and said first long link of said second joint cross linkage of said link retaining mechanism is fixedly connected with said second short link of said first joint cross linkage of said link retaining mechanism.

10. A robot arm mechanism as set forth in claim 7, in which
said first short link of said first joint cross linkage of said link retaining mechanism is fixedly connected with said second arm link of said second arm link mechanism, said second long link of said first joint cross linkage of said link retaining mechanism is fixedly connected with said third arm link of said first arm link mechanism, said first short link of said second joint cross linkage of said link retaining mechanism is fixedly connected with said third arm link of said first arm link mechanism, said second long link of said second joint cross linkage of said link retaining mechanism is fixedly connected with said first arm link of said first arm link mechanism, and said first long link of said second joint cross linkage of said link retaining mechanism is fixedly connected with said second short link of said first joint cross linkage of said link retaining mechanism.

11. A robot arm mechanism comprising:
a first arm link mechanism consisting of a first quadric crank chain comprising a first arm link, a second arm link substantially in parallel relationship with said first arm link, a third arm link, and a fourth arm link substantially in parallel relationship with said third arm link;
a second arm link mechanism consisting of a second quadric crank chain comprising a first arm link, a second arm link substantially in parallel relationship with said first arm link, a third arm link, and a fourth arm link substantially in parallel relationship with said third arm link, said third arm link of said second arm link mechanism being fixedly connected with said third arm link of said first arm link mechanism, said second arm link mechanism is pivotably connected with said first arm link mechanism;
a link retaining mechanism having a reference line, said link retaining mechanism pivotably retaining said first arm link mechanism and said second arm link mechanism respectively and keeping a first angle substantially equal to a second angle, said first angle being an angle formed by a line passing through said first arm link of said first arm link mechanism with said reference line, said second angle being an angle formed by a line passing through said first arm link of said second arm link mechanism with said reference line; and
a robot arm driving mechanism comprising; a first driving shaft operative to rotate said first arm link of said first arm link mechanism around a rotation axis in any one of two rotation directions consisting of a first rotation direction in which said first arm link mechanism and said second arm link mechanism are extended, and a second rotation direction in which said first arm link mechanism and said second arm link mechanism are contracted, whereby
said robot arm driving mechanism is operative to rotate said first arm link of said first arm link mechanism around said rotation axis in said first rotation direction, and said fourth arm link of said first arm link mechanism around said rotation axis in any one of two directions consisting of said first rotation direction and said second rotation direction while maintaining said first angle formed by a line passing through said first arm link of said first arm link mechanism with said reference line less than a third angle formed to be less than 180 degrees by a line passing through said fourth arm link of said first arm link mechanism with said reference line in said first rotation direction as well as maintaining said second angle formed by a line passing through said first arm link of said second arm link mechanism with said reference line less than a fourth angle formed to be less than 180 degrees by a line passing through said fourth arm link of said second arm link mechanism with said reference line in said rotation direction opposite to said first rotation direction.

12. A robot arm mechanism as set forth in claim 11, in which
said link retaining mechanism comprises:
a first joint cross linkage consisting of a third quadric crank chain including
a first short link,
a first long link longer than said first short link of said first joint cross linkage of said link retaining mechanism,
a second short link substantially equal in length to said first short link of said first joint cross linkage of said link retaining mechanism,
a second long link substantially equal in length to said first long link of said first joint cross linkage of said link retaining mechanism, and crossed with said first long link of said first joint cross linkage of said link retaining mechanism, said first short link of said first joint cross linkage of said link retaining mechanism fixedly connected with said first arm link of said second arm link mechanism, said second long link of said first joint cross linkage of said link retaining mechanism fixedly connected with said third arm link of said first arm link mechanism,
a second joint cross linkage consisting of a fourth quadric crank chain including
a first short link substantially equal in length to said second long link of said first joint cross linkage of said link retaining mechanism,
a first long link longer than said first short link of said second joint cross linkage of said link retaining mechanism,
a second short link substantially equal in length to said first short link of said second joint cross linkage of said link retaining mechanism, and
a second long link substantially equal in length to said first long link of said second joint cross linkage of said link retaining mechanism, and crossed with said first long link of said second joint cross linkage of said link retaining mechanism, said first short link of said second joint cross linkage of said link retaining mechanism fixedly connected with said second long link of said first joint cross linkage of said link retaining mechanism, and said second long link of said second joint cross linkage of said link retaining mechanism fixedly connected with said first arm link of said first arm link mechanism, and said first long link of said second joint cross linkage of said link retaining mechanism fixedly connected with said second short link of said first joint cross linkage of said link retaining mechanism.

* * * * *